(12) United States Patent
Murison et al.

(10) Patent No.: US 12,295,421 B2
(45) Date of Patent: May 13, 2025

(54) VAPING SYSTEM

(71) Applicant: AYR LTD., Ealing (GB)

(72) Inventors: Ian Murison, Ealing (GB); Stephen Jackson, Ealing (GB); Hadyn Van Der Berg, Ealing (GB); Ryan Cocking, Ealing (GB); Luv Sheth, Ealing (GB); Tom O'Callaghan, Ealing (GB)

(73) Assignee: AYR LTD., Ealing (GB)

( * ) Notice: Subject to any disclaimer, the term of this patent is extended or adjusted under 35 U.S.C. 154(b) by 0 days.

(21) Appl. No.: 18/899,887

(22) Filed: Sep. 27, 2024

(65) Prior Publication Data
US 2025/0017283 A1   Jan. 16, 2025

Related U.S. Application Data

(63) Continuation of application No. PCT/GB2023/052314, filed on Sep. 7, 2023.

(30) Foreign Application Priority Data

Sep. 7, 2022 (GB) ...................... 2213041
Sep. 7, 2022 (GB) ...................... 2213044

(Continued)

(51) Int. Cl.
*A24F 40/57* (2020.01)
*A24F 15/015* (2020.01)
(Continued)

(52) U.S. Cl.
CPC ............ *A24F 40/57* (2020.01); *A24F 15/015* (2020.01); *A24F 40/10* (2020.01); *A24F 40/42* (2020.01);
(Continued)

(58) Field of Classification Search
None
See application file for complete search history.

(56) References Cited

U.S. PATENT DOCUMENTS

2019/0239566 A1   8/2019   Alarcon et al.
2020/0046033 A1   2/2020   Robert et al.
(Continued)

FOREIGN PATENT DOCUMENTS

EP   2964038 B1   7/2016
WO   2017037457 A1   3/2017

OTHER PUBLICATIONS

International Search Report, dated Apr. 19, 2024, and Written Opinion issued in priority International Application No. PCT/GB2023/052314.

*Primary Examiner* — Katherine A Will
(74) *Attorney, Agent, or Firm* — Saul Ewing LLP

(57) ABSTRACT

A vaping system includes: (a) a disposable vaping device that includes the following non user-replaceable items: (i) a heating element; (ii) a rechargeable battery, and (iii) a liquid reservoir that provides liquid to the heating element; and (b) an automatic liquid filling device, including (i) a first aperture or port configured to receive a liquid bottle or container containing atomisable liquid; (ii) a second aperture or port configured to receive the vaping device; (iii) an electronic liquid level sensing sub-system; (iv) a liquid filling sub-system configured to pump liquid from the liquid bottle or container to the liquid reservoir in the vaping device and (v) a battery charging sub-system.

29 Claims, 33 Drawing Sheets

| (30) Foreign Application Priority Data | | |
|---|---|---|
| Sep. 7, 2022 | (GB) | 2213046 |
| Sep. 7, 2022 | (GB) | 2213047 |
| Sep. 7, 2022 | (GB) | 2213061 |
| Sep. 7, 2022 | (GB) | 2213062 |
| Sep. 7, 2022 | (GB) | 2213065 |
| Sep. 7, 2022 | (GB) | 2213069 |
| Sep. 7, 2022 | (GB) | 2213073 |
| Sep. 7, 2022 | (GB) | 2213076 |
| Sep. 7, 2022 | (GB) | 2213078 |
| Sep. 7, 2022 | (GB) | 2213080 |
| Sep. 7, 2022 | (GB) | 2213083 |
| Sep. 7, 2022 | (GB) | 2213084 |
| Sep. 7, 2022 | (GB) | 2213085 |
| Oct. 7, 2022 | (GB) | 2214740 |
| Oct. 10, 2022 | (GB) | 2214886 |
| Oct. 21, 2022 | (GB) | 2215628 |
| Nov. 10, 2022 | (GB) | 2216749 |
| Nov. 10, 2022 | (GB) | 2216755 |
| Nov. 10, 2022 | (GB) | 2216762 |
| Nov. 10, 2022 | (GB) | 2216770 |
| Nov. 10, 2022 | (GB) | 2216771 |
| Nov. 10, 2022 | (GB) | 2216773 |
| Nov. 10, 2022 | (GB) | 2216774 |
| Nov. 10, 2022 | (GB) | 2216775 |
| Nov. 10, 2022 | (GB) | 2216776 |
| Nov. 10, 2022 | (GB) | 2216779 |
| Nov. 10, 2022 | (GB) | 2216782 |
| Nov. 10, 2022 | (GB) | 2216784 |
| Apr. 3, 2023 | (GB) | 2304923 |

(51) Int. Cl.
| | |
|---|---|
| *A24F 40/10* | (2020.01) |
| *A24F 40/42* | (2020.01) |
| *A24F 40/46* | (2020.01) |
| *A24F 40/51* | (2020.01) |
| *A24F 40/53* | (2020.01) |
| *A24F 40/95* | (2020.01) |
| *A24F 47/00* | (2020.01) |
| *G05D 23/19* | (2006.01) |
| *A24F 40/80* | (2020.01) |

(52) U.S. Cl.
CPC ............. *A24F 40/46* (2020.01); *A24F 40/51* (2020.01); *A24F 40/53* (2020.01); *A24F 40/95* (2020.01); *A24F 47/00* (2013.01); *G05D 23/1917* (2013.01); *A24F 40/80* (2020.01)

(56) References Cited

U.S. PATENT DOCUMENTS

| | | | |
|---|---|---|---|
| 2021/0100291 A1* | 4/2021 | Sur | G01J 5/10 |
| 2021/0337878 A1 | 11/2021 | Gretton et al. | |
| 2022/0080137 A1* | 3/2022 | Hebrank | A61M 15/0003 |
| 2022/0183392 A1* | 6/2022 | Beidelman | A24F 40/51 |

* cited by examiner

Returning to Tip A, because we can plot the complete resistance v temp line, we know what the resistance of this particular Tip A should be at the setpoint temp, typically 250° C or 270° C. And we know the expected resistance at 0 ° C, which we label as R0.

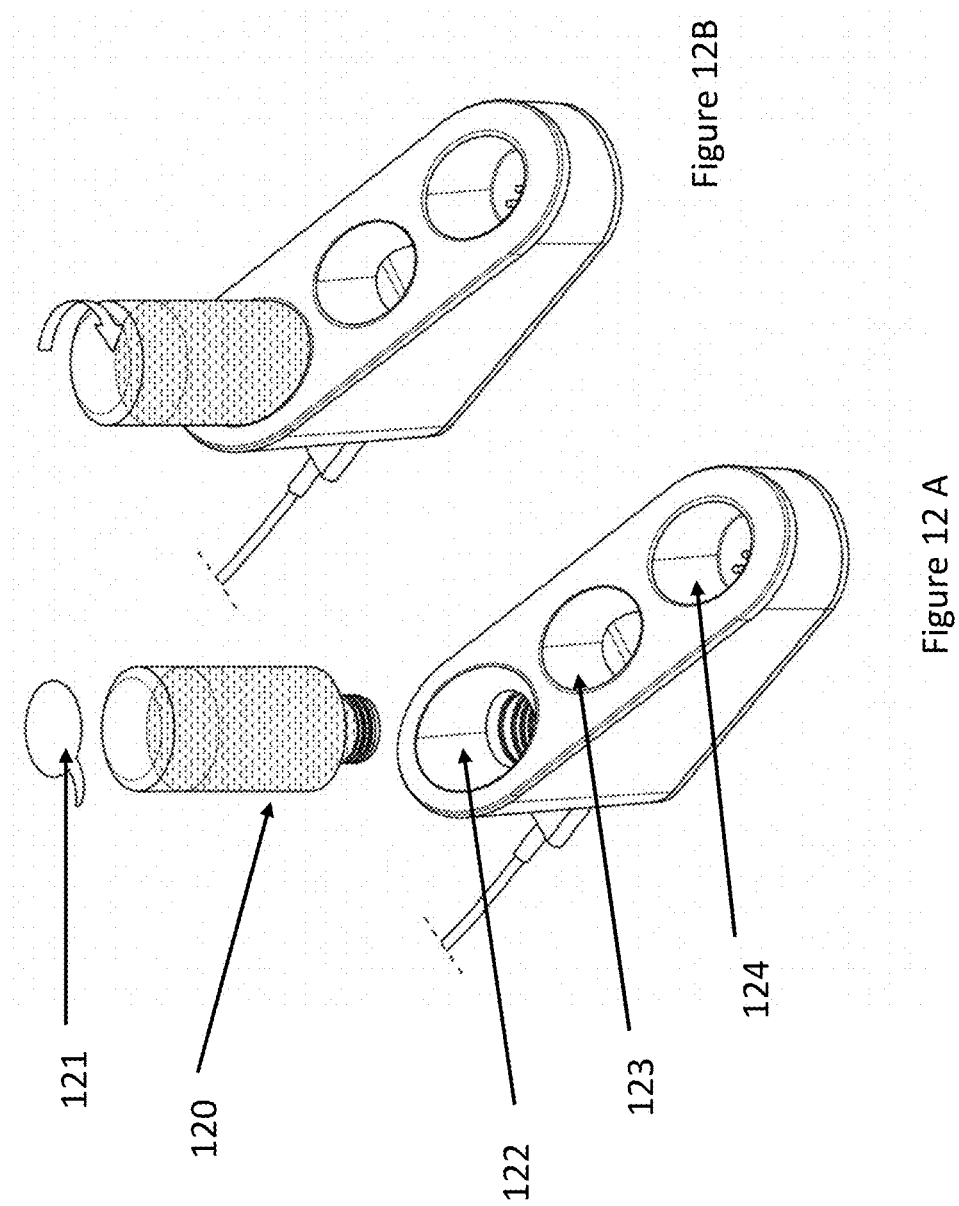

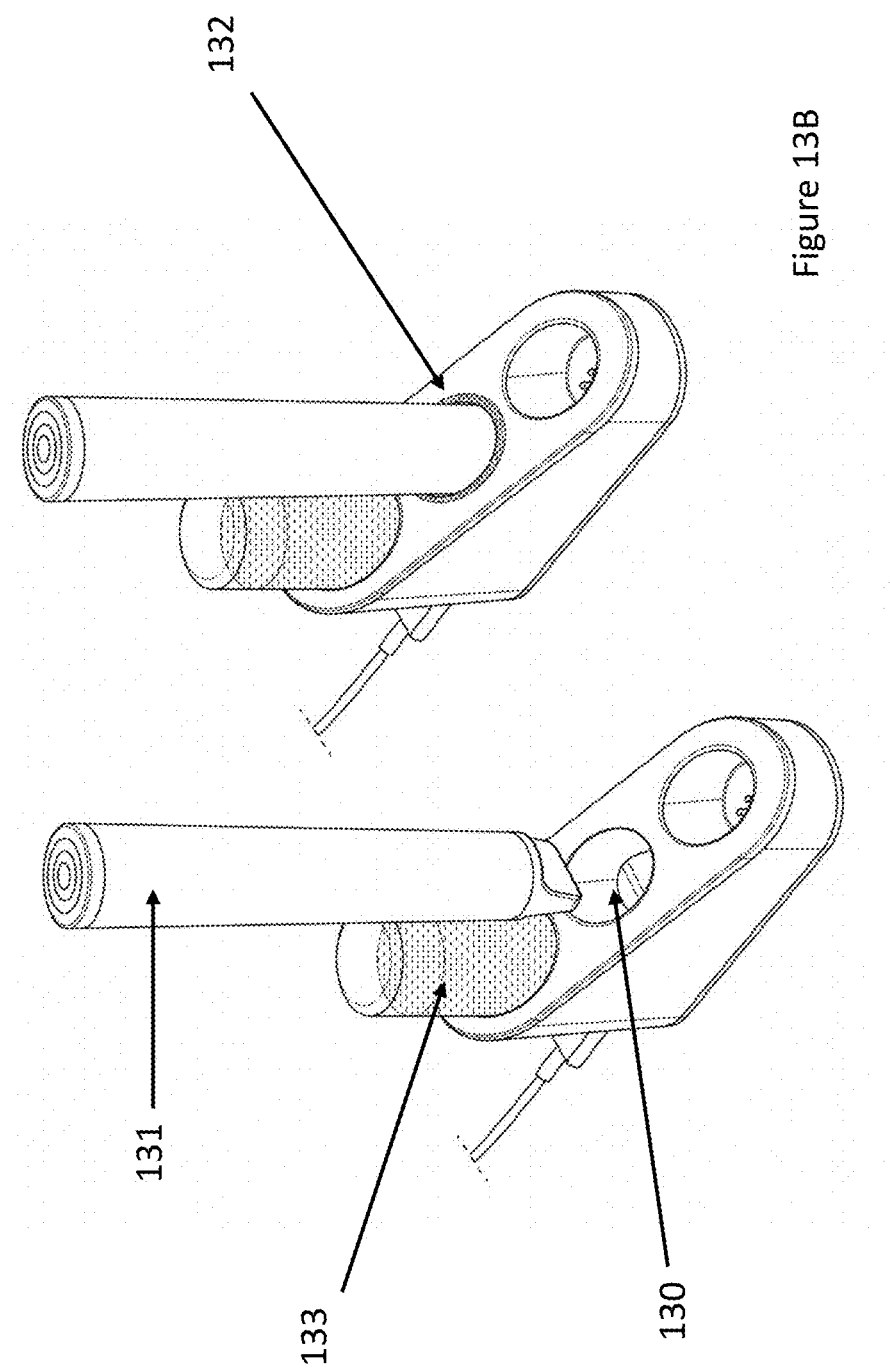

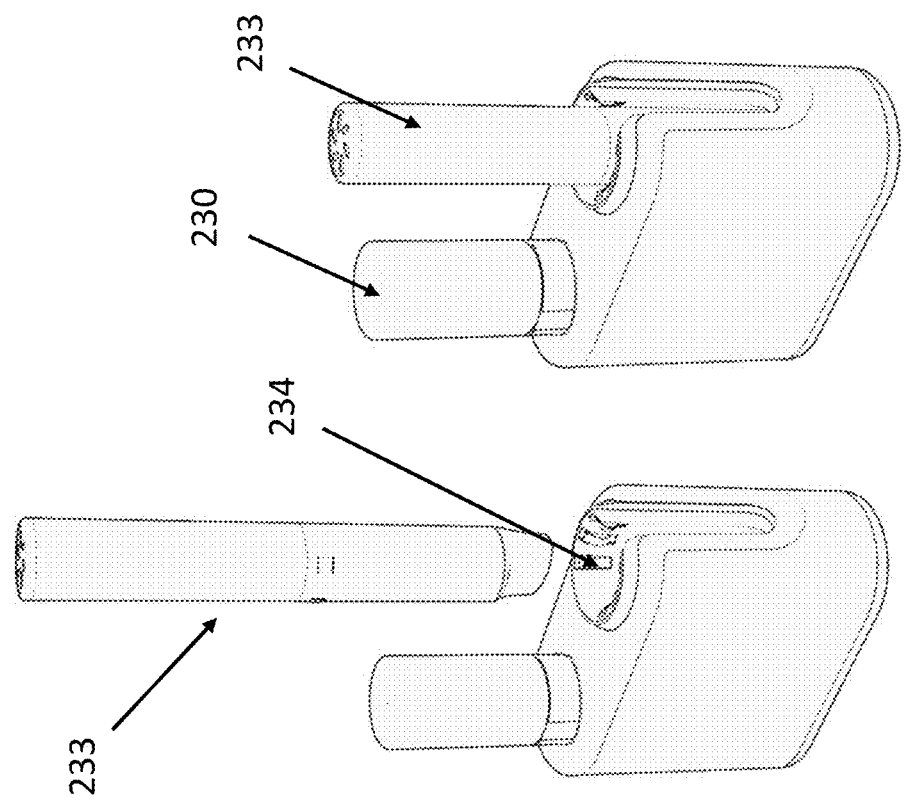
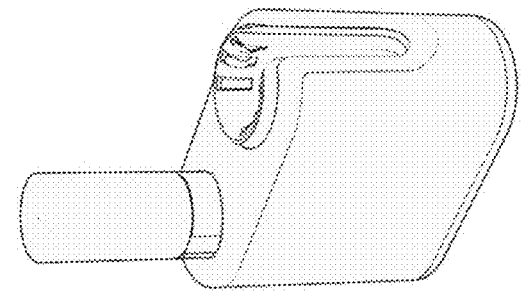
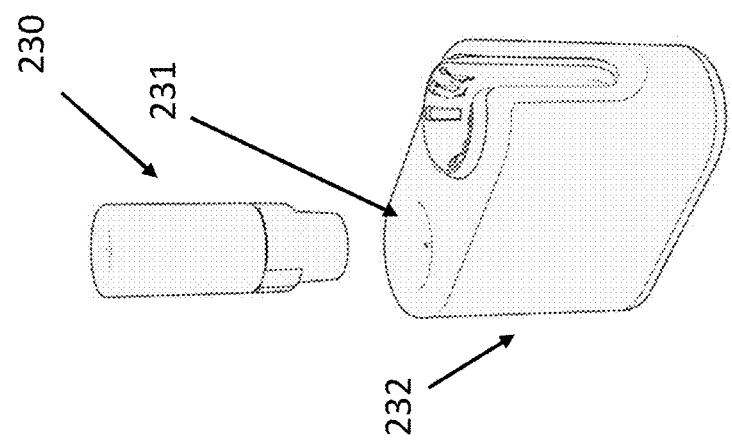
Figure 23A  Figure 23B  Figure 23C  Figure 23D

VAPING SYSTEM

CROSS-REFERENCE TO RELATED APPLICATIONS

This application is a continuation of International Application No. PCT/GB2023/052314, filed on Sep. 7, 2023, which claims priority to GB Application Nos. GB 2213041.3 filed Sep. 7, 2022; GB 2213044.7 filed Sep. 7, 2022; GB 2213046.2 filed Sep. 7, 2022; GB 2213047.0 filed Sep. 7, 2022; GB 2213061.1 filed Sep. 7, 2022; GB 2213062.9 filed Sep. 7, 2022; GB 2213065.2 filed Sep. 7, 2022; GB 2213069.4 filed Sep. 7, 2022; GB 2213073.6 filed Sep. 7, 2022; GB 2213076.9 filed Sep. 7, 2022; GB 2213078.5 filed Sep. 7, 2022; GB 2213080.1 filed Sep. 7, 2022; GB 2213083.5 filed Sep. 7, 2022; GB 2213084.3 filed Sep. 7, 2022; GB 2213085.0 filed Sep. 7, 2022; GB 2214740.9 filed Oct. 7, 2022; GB 2214886.0 filed Oct. 10, 2022; GB 2215628.5 filed Oct. 21, 2022; GB 2216749.8 filed Nov. 10, 2022; GB 2216755.5 filed Nov. 10, 2022; GB 2216762.1 filed Nov. 10, 2022; GB 2216770.4 filed Nov. 10, 2022; GB 2216771.2 filed Nov. 10, 2022; GB 2216773.8 filed Nov. 10, 2022; GB 2216774.6 filed Nov. 10, 2022; GB 2216775.3 filed Nov. 10, 2022; GB 2216776.1 filed Nov. 10, 2022; GB 2216779.5 filed Nov. 10, 2022; GB 2216782.9 filed Nov. 10, 2022; GB 2216784.5 filed Nov. 10, 2022; GB 2304923.2 filed Apr. 3, 2023, the entire contents of each of which being fully incorporated hereby by reference.

1. FIELD OF THE INVENTION

The invention relates to vaping systems. Vaping systems provide an inhalable aerosol which may contain nicotine or other substances, such as CBD or cannabinoids; they are typically used as alternatives to combustible cigarettes and are widely considered to be significantly less harmful than combustible cigarettes. The term 'vaping' should be expansively construed to cover any electronic device designed to deliver an inhalable vapour; it includes devices that heat an atomisable liquid and also heat-not-burn (HnB) devices that heat a tobacco-derived substance (called 'cast leaf') in a cigarette like 'tobacco stick'. It includes devices that deliver inhalable nicotine, as well as other substances, such as CBD, THC, cannabinoids, terpenes, medicines, vitamins and plant extracts.

2. DESCRIPTION OF THE PRIOR ART

Vaping devices come in various form factors; some of the simplest use small pods that attach to a slim body, which contains a battery and simple control electronics. The pod is pre-filled at a factory with an atomisable liquid, often called an e-liquid, and includes both a small (typically 0.7 mL to 1.3 mL) reservoir of this liquid, a small wick and a heating element in contact with the wick; when the user inhales, a small pressure switch is activated, which in turn cause current to heat the heating element and generate an aerosol which is inhaled. The pod is replaced by a user with a fresh pod, when all of the atomisable liquid has been consumed.

Vaping devices are used to atomise nicotine and other substances, such as CBD or THC etc. Most conventional vaping devices have poor temperature control; for example, one purported temperature control approach used in many conventional vaping devices is to deliver a fixed amount of power to the heating element; this approach does not directly measure or control the temperature of the heating element. Closed loop temperature control for vaping devices has previously been disclosed in our PCT/GB2019/052922, the contents of which are incorporated by reference.

A recent trend in the vaping market is the emergence of the 'modern disposables' category of vaping devices: 'Modern disposable' vaping devices are sold at retail pre-filled with liquid and fully charged; they are designed not to permit refilling—e.g., the tip cannot be replaced with a new, pre-filled tip. Likewise, they are not designed to be recharged. Instead, with a conventional 'modern disposable' device, once the liquid in the tip is used up, the entire device is thrown away; it can be thought of as a single use device. Similarly, if the device runs out of charge, the entire device is thrown away. Unlike conventional pre-filled pod or tip based systems, where the user replaces a pre-filled pod or tip with a fresh tip once the liquid in the tip is consumed, with modern disposable devices, there is no dis-assembly of the device at all and so the entire device is thrown away once the liquid is consumed. Modern disposable vaping devices can be thought of as '1-piece' devices in that the consumer treats them as a unitary device with no user-replaceable parts and no recharging capability: this stands in contrast with 'pod' based devices that have a user-replaceable pod or tip and are rechargeable.

Modern disposables are very convenient for users, since there is no dis-assembly and no re-charging, and are simple to understand and use. Just like cigarettes, they are immediately ready to use, and are discarded once used up. But they are very damaging for the environment, and are very wasteful: the lithium ion battery in a modern disposable device is charged once by the manufacturer, and then the entire device is thrown away once all the liquid is used up (typically after 150-300 puffs), even though the battery could be re-charged and re-used multiple times.

Because modern disposables are designed to be cheap, throw-away items, the quality of the heating element and associated control circuitry may be poor, potentially leading to harmful emissions; often, there is usually no actual temperature control circuitry at all, but instead a simple power control circuit that may lead to the heating element reaching excessive temperatures, generating potentially harmful emissions. The main consumer appeal of modern disposable devices is the convenience of being able to use these devices out-of-the-box, and easily select different flavours at retail, all with no user set up and no swapping a used pod or tip for a new one (a slightly fiddly and potentially messy process) and no recharging. Modern disposables face bans in several countries because of their very negative environmental impact and marketing practices aimed at appealing to underage users.

SUMMARY OF THE INVENTION

The invention is a vaping system including:
(a) a disposable vaping device that includes the following non user-replaceable items: (i) a heating element; (ii) a liquid reservoir that provides liquid to the heating element;
(b) an automatic liquid filling device, including (i) a first aperture or port configured to receive a liquid bottle or container containing atomisable liquid; (ii) a second aperture or port configured to receive the vaping device; (iii) an electronic liquid level sensing sub-system; (iv) a liquid filling sub-system configured to pump liquid from the liquid bottle or container to the liquid reservoir in the vaping device and (v) a battery charging sub-system to charge a battery in the vaping device;

in which the disposable vaping device is configured:

(i) to be sold to an end-user with a pre-filled liquid reservoir and a pre-charged battery so that the device is immediately useable;

(ii) to be automatically re-fillable and re-chargeable at the liquid filling device without being disassembled;

(iii) to be maintained as a single or unitary device that is not disassembled through replacement of the heating element or the liquid reservoir throughout the entire normal working lifetime of the device.

The invention is implemented in a disposable vaping device we describe in more detail in Section B. We describe one format, a 1-piece refillable tube or bar format device: this device is a cylindrical tube or bar-shaped tube device. We also describe a 1-piece refillable disposable vaping device that is not tube-shaped but instead bottle or box shaped; we call this the '1-piece Refillable Box or Bottle' device.

Both variants are hybrid disposable vaping devices and are not dis-assembled by the user in normal use, and are also re-fillable and re-chargeable multiple times. In essence, these vaping devices look like conventional modern disposable vaping devices (e.g. a tube or bar format or a bottle/box format modern disposable vaping device); each has a similar retail price point as a conventional modern disposable vaping device because each is constructionally very similar to a conventional modern disposable vaping device; each is sold pre-filled and fully charged, like a conventional modern disposable vaping device; each is sold at retail in a variety of different liquid flavours, like a conventional modern disposable vaping device. Each variant hence has all the key attributes that make conventional modern disposable vaping devices so appealing to consumers. But, unlike a conventional modern disposable vaping device, and somewhat paradoxically for devices that are superficially so similar to conventional modern disposable vaping devices that are discarded after their initial, factory-provided liquid or charge runs out, each variant is intrinsically re-fillable and re-chargeable if a consumer uses an optional, low-cost liquid re-filling and re-charging dock.

Each variant can be fully re-filled and re-charged at least ten times before it, like a conventional modern disposable, has to be discarded, for example, because the heater element has degraded. Because these variants are inherently not single-use devices. but can be refilled and recharged multiple times, they should not be affected by bans on the sale of single use disposable vaping devices, which are being introduced in several markets.

In the context of this implementation, the term 'disposable vaping device' means a vaping device that is (a) a 1 piece or unitary vaping device that is sold to an end-user with (i) a liquid reservoir including a pre-filled amount of liquid, and (ii) a pre-charged battery, so that the end-user can immediately vape on the device after purchase and (b) is configured not to be disassembled in normal use through the replacement of the heater element or liquid reservoir, but to remain as a 1 piece or unitary device throughout its entire lifetime of normal use. A 'disposable vaping device' is therefore not meant, in normal use, to be disassembled when the liquid runs out, unlike a typical pod-based vaping device, where the user has to regularly replace the tip or pod of the device with a fresh tip or pod. A 'disposable vaping device' could have a battery that is user-removable at end-of-life, e.g. when the device is being discarded, to aid recycling.

A conventional 'disposable vaping device' is thrown away after the liquid or electrical charge in it, at the time of sale, has run out; however, with implementations of this invention, end-users also have the option of re-filling and re-charging the 'disposable vaping device' multiple times, greatly reducing their environmental impact, and increasing user convenience.

We will sometimes refer to this device as a 'hybrid' 'disposable vaping device, since it combines attributes of both single-use disposable vaping devices and also vaping devices that are designed to be used multiple times, with multiple re-charging sessions and multiple liquid re-filling sessions. This hybrid disposable vaping device that implements this invention is never disassembled through the replacement of the heater element or liquid reservoir, not are these parts replaced, even after multiple re-filling and re-charging events: this is unlike pod-based vaping devices, where the pods or tips, and hence the heater element and liquid reservoir in those tips, are replaced when they run out of their pre-filled liquid, but the main body, which includes the rechargeable battery, is not replaced.

We have described automatic liquid re-filling systems in a series of patents and patent applications, the contents of which are incorporated by reference: PCT/GB2015/050574, PCT/GB2015/050573, PCT/GB2015/050571, PCT/GB2016/052700, PCT/GB2019/052922, U.S. Pat. Nos. 9,247,773, 10,624,394, 10,130,119, and 11,083,228 and US 2021-0337878.

BRIEF DESCRIPTION OF THE FIGURES

Implementations of the invention will be described with reference to the accompanying figures, in which:

FIG. 10A-10B show a refillable tube-shaped hybrid disposable vaping device that is re-fillable and disposable; it is disposed of after typically ten complete liquid re-fills of approximately 1.5 mL to 2 mL with liquid; the heating element cannot be replaced but the device can safely atomise approximately 20 mL of liquid before degrading and then being disposed of.

FIGS. 11, 12A, 12B, 13A, 13B, 14A, 14B and 15 show a desktop re-filling device used to re-fill and re-charge the refillable tube-shaped hybrid disposable vaping device, which is re-filled in one port in the re-filling device and then inverted and inserted into a different port in the re-filling device to re-charge its battery.

FIG. 23A-23D show the interaction sequence of taking a refill bottle and inserting that when inverted into a port in the refill dock; then taking a refillable tube-shaped vaping device and inserting that inverted into a second port in the refill dock.

Figure 1:
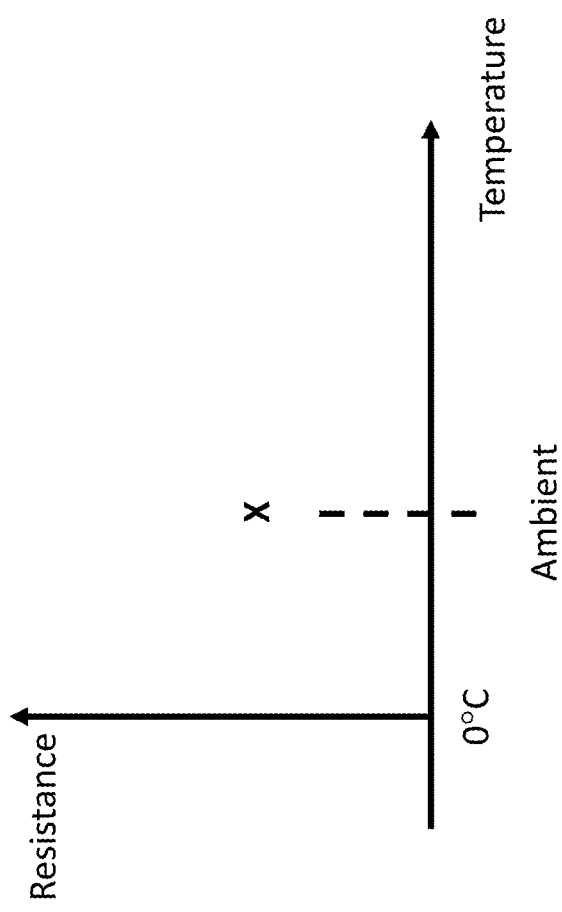
FIGS. 1-7 are graphs showing the resistance v temperature behaviour of the heating element used in a vaping device; these graphs conceptually describe what steps are taken to enable the heating element to be controlled.

INDEX TO INTEGERS REFERENCED IN THE FIGURES vaping device charging contacts 101
vaping device body 102
vaping device tip 103
silicone filling valve in the tip 104
liquid reservoir in the tip 105
automatic liquid re-filling and re-charging device or dock 110
first port in the dock, for the refill bottle 111
liquid refill container 112
tube in the dock connecting the refill bottle to the electric pump 113
electric peristaltic pump in the dock 114
liquid filling nozzle in the dock 115
second port in the dock, for refilling the vaping device 116
electrical contact pins in the dock 117
capacitive sensing plates in the dock 118
refill bottle 120
small, removable sticker for the refill bottle 121
first port in the dock, for the refill bottle 122
second port in the dock, for refilling the vaping device 123
third port in the dock, for recharging the vaping device 124
second port in the dock, for refilling the vaping device 130
vaping device 131
status light ring in the dock, around the refilling port 132
refill bottle 133
vaping device 140
third port in the dock for recharging the vaping device 141
status light ring in the dock, around the recharging port 142
inverted vaping device when being refilled 151
upright vaping device when being recharged 152
re-fill opening in the tip 161
re-charging contacts in the tip 162
vaping device tip 163
small window into the interior of the tip 164
re-filling device or dock with combined refill and recharge port 170
first port in the dock, for the refill bottle 171
refill bottle 172
second port in the dock, for both refilling and recharging 173
vaping device 174
refill bottle 181
re-filling and recharging port 182
re-fill nozzle 183
electrical charging contacts 184
vaping device tip 190
window into the interior of the tip 191
electrical charging contacts 192
combined re-filling and re-charging port 193
annular, cylindrical open-foam liquid reservoir 200
mesh electrical resistance based heater 201
cotton tab that feed liquid to the mesh heater 202
cylindrical metal tube that sits inside the foam reservoir and contains the heater 203
silicone base underneath the open-foam liquid reservoir 204
air passage through the silicone base 205
narrow pipes or channels the filling needles penetrate 206
electrical charging contacts 208
status light ring in the refilling and recharging dock 211
refilling and recharging port in the dock 212
refill bottle 213
status light ring in the refilling and recharging dock 221
quarter segment in the status light ring 222
refill bottle 230
refill bottle port in the dock 231
refill and recharge dock 232
vaping device 233
refilling and recharging port in the dock 234
liquid re-filling and recharging unit for pubs, clubs or retail 240
nine liquid re-filling ports 241
100 mL liquid refill bottles 242
silicone or paper covers for the vaping device tips 243
three re-charging ports in the dock 244
payment card touch/proximity reader 245
bottle cap 250
circular hole in the centre of the top of the bottle cap 251
slot in the cap that guides and secures the bottle into position in the dock 252
silicone or rubber septa seal 253
refill bottle neck with thread 254
set of flanges on the neck of the refill bottle 255
refill bottle, main body 256
locking stubs in the cap 257
mouthpiece of the box or bottle-shaped disposable vaping device 260
top section of the box or bottle-shaped disposable vaping device 261
body casing of the box or bottle-shaped disposable vaping device 262
base section of the box or bottle-shaped disposable vaping device 263
battery 264
PCB 265
void that separates the rear of the PCB from the liquid reservoir compartment 266 metal tube or chimney 267
cotton tab for liquid delivery 268
cylindrical foam liquid reservoir 269
battery chamber 270
cylindrical chamber for the cylindrical foam liquid reservoir 271
PCB guide slots 272
external body wall 273
air inlet in the base of the vaping device 280
pair of apertures through which the liquid filling nozzles pass 281
vapour nozzle in the top section of the vaping device 290
silicone top plug 292
two small holes in the silicone top plug 293
air passage in the internal silicone base section 294
internal silicone base section 295
pressure sensor 296
twin silicone channels through which the liquid filling nozzles pass 297
vapour escape aperture in the silicone plug 298
integral 'O' rings in the internal silicone base section 299

DETAILED DESCRIPTION

This Detailed Description describes various implementations of the invention and is divided into the following sections:

| | |
|---|---|
| Section A: | Closed loop temperature control |
| Part I: | Overview of the closed feedback loop temperature control system used in one implementation of the invention |
| Part II: | Dual control loop approach |
| Part III: | Summary of the Key Features of Closed Loop Temperature Control |
| Section B: | Next Generation Disposable - the 1-piece Refillable Tube or Bar-shaped disposable vaping device and the 1-piece Refillable Box or Bottle-shaped disposable vaping device |
| Section C: | Dynamic battery charging dependent on the liquid fill level in the vaping device |
| Section D: | Always-on data connectivity; the AyrLock feature |
| Section E: | Recycling polypropylene nicotine bottles |
| Section F: | Key Features |
| Section A: | Closed loop temperature control |

In this section, we describe a closed loop temperature control system for vaping devices that use resistance-based heating elements.

Section a, Part I: Overview of the Closed Feedback Loop Temperature Control System Used in One Implementation of the Invention The closed loop temperature system implemented by the invention delivers accurate control of the heating element temperature. Accurate temperature control is important because: (i) it ensures safety (if excess temperatures are reached, then carbonyls and other dangerous substances such as metal can be generated in the inhaled vapour); (ii) it prevents an unpleasant burning taste; (iii) it provides a consistent delivery of nicotine in each puff, at the desired strength; and (iv) it leads to better taste and also for that better taste to last for many more puffs. For cannabinoids, accurate temperature control is especially important because different compounds (e.g. different cannabinoids, terpenoids, flavonoids) have different evaporation temperatures and, since the aim is to deliver a psycho-active or physical impact that is specific to a user's requirements, that requires evaporating precisely the right compounds at the right time; note that the temperature control can be fixed during a puff, or alter during a puff, or during a session, to deliver the optimal experience.

The typical vaping device is made up of a body, which contains the battery and control electronics, and a removable or fixed tip; the tip is pre-filled (at the factory) with atomisable liquid (e.g. the typical nicotine, propylene glycol and vegetable glycerine mix). The tip includes a heating element and a porous barrier that separates the heating element from the liquid in the tip; liquid passes through the porous barrier (e.g. by capillary action) and on contact with a heating element when heated to a typical 270° C. then vaporises, forming an inhalable vapor. (Note that for cannabinoids, the temperature will be significantly lower, typically between 180° C. and 210° C., depending on what specific compounds are meant to be evaporated). For a modern disposables (and the disposable vaping devices described in Section B), the battery and the liquid reservoir are located inside a 1-piece device, with the liquid reservoir in a liquid-sealed compartment in the device. There is no removable tip. The systems described in this Section A can be used in vaping devices where the tip is removable, and also where there is no removable tip; these systems are independent of the device form factor.

In one implementation of the closed feedback loop temperature control system, the vaping device is programmed with a target or setpoint temperature for the heated atomiser (e.g. 270° C.); the device automatically infers the current temperature of the heater/atomiser (many times a second) by calculating the real-time resistance of the heating element from the real-time values of the voltage and current sent to the heating element (which are automatically generated by the power management chip in the device).

Since the device is programmed with the temperature co-efficient of resistance, or a derived parameter or dataset, of the heating element, the device can infer the real-time temperature of the heating element from its real-time resistance. The device sends both the setpoint/target temperature for the heating element and the current or real-time temperature for that element as inputs to a PID (proportional-integral-derivative) controller: the PID controller alters the PWM (pulse width modulation) duty cycle of the power delivered to the heating element so that the real-time temperature of the heating element rapidly reaches and then automatically tracks around the setpoint temperature. In practice, this requires very careful adjustment of the PID parameters, through trial and experimentation at the design stage, until the following requirements are met:

Sufficiently rapid attainment of target setpoint temperature at the start, from cold.

Sufficiently small overshoot when first reaching the target setpoint temperature.

Sufficiently close maintenance of the real-time temperature to the setpoint temperature.

Sufficiently high production of nicotine (or whatever desired substance is being atomised)

Sufficiently stable and consistent level of production of nicotine etc. in the vapour to be inhaled.

No burning taste from the inhaled vapour, including in the dry vape condition (i.e. when there is no liquid to be atomised)

Good quality vapour taste or experience.

Good quality vapour taste or experience over many puffs (e.g. 300 puffs).

Different types or designs of atomising coil or heating plate etc. can require very different closed loop temperature control parameters, including PID parameters. The closed feedback loop temperature control approach that this invention implements works across a broad range of resistance based heating elements: heating coil would around a ceramic or placed on or in a ceramic or other wicking material; heating coil would around cotton, or placed on or in a ceramic or other wicking material; a metal mesh, a flat plate (e.g. sinuous flat 316L stainless steel) placed on or in a ceramic or other wicking material; resistive film placed on or in a ceramic or other wicking material; sintered metal plate placed on or in a ceramic or other wicking material; resistive layer coated onto a ceramic; and other heating element designs, such as graphene or other carbon-based heaters, and other wicking materials, including non-cotton wicking materials. Note that cotton-based wicking materials when dry (i.e. there is no or insufficient e-liquid) can burn when heated to above approximately 120° C., and so, to eliminate problems with burning of the wicking material if the wicking material is dry, it is preferable to choose a non-cotton wicking material that does not burn when dry at the temperature reached by the heating element (and that temperature is typically the same irrespective of whether there is any e-liquid or not). Another approach that allows even cotton (as well as other wicking materials) to be used as the wicking material, is described in Section C.

With conventional power-based control systems (i.e. systems which apply a fixed power to the heating element), maintaining good temperature control usually requires the complex and careful design of the entire heating element and ceramic system, leading to a costly overall system, generally unsuited to low-cost disposable vaping devices or to generating a high margin in more sophisticated devices. Because the control approach in the implementation described in this Section A is software-based, it is very low cost; the software can be run on a low cost microcontroller and it is especially relevant to improving the performance, consistency and preventing burning and the production of dangerous carbonyls etc. in low cost vaping devices, including disposables, that use simple heating elements.

In higher cost (i.e. higher cost to the consumer) vaping devices, it enables lower cost heating elements to be used, and yet these cheaper types of heating elements can now deliver performance and safety that is as good as more costly ceramic systems, hence significantly increasing the profitability to the manufacturer. Lower cost heating elements can be made, for example, of a thin stainless steel sheet (often with a sinuous form) or a thin wire: the thermal mass is very low and so rapid fluctuations in the temperature of the heating element when power is supplied are possible; this makes designing an effective closed feedback loop temperature control system that works well, even with very low thermal mass heating elements, very challenging. The present implementation solves this challenge.

In the following parts of Section A, we explain the operation of one implementation of the closed feedback loop temperature control system in more detail.

Step 1: The first step is for the PV (personal vaping or vapouriser) device to measure the basic resistance of the heating element (e.g. coil/mesh/plate etc.) in the tip attached to the body of that PV. Note that when we use the term 'tip', we are not implying that the tip is removable; we are simply using it to refer to the heating element. This resistance may vary from tip to tip (i.e. device to device, where there is no removable tip as such) due to production variance and so the resistance for each specific tip and hence each specific heating element has to be automatically determined.

This is done by the PV detecting when a tip (also called a pod) is inserted onto the vaping device body (the body includes the battery, control electronics and air pressure sensor) (typically pressed on to the end of the PV body, either at the factory or by an end-user) and then measuring the coil/mesh/plate resistance for the specific heating element in that tip over a short burst of power to the heating element. For the modern disposable devices described later in Section B, the tip and body are parts of a 1-piece PV device and the tip is not removable—there is hence no need to initially detect when a tip is inserted and instead the process can start with the heating element resistance measurement. For simplicity, we will refer to measuring parameters of the 'tip' in this Section A, but more exactly, and more appositely when the device is a 1-piece disposable vaping device, we are then referring to measuring parameters of the specific heating element.

An ADC in the power management chip in the PV records the instantaneous V and I, multiple times a second during this burst of power; the instantaneous resistance is calculated for each measurement (Ohm's law); we take five of these sequential resistance measurements to generate an average resistance value for this specific heating element.

The device can also measure the ambient temperature (with a circuit in the PV device). Alternatively, we can simply assume that this initial characterisation step is being done at an ambient temperature of say 25° C.; this would be appropriate for a PV that does not have the native ability to measure ambient temperature; this may be the case for low cost vaping devices, like disposables.

Given the ambient temperature (or an assumption about the temperature when this initial resistance characterisation is made), we have the key datapoint to define this particular heating element's resistance v temperature behaviour, as shown in FIG. 1.

For single-use disposable vaping devices, or the multi-use variant described in Section B, this initial resistance characterisation process will take place in the factory assembling the entire PV device. For devices with a user-replaceable tip, this process can take place in the factory assembling the device, and will also take place whenever the user places a new tip on the body of the PV. In addition, during production, we may (optionally) calibrate the measurement of the resistance (i.e. I and V) with a standard load. That way we can ensure that we can isolate the coil/mesh etc. resistance from any resistance in the PV circuit.

It is also possible for the tip or device to include a chip that records data about the heating element; this data could include the resistance characterisation. If so, then there is no need to repeat the resistance characterisation when the tip is placed by a user on to the device; instead, the resistance measurement is simply read off by the PV electronics and used by the PV.

Figure 2:
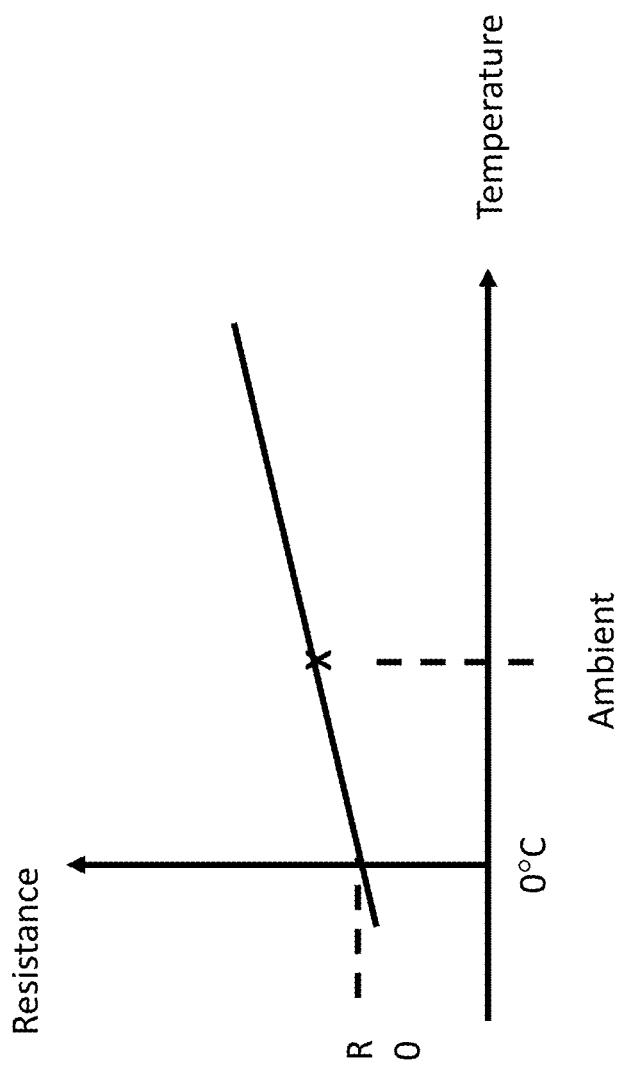

Step 2: The material used for the heating element will have a known temperature coefficient of resistance; the device manufacturer or designer will generally independently test and measure that parameter for a number of sample heating elements; in practice, the values can deviate from the published databook values. The temperature coefficient of resistance is (to a first order approximation) a straight line, so that it is possible to plot, as shown in FIG. 2, the actual resistance v temperature line for a specific tip, if we have just the one datapoint, e.g. from measuring the resistance at a known temperature, as done in Step 1.

Step 3: The PV device can calculate or look up any point on the resistance v temperature line for this tip or heating element, and so the device can readily derive a value of the resistance of the tip or heating element at the working setpoint temperature through a simple linear extrapolation.

The temperature setpoint is typically 250° C. or 270° C., but is in any event settable in software and so readily varied to account for (i) different atomising liquids (e.g. CBD atomisers work at lower temperatures than nicotine atomisers) or (ii) consumer preference. Whilst a digression from the explanation of the closed loop control algorithm, it is worth noting that a user might want one, e.g. the first, puff to be really 'hot' with high nicotine and a substantial vapour cloud, in which case a high temperature could be used, and some minutes later might want to adjust their vaping device to produce a much gentler inhalation with minimal vapor cloud, in which case the device would automatically use a lower setpoint temperature. The PV device could include a simple 'boost' or 'strength' type button that the user selects so that the device then automatically increases the setpoint temperature, and/or a 'discrete' button that lowers the setpoint temperature. Or a sliding control could be used, that enables the user to set a variable setpoint temperature. There is one use case that is worth touching on: One challenge that users face with vaping devices is over-consumption of nicotine, or continuous grazing; a cigarette has a natural ending, when it is burnt through, typically after 10-15 inhalations or about 3 minutes. But there is no equivalent end-point in a conventional liquid-based vaping device. But because of the accuracy with which this implementation can vary the setpoint temperature, it is possible to automatically increase the setpoint after a preset number of inhalations or time to signify to the user that a set number of inhalations have been made or that they have been vaping for a certain time, to help them avoid excessive use. For example, some users especially value the final inhalation of a cigarette, and they take particular pleasure in it; this system can mimic that user experience; for example, for every 10th inhalation, the setpoint temperature can be increased, giving a stronger, warmer inhalation, signalling to the user that this is a 10th inhalation and that the user can hence cease vaping, to mirror the experience of having consumed an entire cigarette. Alternatively, the user could set the device so that after a set time, for example after 5 minutes of regular vaping, the device generates a stronger, more potent inhalation. By experientially rewarding the user with a stronger, more potent inhalation, a user is more likely to accept that signal to stop vaping than if a non-reward signal (e.g. a haptic vibration) is provided.

Figure 3:
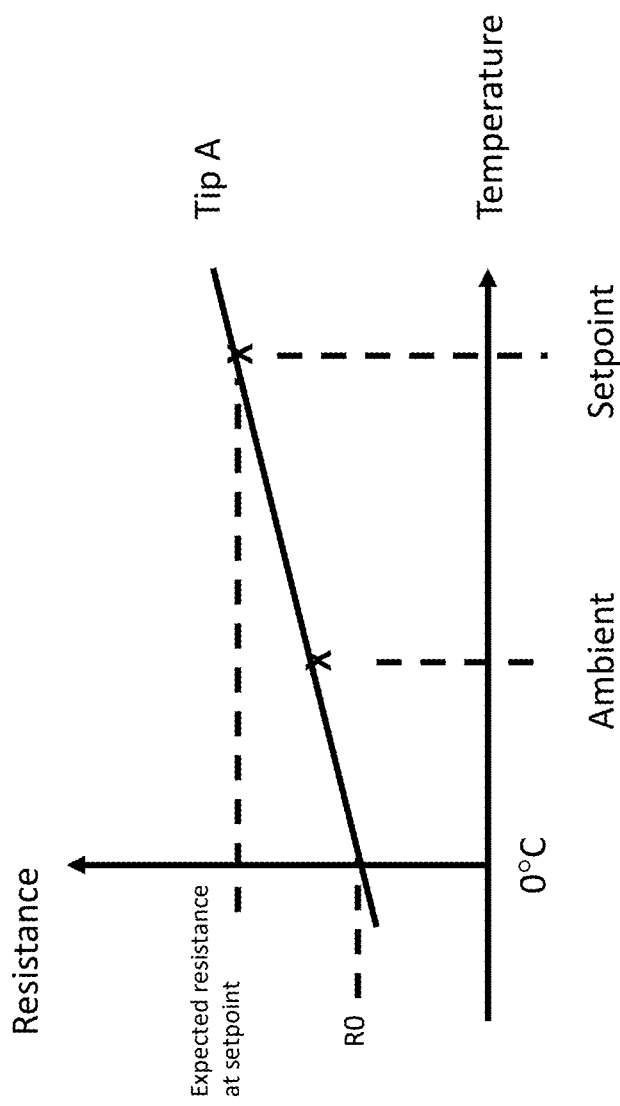

We return now to the explanation of the closed loop control algorithm: In addition to knowing the likely resistance for this specific tip (i.e. heating element) at the setpoint temperature, we can also infer, through linear extrapolation, as shown in FIG. 3, the likely resistance at some other temperature, which in the Ayr system we set at 0° C., and we call this resistance R0. We will see later that we use this R0 value to enable us to normalise the outputs from different heating elements—to in effect compensate for the fact that different heating elements can have different absolute values of resistance at the same temperature.

So R0 is a value of resistance for this specific heating element (e.g. coil/mesh/plate etc.) at 0° C. It could be any temperature, but we choose 0° C. Celsius for convenience and clarity. R0 gives us a stable point and should be consistent for this specific pod or heating element whatever the ambient temperature when creating the initial resistance data point and whatever the resistance v temperature behaviour is for that tip or heating element; as noted above, we will expand on why this is important later in this section.

As also noted above, a linear extrapolation of the resistance at the measured temperature to the resistance at 0° C. assumes that the actual relationship between temperature and resistance is linear. In fact, the relationship is slightly non-linear; we can capture that shape in a look-up table, populated with temperature/resistance pairs; this allow a more accurate R0 for each specific pod to be generated.

There is a further issue here: the heating element may not be at the same temperature as that measured in the PV (e.g. the tip might have been taken from a very warm storage area) so there is an extra check done to make sure that the heating element resistance is stable (and since it is now physically connected to the PV it should be at the same temperature as the PV) before we accept the new R0 value: specifically, we need 30 s of stable resistance measurements (not varying by more than say 1%) before we generate an R0 from those stable measurements.

We have now completed, in Steps 1-3, the automatic resistance v temperature characterisation of a specific tip or heating element (we will call this 'Tip A'). This process is repeated automatically for every tip or heating element. Different tips or heating elements have sufficiently different resistance v temperature behaviour; characterising each individual heating element significantly increases reduces the accuracy of the closed loop temperature control algorithm.

Step 4: We look now at what happens during a single puff or inhalation with this Tip A.

When the user sucks on the tip, that inhalation is detected (e.g. by a simple pressure drop sensor, or a more sophisticated MEMS based pressure sensor). The device then initiates a cycle of measurement and power application (using a PWM system) that repeats once every 16 ms. This 16 ms cycle is divided into 256 PWM timeslots; an ADC in the power management chip records the instantaneous V and I multiple times during each timeslot; the instantaneous resistance is calculated for each measurement (Ohm's law); the device takes 5 five of these sequential resistance measurements to generate an average resistance value.

So the device measures instantaneous V and I multiple times, across many of the 256 timeslots, whenever power is being supplied. We set a minimum number of timeslots during which measurement occurs; we currently use 11 timeslots, but this is determined by experimentation with each specific type of heating element.

Figure 4:
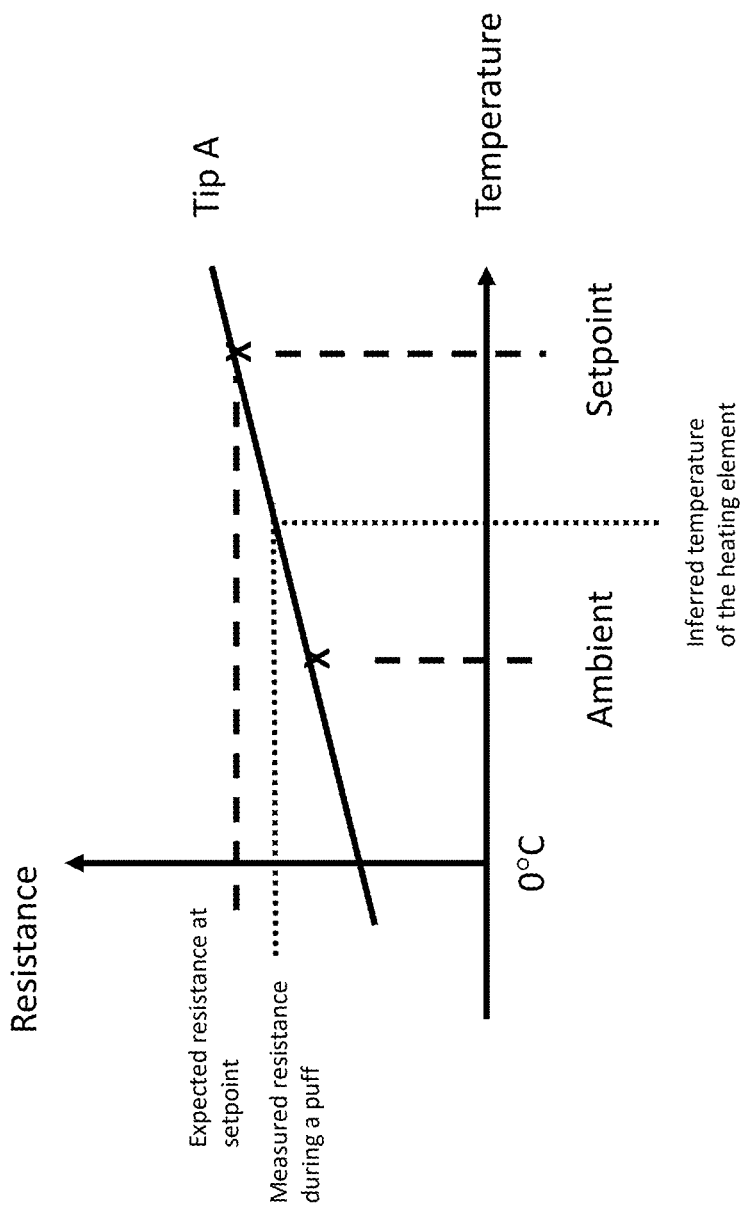

The timeslots used for measurement can be distributed across the entire 16 ms cycle; the timing of the instantaneous V and I measurement can be asynchronous with the timing of the timeslots. But the device is set to require 5 resistance measurements in a 16 ms cycle to generate a valid real-time resistance; from that valid real-time resistance the device infers the real-time temperature of the heating element, as shown in FIG. 4.

Figure 5:
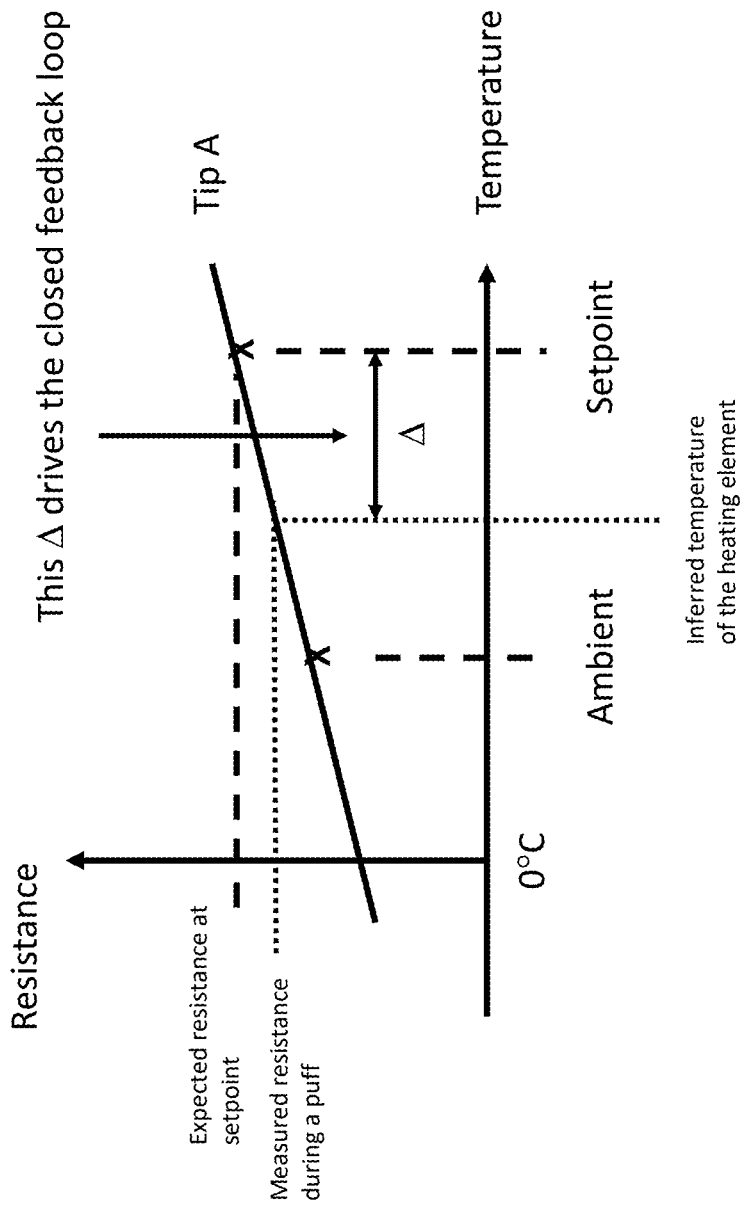

The calculation of how much power to be applied is determined by a PID closed loop temperature control algorithm; the inputs to the PID are the setpoint temperature and the inferred real-time temperature: the delta between these two determines how much power is delivered to the heating element through a PID based feedback controller, as shown in FIG. 5. The output of the PID controls the PWM duty cycle; the aim is to reach the required setpoint temperature within a fraction of a second, without greatly exceeding that temperature and to maintain the heating element at that temperature, for so long as the device is being inhaled from.

The name of the algorithm, PID, defines three different settings that are combined, proportional, integral and differential, to determine how the power to be applied is calculated. Integral is used to track slow changes to the coil/mesh/plate etc. resistance (e.g. when the coil/mesh/plate etc. is roughly at the right temperature); differential to track sudden or large changes (e.g. just when the user first puffs) and proportional to mix (smooth) the two. What tends to happen is that when the user first inhales and the temperature control algorithm starts, the device sees that the coil/mesh/plate is relatively cold, e.g. at ambient room temperature, and the PID output ensures that all of the 256 slots in each 16 ms cycle apply power, basically applying all the power available from the battery. After a few hundred milliseconds the temperature of the coil/mesh/plate approaches the set temperature and the PID output leads to backing off the number of slots in which power is applied, so a steady state is reached.

The PID calculation is optimised (typically through extensive empirical adjustments at design time with each new heating element design) to get the temperature to rise as steeply as possible without overshooting excessively, and then keeping it steady from there for the remaining duration of the puff to keep consistent vapour generation. So the power profile is a large spike at the start rising as rapidly as possible and then an exponential like decay to a steady state to maintain the temperature during the puff.

Alternatively, instead of using any of the 256 timeslots distributed across the entire set of 256 timeslots to measure the instantaneous resistance of the heating element, the device can be configured to use only a pre-defined set of the timeslots specifically to measure the atomiser temperature: for example, the algorithm could use the first x slots (11 is likely to be the minimum for most heating element designs) could be used to take a single (indirect) measurement of the temperature of the coil/mesh/plate, using the instantaneous V and I data from the ADC in the power management chip, from which resistance is calculated, and from which temperature is inferred. This x number can change depending on how accurate we want the measurement to be, but we try to keep it as small as possible since measuring the resistance is done by passing current through the heating element, which therefore heats it up; the remaining 245 slots will have power applied or not dependent on how much and how quickly we want the coil/mesh/plate to heat up. So this means that during a puff we are checking the temperature of the coil/mesh/plate once every 16 ms.

Irrespective of how the V/I measurement is done across the timeslots, if the measured real-time resistance suggests that the actual heating element temperature is much less than the temperature setpoint, then the PID alters the PWM duty cycle to use all of the available timeslots to apply power. The number of slots used to apply power gradually decreases each cycle as we approach the setpoint temperature; in a typical steady state, approximately 100-200 slots per 16 ms cycle are used to maintain the temperature of the heating element at the setpoint.

At the end of each 16 ms cycle, a final set of 5 resistance measurements are taken to generate an average resistance that is used by the PID closed loop temperature control algorithm to set an initial real-time temperature for the next cycle.

Figure 6:
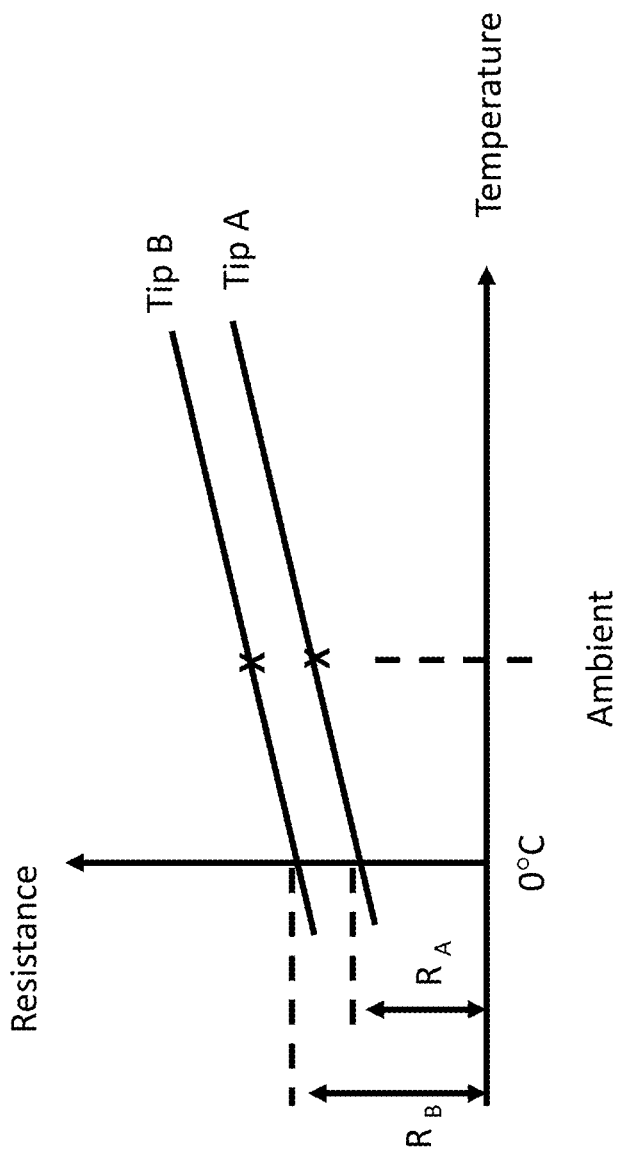

We explained earlier that different heating elements can have different resistance v temperature graphs—i.e. lines that are parallel but have different Y-axis intercepts. Recall that we measure the resistance for all tips or heating elements at a known (or assumed) temperature, typically ambient. For each tip or heating element, the device extrapolates back to what the resistance of each tip would be at a fixed temperature; we use 0° C. but other temperatures could be used. We then characterise the resistance of each tip at this fixed temperature—e.g. for Tip A, it is RA at 0° C. and for Tip B, it is RB at 0° C., as shown in FIG. 6.

Figure 7:
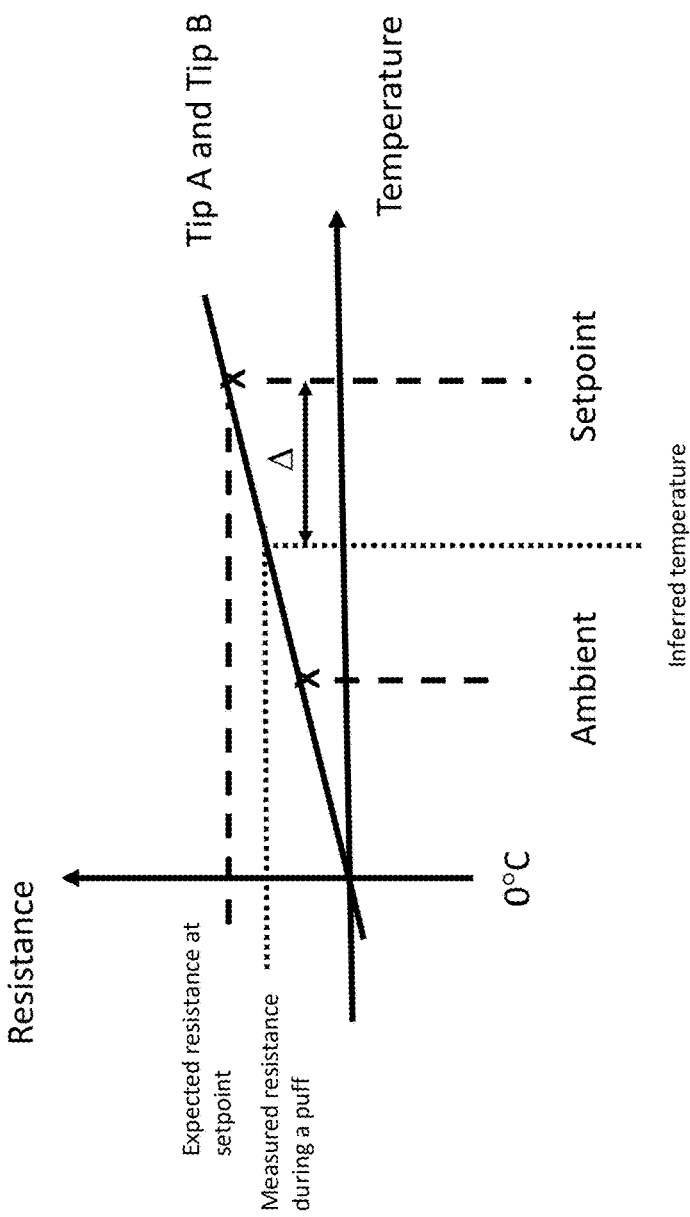

We now need to normalise across all tips or heating elements, so that the actual inferred, real-time temperatures sent to the PID by each TIP are consistent with each other—i.e. takes into account that different tips have different resistance v temperature Y-axis intercepts and eliminate that inconsistency. We do this by subtracting the R0 value for each tip or heating elements from the measured resistance for that tip. So for Tip A, we subtract RA and for Tip B, we subtract RB. The effect is to move the Y-intercept for each line down so that both pass through the same resistance value at 0° C., as shown in FIG. 7. For Tip B, we move it down more than for Tip A, since RB is larger than RA.

So it is in practice this normalised inferred temperature that is sent to the PID; this ensures that we can measure the effectiveness of the temperature control algorithm across different heating elements (e.g. accuracy in maintaining the setpoint temperature; the level and consistency of nicotine or other substance vaporisation; the absence of any burning taste in the vapor), whilst taking into account the inherent variability in the resistance v temperature response of each individual tip or heating elements.

Section a, Part II: Dual Control Loop Approach

With some designs of heating element or atomiser, the closed loop temperature control algorithm described above can prove to be insufficiently accurate; that can apply, for example where the heating element has a very low thermal mass, and/or for example where the heating plate can during normal operation significantly heat the liquid stored in a liquid reservoir (the stored liquid is typically in thermal contact with the heating element, but has to pass through a porous material to physically reach the heating element) leading to a complex and difficult to model overall thermal system, with potentially highly localised liquid-gas phase transitions.

For that sort of very complex environment (i.e. an environment that is difficult to model and control, rather than being necessarily physically complex), we use the closed loop temperature control algorithm described above, but supplement it with an additional closed loop control system; it is a dual control loop system.

The dual control loop system is not limited to complex environments; it is also especially useful in low-cost disposable vaping devices, since it enables high levels of consistent and safe performance to be achieved, even using low cost conventional heating elements such as simple coils wound on cotton or ceramic, or mesh elements inside concentric foam surrounds, or thin, planar stainless steel heating plates.

It is also especially useful in liquid re-fillable devices that can be automatically re-filled at a desktop dock or case (such as disclosed in PCT/GB2019/052922 and Section E below) because, not only does it enable high levels of consistent and safe performance to be achieved, but it can significantly enhance the lifetime of the heating element used (even low cost heating elements like simple coil systems or thin, planar stainless steel heating plates or meshes) because it eliminates the excessively high heating element temperatures that can lead to the creation of residues (these can appear as baked-on dark brown residues) that significantly reduce the lifetime of the heating element. For example, a typical heating element in a conventional PV tip might last for 300 puffs before its performance degrades below an acceptable threshold. With the dual control loop system described in this section, it is possible for the same heating element to last in excess of 2000 puffs. That in turn has a major impact on the economics of the re-fillable system: the main consumable is the liquid re-fill bottle (typically a 10 ml bottle, where compliance with EU law is mandated); as this can be a simple polypropylene or glass blown bottle, it is very cheap to manufacture; it makes this auto re-fillable system the most cost efficient and hence profitable way to supply liquid nicotine. A secondary consumable is the tip; each tip can last potentially ten times longer than a conventional tip if the dual loop system is used. That translates in practice to one 10 ml bottle, plus 1 tip, replacing thirty or more conventional pre-filled tips, each with sub-2 mL liquid capacity, or 5 complete 1-piece disposable PVs. The environmental and sustainability advantages are very significant.

In one implementation, the closed loop temperature control algorithm described above in Part I remains as the inner control loop, attempting to regulate the duty cycle in each 16 ms group of 256 timeslots, but it is now supplemented with an outer control loop, which is a PID closed loop power control algorithm.

In this outer control loop, the system can regulate for example to a power setpoint (e.g. an average power per puff), as opposed to the temperature setpoint used in the inner control loop. The system measures the average power in a puff, and if the average power is below the power setpoint, then the system increases the temperature setpoint used by the inner control loop, the closed loop temperature control algorithm, for the next puff. During this next puff, the closed loop temperature control algorithm operates to increase the duty cycle. The system again measures the average power in this next puff and if the average power is below the power setpoint, then the system automatically increases the temperature setpoint for the following puff; if the average power is above the power setpoint, then the system automatically decreases the temperature setpoint for the following puff.

We calculate the average power as follows. The system again use the instantaneous V and I generated by the system MCU for each timeslot that power is delivered; the system calculates instantaneous power (V×I) a number of times for a defined period (e.g. an entire single puff, or some other amount, e.g. a 16 ms cycle, or a set number of 16 ms cycles).

Example: Assume that the power target or setpoint is 7.2 W; if the actual average power used is less over a single puff (or other defined period), by an amount we call the power 'error', then we increase the temperature setpoint measured in Celsius, in the inner temperature control loop described above, by a factor, Kp, for example 5 times the power 'error'. Note that the size of this Kp factor is typically found through testing and experimentation and is dependent on the specific design of heating element.

So if the measured average power over a puff is 7.0 W, so that the power error is 0.2 W, then we increase the temperature setpoint by 5×0.2, i.e. 1° C. for the next puff (or another period). If the temperature setpoint was originally 270° C., then it will now be set to 271° C. for the next puff. If the measured average power over a puff is 8.0 W, then the power error is 0.8 W, and we decrease the temperature setpoint by 5×0.8, i.e. 4° C., or 264° C. for the next puff.

Note that the temperature setpoint can be set at the level deemed necessary to deliver a target amount of nicotine; a PV could hence be able to switch between different temperature setpoints, to deliver different nicotine strengths (with a higher temperature setpoint delivering more nicotine).

The system also limits expected temperature setpoint in an acceptable range:
Below 280° C.: To prevent burning.
Above 200/220° C.: To ensure that liquid is vapourised.
Note also that there is no need for any dry vape detection in this system: even in the dry vape condition, the control loops operate in exactly the same way as they do whilst e-liquid is present, i.e. to simply maintain the heating element at the setpoint temperature (done for each 16 ms cycle rate) and the power at the setpoint power (done for each puff): there is no temperature spike (often well in excess of 400° C.) that occurs in a dry vape condition with a conventional system that simply delivers a constant power amount, irrespective of how hot the atomiser is getting.

In the description above, we describe the closed loop power control algorithm using the average power per puff. Finer granularity and control can be possible if the power over a smaller amount of time, less than a single puff, or other quantity (e.g. a fixed number of timeslots or complete 16 ms cycles) is used in the closed loop power control algorithm.

Figure 8A:
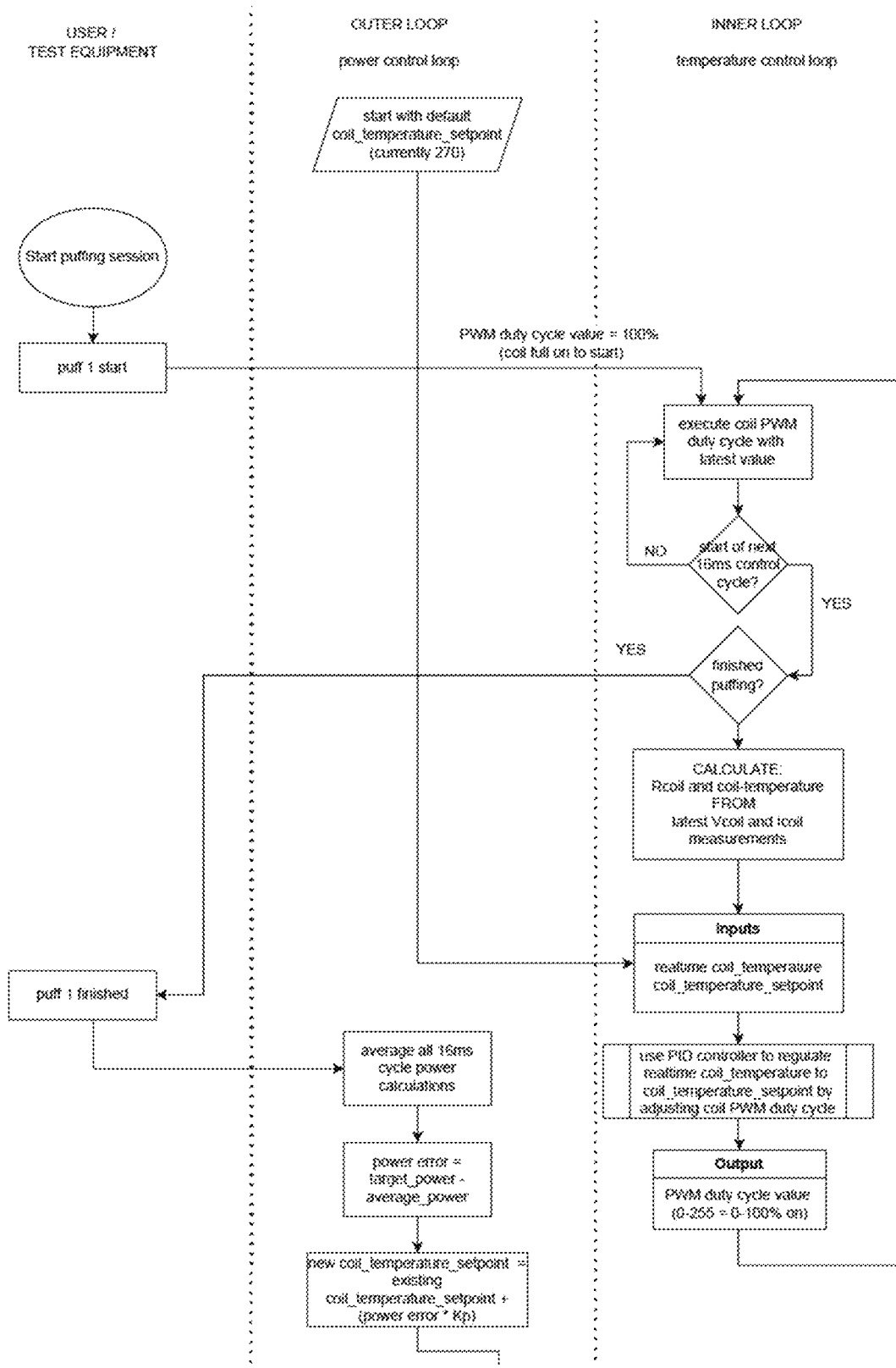
FIG. 8A-8B are a flow chart showing the logical operations taken to enable the heating element to be controlled using dual loop, closed loop temperature control.
Figure 8B:
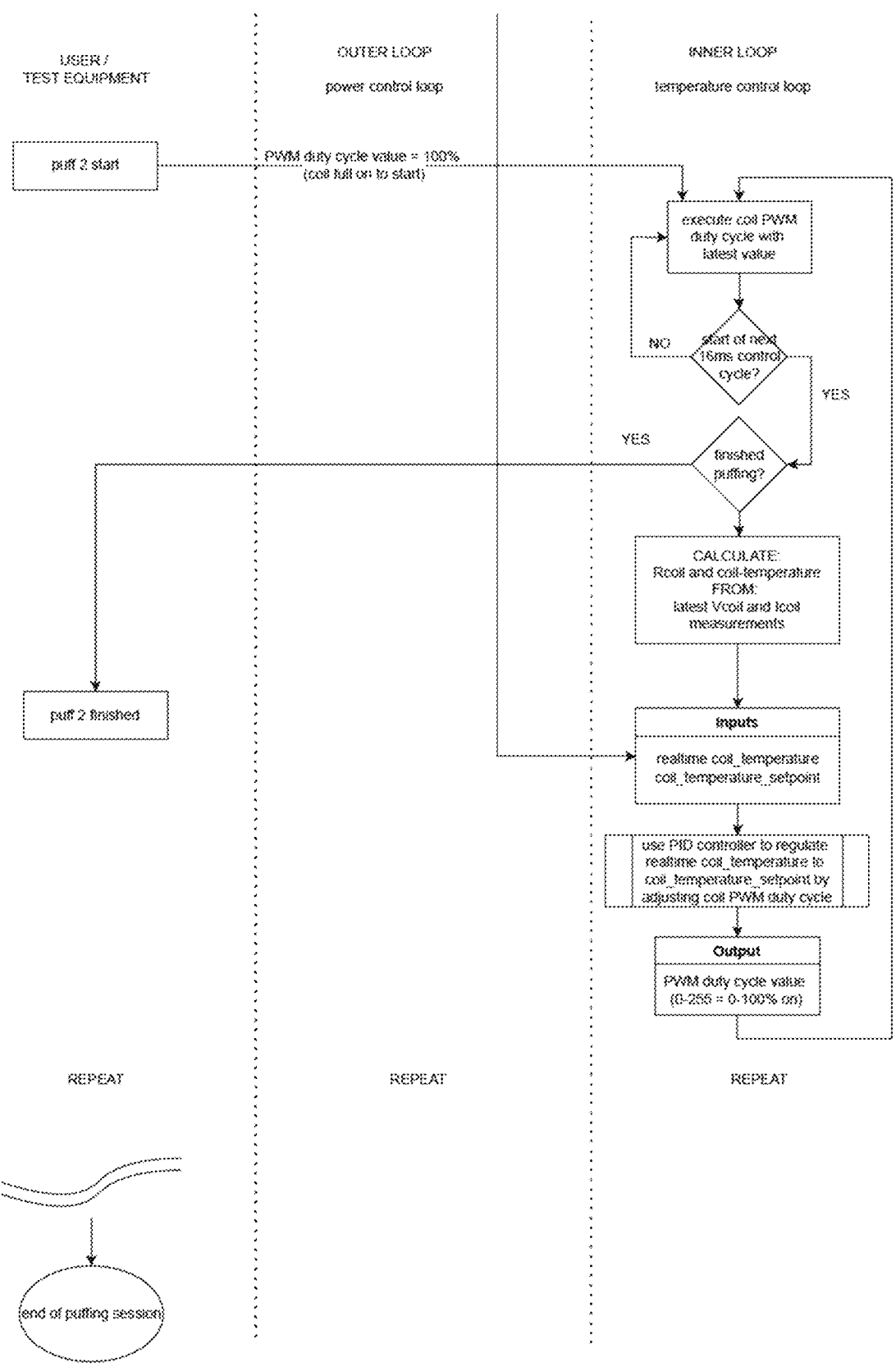

The dual loop control system is shown in FIG. 8A and FIG. 8B.

Previously, we have described and defined a dual loop control system; note that control loops with two, three or more control loops are within the scope of this definition. We have also focused on nicotine. We have also used the term 'liquid': this term includes liquids such as propylene glycol and vegetable glycerine based liquids, as well as oils (often used for cannabis-based vaping), or any other state or form of atomisable substance, including the complex mix of plant leaf and binders used in heat-not-burn systems.

In one implementation, the system dynamically controls the thermal profile (e.g. a variable temperature setpoint and/or power setpoint) over the course of a single puff or inhalation (or 'hit'). The thermal profile can be controlled to optimise any one or more of the following: flavour and/or does and/or intensity and/or vapour density and/or plume size and/or overall experience, taking into account user preferences and/or liquid supplier preferences. This can be especially useful when vaping cannabis oils, where the thermal profile can be optimised for the specific blend of terpenes in the liquid and their different activation temperatures, or the user experience that is desired, such as relaxation, pain control, appetite control, anxiety, physical performance, mental performance, which may itself be realised by optimally heating the liquid in a way that optimises different terpenes, taking into account their specific activation temperatures.

Similarly, the system can control the thermal profile (e.g. the temperature setpoint and/or power setpoint) over the course of a session of puffs or inhalations; for example, the thermal profile could be managed to provide an initial high intensity (e.g. a higher temperature setpoint and/or power setpoint than a baseline), gradually reducing over the course of say ten puffs to the normal intensity, and then rising again for the final puff. Or the thermal profile (and hence intensity profile) could be set to start low, and then increase to a peak towards the middle of the session, and then decrease to the end of the session. Or the thermal profile could be set to alter in a way that ensures consistency of experience over the course of the session; for example, as the liquid heats up over the course of a session of rapid, intense inhalations, some liquids and/or atomiser designs may have significant thermal inertia, in which case it may be necessary or desirable to gradually lower the temperature setpoint and/or power setpoint over the course of a session to ensure that there is no over-heating and instead a consistent level of intensity is enjoyed over the course of the entire session.

In addition, conventional disposable vaping devices are often characterised by good flavour for the first ten or twenty puffs, rapidly diminishing in flavour for subsequent puffs; with the implementation described here, the device can provide consistent flavour over potentially hundreds of puffs by automatically compensating for factors that would otherwise diminish flavour after the first ten or twenty puffs.

Also, conventional disposables are often characterised by very high concentrations of flavourings, which may have negative toxicology implications; this is sometimes done to over-compensate for the rapid degradation in the performance of the heating element, which can be associated with the rapid build-up of residue on the heating element because the heating element is getting too hot. With the implementation described here, the device can provide consistently high quality flavour without the need to use the high concentrations of flavourings that are conventionally adopted.

Different users will find different experience profiles satisfying their needs; equally the same user might wish to alter the intensity profile for different sessions. This degree of control is especially useful when vaping cannabinoids, and whenever personalisation to a user's specific preferences is desirable.

Further, the system can also control the thermal profile over the duration of a multi-week cessation program, gradually reducing the intensity of nicotine, CBD, THC etc (or other relevant parameter) to ease the transition away from dependency.

Because the present system is software implemented in the vaping device, it is readily possible to set and to alter the control scheme (e.g. the temperature setpoint and/or power setpoint or any other parameters that affect the operation of the control loop or loops).

Setting the control scheme for specific types of liquids can be done by writing the control scheme to a chip or memory that could be (i) on the device, or (ii) on a pre-filled pod or tip that contains the liquid and is designed to fit on the end of a PV or (iii) a pre-filled liquid bottle that is used to automatically replenish the liquid in a pod or tip at the end of a PV. Alteration can be done on the vaping device itself by the end-user, where the device includes some sort of user interface, or via a connected smartphone app.

Figure 9:
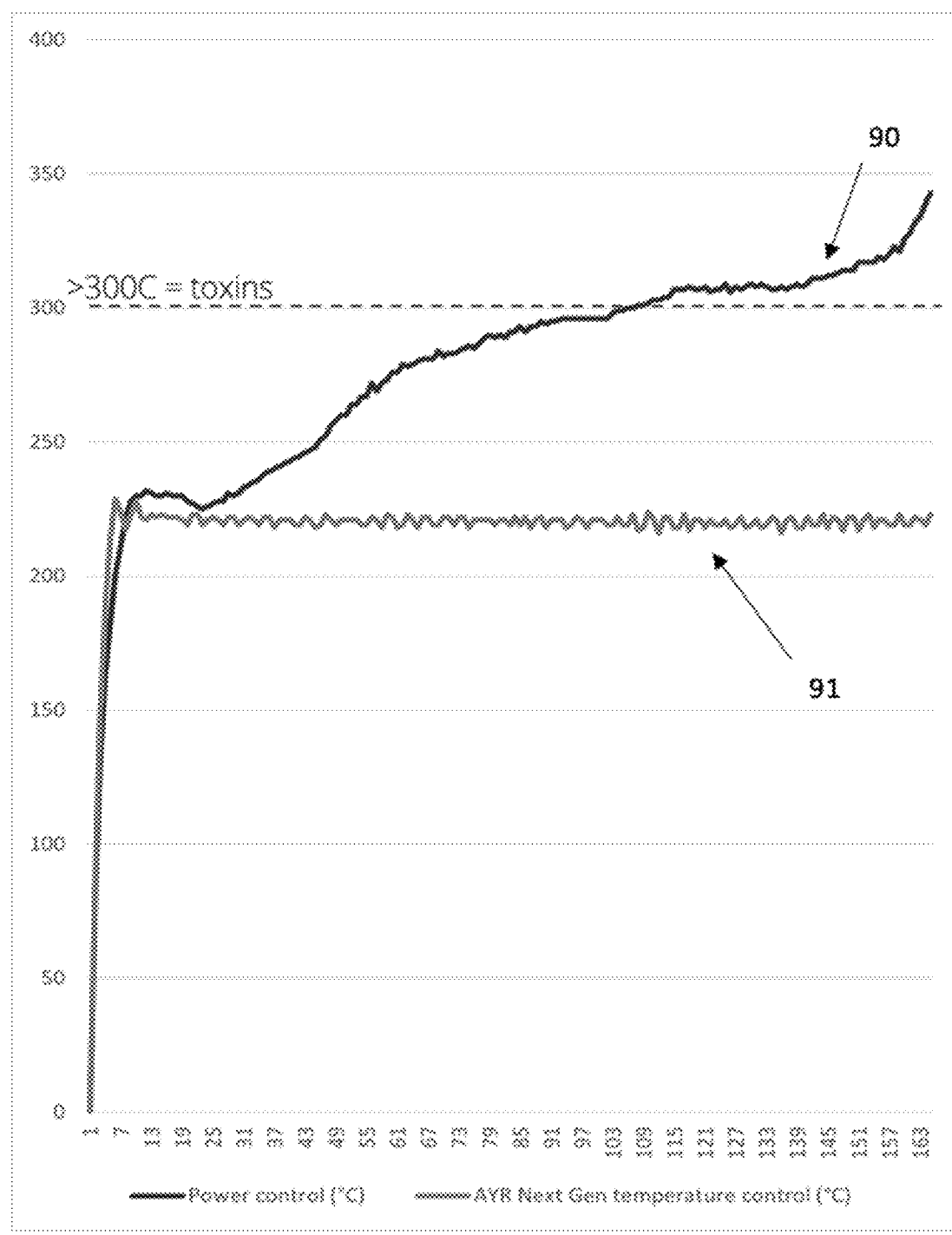
FIG. 9 is a temp v time graph showing the temperature of a heating element over time for a conventional fixed-power system (the darker line that rises steeply) and for an implementation of a dual loop, closed loop temperature control system (the lighter line that remains steady).

FIG. 9 shows how the dual loop control system performs in practice. The darker line 90 shows the temperature of a heating element (temperature is on the y-axis) over a single puff or inhalation using a conventional control scheme that delivers constant power (6.4 W) to the heating element. During the course of the puff, the temperature of the heating element rises rapidly at first, and continues to rise for the duration of the inhalation, rising above a 300 C level that is above the normal safety threshold. The heating element temperature is not only not constant, but varies from puff to puff (not shown). The lighter line 91 shows the temperature of the heating element when implementing one of the dual loop temperature control approaches described above: as is clear, the temperature of the heating element rises rapidly to the target temperature, in this case 220 C, and is kept constant at that temperature throughout the puff. At no time does the temperature rise to a level at which safety might be compromised.

We can summarise the performance advantages of the dual loop temperature control approach compared to a conventional approach as follows:
 no burning; no carbonyls and no aldehydes
 better vapour output (e.g. higher nicotine content)
 better consistency per puff (e.g. consistent user experience per puff)
 works on any length of puff and dynamically adapts to the user's requirements or profile over a single puff and/or a session of puffs.
 works with low cost stainless steel acid-etched atomisers, with cotton wicks or foam wicks.
 works across a broad range of other materials too-wherever we have a sufficient temperature coefficient of resistivity. Materials include: SS 304, SS 316, S 316L, SS 321, SS 430, SS904L, gold, silver, copper, titanium, tungsten, nickel Ni200, NiFe 30, Invar 36, Nickel D H, Nifethal 70, Nifethal 50, Zirconium. Materials may also extend to graphene and other carbon-based materials.
 software implemented: low cost to implement, fast to modify.
 most vaporisers can implement the software at no additional material cost.
 can be implemented in a typical pod-based vaping device, e.g. where the pods are supplied to the end-user pre-filled with liquid and the vaping device battery is a rechargeable battery; the user replaces the pods when empty with a fresh pod, factory filled with liquid, and regularly recharges the battery. With the temperature control system described above, the lifetime of the heating element in a typical pod can be extended from just a few hundred puffs to many thousands of puffs, in turn enabling those pods to be re-filled many times using the automatic liquid re-filling system described in PCT/GB2019/052922.
 can also be implemented in a low-cost, single use, 1-piece disposable device, enhancing the safety of those devices and also increasing the lifetime of the heating elements used in those devices.
 can also be implemented in 1-piece disposable vaping devices that are re-filled and re-used many times (see Section B below), greatly reducing the environmental harms caused.
 enables a user to select the vapour output (eco, low, medium, high etc)
 enables the device to automatically implement different vapour output profiles (e.g. high for the initial puff, high for the 10th puff etc.)
 enables the device to automatically optimise heating element temperature for the specific liquid used, taking into account one or more of the following: flavour, whether salt-based, PV/VG proportions, to deliver an optimal user experience.
 enables the device to provide consistent, high quality flavour over potentially hundreds of puffs.
 enables the device to provide consistent, high quality flavour without the need for excessively high concentrations of flavourings.
 enables the device to automatically increase or alter the temperature of the heating element after a set number of inhalations or a set time to provide a signal to the user to indicate nicotine consumption, e.g. to nudge the user to stopping use of the device with a 'reward' inhalation.
 readily tuned or adjusted for CBD, THC and specific cannabinoids (e.g. tuning the temperature of the heating element to drive evaporation of different terpenes for different purposes; the temperature could be fixed or vary at different moments during a puff or a sequence of puffs)

Section A, Part III: Summary of the Key Features of Dual Loop and Closed Loop Temperature Control Implementations of the invention use one or more of the following Key Features. Note that any one or more Key Features can be combined with one another when they are compatible and that any one or more optional features can be combined with any one or more other compatible optional features another and with any one or more Key Features, when compatible.

We organise these Key Features into two groupings: first, A. Dual Loop Key Features, and then secondly B. Closed Loop Temperature Control Algorithm Key Features.

In Summary:

A. Dual Loop Key Features

Key Feature 1: Temp control is handled by the inner control loop and power control is handled by the outer control loop.

Key Feature 2: Inner and outer dual loop control system

Key Feature 3: Independent dual loop control system

Key Feature 4: Dual loop control system, with error correction

Key Feature 5: Dual loop control system, with liquid temperature rise compensation.

Key Feature 6: Disposable PV with dual loop control

Key Feature 7: Re-fillable PV with dual loop control

Key Feature 8: Replaceable tip PV with dual loop control

Key Feature 9: Control system implementing dual loop control.

Key Feature 10: Method of enhancing performance of a vaping device using dual loop control.

B. Closed Loop Temperature Control Algorithm Key Features

Key Feature 11: PV automatically measures the resistance of the heating element in that PV.

Key Feature 12: PV automatically measures the ambient temperature.

Key Feature 13: PV automatically normalises resistance data to be consistent across different heating elements.

Key Feature 14: PV automatically infers the resistance value of the heating element at 0° C.

Key Feature 15: The closed loop temperature control algorithm compensates for the resistance v temperature variability of different heating elements.

We will look now in detail at each of these Key Features. Note that any of these Key Features can be combined with any one or more, other compatible Key Features.

A. Dual Loop Key Features

Key Feature 1: Inner and Outer Dual Loop Control System

The dual loop control system uses, as one loop, a closed loop temperature control algorithm (which uses the measured/inferred heating element temperature and also the setpoint temperature as control inputs), and also uses a second control loop that does not use temperature as a control input.

We can Generalise to:

A vaping system including a microcontroller or chip programmed with a closed loop temperature control algorithm configured to regulate the PWM duty cycle for the power delivered to a heating element configured to generate inhalable vapor;

in which the microcontroller or chip is also programmed with a second closed loop control algorithm, taking as an input a parameter other than temperature, and operating as a second control loop.

Optional Features the closed loop temperature control algorithm is an inner loop and the closed loop control algorithm is the outer loop.

the closed loop control algorithm is an outer loop and the closed loop power control algorithm is the inner loop.

Key Feature 2: Temp Control is Handled by the Inner Control Loop and Power Control is Handled by a Second Control Loop.

The second control loop can use power as a control input (e.g. using measured/inferred power and a power setpoint as the control inputs).

We can Generalise to:

A vaping system including a microcontroller or chip programmed with a closed loop temperature control algorithm configured to regulate the PWM duty cycle for the power delivered to a heating element configured to generate inhalable vapor;

in which the microcontroller or chip is also programmed with a closed loop power control algorithm, operating as a second control loop.

Optional Features the closed loop temperature control algorithm is an inner loop and the closed loop power control algorithm is the outer loop.

the closed loop temperature control algorithm is an outer loop and the closed loop power control algorithm is the inner loop.

Key Feature 3: Independent Dual Loop Control System

The second control loop (e.g., but not limited to, a power control loop) can be independent of the closed loop temperature control and provide an output or signal that is used by the closed loop temperature control loop.

We can Generalise to:

A vaping system including a microcontroller or chip programmed with a closed loop temperature control algorithm configured to regulate the PWM duty cycle for the power delivered to a heating element configured to generate inhalable vapor;

in which the microcontroller or chip is also programmed with a second closed loop control algorithm, that is configured to operate as an independent control loop to the closed loop temperature control algorithm and to generate an output that is used by the closed loop temperature control algorithm.

Optional Features the closed loop temperature control algorithm is an inner loop and the closed loop control algorithm is the outer loop.

Key Feature 4: Dual Loop Control System, with Error Correction

The closed loop temperature control algorithm may in practice not be sufficiently accurate or consistent, or deliver high enough levels of nicotine (or other substances); then, the second closed loop control algorithm can correct errors in the tracking of the setpoint temperature.

We can Generalise to:

vaping system including a microcontroller or chip programmed with a closed loop temperature control algorithm configured to regulate the PWM duty cycle for the power delivered to a heating element configured to generate inhalable vapor;

in which the microcontroller or chip is also programmed with a second closed loop control algorithm;

and in which the closed loop temperature control algorithm operates to track the setpoint temperature of the heating element and the second closed loop control algorithm operates to correct an error in the tracking of the setpoint temperature by the closed loop temperature control algorithm.

Optional Features the closed loop temperature control algorithm is an inner loop and the closed loop control algorithm is the outer loop.

Key Feature 5: Dual Loop Control System, with Liquid Temperature Rise Compensation In Key Feature 4, we noted that the closed loop temperature control algorithm might in practice not be sufficiently accurate or consistent, or deliver high enough levels of nicotine (or other substances);

this might occur where the rise in the temperature of stored atomisable liquid, in thermal contact with the heating element, is not sufficiently factored into the operation of the closed loop temperature control algorithm alone.

We can Generalise to:

A vaping system including a microcontroller or chip programmed with a closed loop temperature control algorithm configured to regulate the PWM duty cycle for the power delivered to a heating element configured to generate inhalable vapor;

in which the microcontroller or chip is also programmed with a second closed loop control algorithm;

and in which the second closed loop control algorithm operates to correct errors or inaccuracies in temperature tracking by the closed loop temperature control algorithm arising from a rise in the temperature of stored atomisable liquid, in thermal contact with the heating element.

Optional Features the closed loop temperature control algorithm is an inner loop and the closed loop control algorithm is the outer loop.

Key Feature 6: Disposable PV with Dual Loop Control

One important PV form factor that can implement the invention is the disposable vaping device, such as conventional disposable vaping device (sold pre-filed and not re-fillable or re-chargeable) and also the disposable vaping device described in Section B which is both re-fillable and re-chargeable (the 1 piece refillable tube or bar and the 1 piece refillable box or bottle format disposable vaping devices).

We can Generalise to:

A disposable vaping device including a microcontroller or chip programmed with a closed loop temperature control algorithm configured to regulate the PWM duty cycle for the power delivered to a heating element in the device, the heating element being configured to generate inhalable vapor;

the device further including a liquid reservoir that is (i) configured to provide atomisable liquid to the heating element and (ii) is not user-replaceable;

and in which the microcontroller or chip is also programmed with a closed loop power control algorithm, operating as the outer loop to the closed loop temperature control algorithm.

Optional Features the liquid reservoir is configured to be user-refillable (e.g. includes a liquid refilling port).

the disposable vaping device includes a battery configured to be user re-chargeable (e.g. includes external electrical contacts that lead to the battery)

the disposable vaping device includes a battery re-charger circuit.

the liquid reservoir is configured to not be user-refillable (e.g. includes no liquid refilling port)

the disposable vaping device includes a battery configured to not be user re-chargeable (e.g. includes no external electrical contacts that lead to the battery and no battery re-charger circuit)

Key Feature 7: Re-Fillable PV with Dual Loop Control

Another important PV form factor that can implement the invention is the automatically re-fillable vaping device.

We can Generalise to:

A re-fillable vaping device including a microcontroller or chip programmed with a closed loop temperature control algorithm configured to regulate the PWM duty cycle for the power delivered to a heating element in the device, the atomising element being configured to generate inhalable vapor;

the device further including a liquid reservoir that is configured to provide atomisable liquid to the heating element and is automatically refillable with liquid from an additional, external liquid tank, bottle or re-fill container;

and in which the microcontroller or chip is also programmed with a closed loop power control algorithm, operating as the outer loop to the closed loop temperature control algorithm.

Key Feature 8: Replaceable Tip PV with Dual Loop Control

Another important PV form factor that can implement the invention is a PV with a user replaceable, pre-filled tip.

We can Generalise to:

A vaping device including a microcontroller or chip programmed with a closed loop temperature control algorithm configured to regulate the PWM duty cycle for the power delivered to a heating element in the device, the atomising element being configured to generate inhalable vapor;

in which the device includes a liquid reservoir that is configured to provide atomisable liquid to the heating element and is user-replaceable but not user-refillable;

in which the microcontroller or chip is also programmed with a closed loop power control algorithm, operating as the outer loop to the closed loop temperature control algorithm.

Key Feature 9: Control System Implementing Dual Loop Control

Another aspect is the control system.

We can Generalise to:

A control system for a vaping device, the control system comprising a microcontroller or chip programmed with a closed loop temperature control algorithm configured to regulate the PWM duty cycle for the power delivered to a heating element in the device, the heating element being configured to generate inhalable vapor;

in which the device includes a liquid reservoir that is configured to provide atomisable liquid to the heating element;

and in which the microcontroller or chip is also programmed with a closed loop power control algorithm, operating as the outer loop to the closed loop temperature control algorithm.

Key Feature 10: Method of Enhancing Performance of a Vaping Device Using Dual Loop Control A final aspect is a method of enhancing the performance of a vaping device.

We can Generalise to:

A method of enhancing the performance of a vaping device, the method comprising the steps of:

(a) using a microcontroller or chip, in the device, programmed with a closed loop temperature control algorithm configured to regulate the PWM duty cycle for the power delivered to a heating element in the device, the heating element being configured to generate inhalable vapor; the device including a liquid reservoir that is configured to provide atomisable liquid to the heating element;

in which the microcontroller or chip is also programmed with a closed loop power control algorithm, operating as the outer loop to the closed loop temperature control algorithm.

Optional features for Key Feature 10. Note that any of these optional features can also be combined with any one or more, other compatible optional features.

enhancing performance includes enhancing the number of puffs the heating element can provide, compared with a vaping device that does not implement the method.

enhancing performance includes enhancing the maintenance of the real-time temperature to the setpoint temperature, compared with a vaping device that does not implement the method.

enhancing performance includes improving the amount of nicotine or other substance per puff, compared with a vaping device that does not implement the method.

enhancing performance includes improving the stability or consistency of the level of nicotine or other substance per puff, compared with a vaping device that does not implement the method.

enhancing performance includes eliminating any burning taste from the inhaled vapour, compared with a vaping device that does not implement the method.

enhancing performance includes reducing the power consumption and hence extending the amount of use a charged battery can provide, compared with a vaping device that does not implement the method.

enhancing performance includes reducing the power consumption and hence enabling a smaller batter to be used, compared with a vaping device that does not implement the method.

enhancing performance includes maintaining the flavour of the vapour for more puffs compared with a vaping device that does not implement the method.

enhancing performance includes generating flavour for the vapour with a lower concentration of flavourings compared with a vaping device that does not implement the method.

Optional features for any one or more Dual Loop Key Features (Key Features 1-10 above). Note that any of these optional features can also be combined with any one or more, other compatible optional features.

the outer control loop automatically regulates to a power setpoint.

the power setpoint is an average power per puff or other parameter, such as a part of a puff, a 16 ms cycle, or a set number of 16 ms cycles.

the system measures the average power in a puff or other parameter, and if the average is below the power setpoint, then the system automatically increases the temperature setpoint used by the inner control loop, the closed loop temperature control algorithm, for the next puff or other quantity.

during this next puff or other parameter, the closed loop temperature control algorithm operates to increase the duty cycle and the system again measures the average power in this next puff or other parameter and if the average power is below the power setpoint, then the system increases the temperature setpoint for the following puff or other parameter; and if the average power is above the power setpoint, then the system decreases the temperature setpoint for the following puff or other parameter.

the system calculates the average power by using the instantaneous V and I generated by a system MCU for one or more timeslots during which power is delivered;

the system calculates instantaneous power (V×I) a number of times for a defined period, such as for an entire single puff, or some other parameter, e.g. a part of a puff, a 16 ms cycle, or a set number of 16 ms cycles.

if the actual average power used is less over a single puff, or other parameter, by an amount, referred to as the power 'error', then the system increases the temperature setpoint, in the inner temperature control loop, by a pre-set factor, $K_p$.

The size of this $K_p$ factor is found through testing and experimentation and is dependent on the specific design of heating element.

$K_p$, is 5

$K_p$, is between 2 and 10

The system is configured to limit expected temperature setpoint in an acceptable range:
Below 280° C.: Prevent burning.
Above 200/220° C.: To ensure liquid is vapourised.

The Heating Element the heating element is a resistance based heating element with a known or measurable temperature coefficient of resistivity.

the heating element includes a resistance based heating coil, mesh or layer.

the heating element includes a resistance based heating coil, mesh or layer contacting a porous substance, such as a ceramic or foam.

the heating element includes a resistance based heating flat plate or cylindrical mesh.

the heating element includes a resistance based heating flat, stainless steel plate made of 316L stainless steel.

Closed Loop Temperature Control the setpoint/target temperature and the current or real-time temperature are used as inputs to a PID controller, where the PID controller alters the PWM duty cycle of the power delivered to the atomising element so that the real-time temperature of the atomising element automatically tracks the setpoint temperature.

the setpoint/target temperature is user configurable.

the setpoint/target temperature is user configurable and/or factory configurable to be appropriate for different types of atomisable liquids, such as a lower temperature for CBD and THC and a higher temperature for nicotine.

the setpoint/target temperature is user configurable to control the strength or level of the substance being vaped, e.g. nicotine or CBD.

the setpoint/target temperature is user configurable to control the density or extent of the vapor cloud generated.

the system has no dry vape detection process.

the system has no process for determining liquid level of the liquid feeding the atomising element.

Form Factor the vaping system is a disposable non-re-fillable, non-rechargeable vaping device.

the vaping system is a re-fillable and re-chargeable disposable vaping device, one example of which is described in Section B (e.g. the 1 piece refillable tube or bar format device or the 1 piece refillable box or bottle format device)

the vaping system is an automatically re-fillable vaping device.

the vaping system is not a 1-piece device but includes a user-replaceable tip.

Advantages
- no burning; no carbonyls and no aldehydes
- better vapour output (e.g. higher nicotine content)
- better consistency per puff (e.g. consistent user experience per puff)
- works on any length of puff and dynamically adapts to the user's requirements or profile over a single puff and/or a session of puffs.
- works with low cost stainless steel acid-etched atomisers, with cotton wicks or foam wicks.
- works across a broad range of other materials too-wherever we have a sufficient temperature coefficient of resistivity. Materials include: SS 304, SS 316, S 316L, SS 321, SS 430, SS904L, gold, silver, copper, titanium, tungsten, nickel Ni200, NiFe 30, Invar 36, Nickel DH, Nifethal 70, Nifethal 50, Zirconium. Materials may also extend to graphene and other carbon-based materials.
- software implemented: low cost to implement, fast to modify.
- most vaporisers can implement the software at no additional material cost.
- can be implemented in a typical pod-based vaping device, e.g. where the pods are supplied to the end-user pre-filled with liquid and the vaping device battery is a rechargeable battery; the user replaces the pods when empty with a fresh pod, factory filled with liquid, and regularly recharges the battery. With the temperature control system described above, the lifetime of the heating element in a typical pod can be extended from just a few hundred puffs to many thousands of puffs, in turn enabling those pods to be re-filled many times using the automatic liquid re-filling system described in PCT/GB2019/052922.
- can also be implemented in a low-cost, single use, 1-piece disposable device, enhancing the safety of those devices and also increasing the lifetime of the heating elements used in those devices.
- can also be implemented in 1-piece disposable vaping devices that are re-filled and re-used many times (see for example the Section B implementations), greatly reducing the environmental harms caused.
- enables a user to select the vapour output (eco, low, medium, high etc)
- enables the device to automatically implement different vapour output profiles (e.g. high for the initial puff, high for the 10th puff etc.)
- enables the device to automatically optimise heating element temperature for the specific liquid used, taking into account one or more of the following: flavour, whether salt-based, PV/VG proportions, to deliver an optimal user experience.
- enables the device to provide consistent, high quality flavour over potentially hundreds of puffs.
- enables the device to provide consistent, high quality flavour without the need for excessively high concentrations of flavourings.
- enables the device to automatically increase or alter the temperature of the heating element after a set number of inhalations or a set time to provide a signal to the user to indicate nicotine consumption, e.g. to nudge the user to stopping use of the device with a 'reward' inhalation
- readily tuned or adjusted for CBD, THC and specific cannabinoids (e.g. tuning the temperature of the heating element to drive evaporation of different terpenes for different purposes; the temperature could be fixed or vary at different moments during a puff or a sequence of puffs)
- enables the device to provide consistent, high quality flavour without the need for excessively high concentrations of flavourings.
- enables the device to automatically increase or alter the temperature of the heating element after a set number of inhalations or a set time to provide a signal to the user to indicate nicotine consumption, e.g. to nudge the user to stopping use of the device with a final 'reward' inhalation.
- readily tuned or adjusted for CBD, THC and specific cannabinoids (e.g. tuning the temperature of the heating element to drive evaporation of different terpenes for different purposes; the temperature could be fixed or vary at different moments during a puff or a sequence of puffs)

B. Closed Loop Temperature Control Algorithm Key Features

Note that these Key Features are generally also used in combination with any one or more of the Dual Loop Key Features and Optional Features described above, but do not have to be, and can be used in single closed loop control systems too. Note that any of these Key Features can be combined with any one or more, other compatible Key Features.

Key Feature 11: PV Automatically Measures the Resistance of the Heating Element in that PV A vaping system including a microcontroller or chip programmed with a closed loop temperature control algorithm configured to regulate the PWM duty cycle for the power delivered to a heating element configured to generate inhalable vapor;
in which the system automatically measures the resistance of the heating element in or used by that PV and the closed loop temperature control algorithm uses that resistance value.

Optional Features:
system automatically measures the resistance of the heating element when the tip that includes the heating element is attached to the body of the PV.

Key Feature 12: PV Automatically Measures the Ambient Temperature

A vaping system including a microcontroller or chip programmed with a closed loop temperature control algorithm configured to regulate the PWM duty cycle for the power delivered to a heating element configured to generate inhalable vapor;
in which the system automatically measures, or uses a value for, the ambient temperature when measuring the resistance of the heating element in that PV in order to create a datapoint to establish the resistance v temperature line or curve for that specific heating element.

Key Feature 13: PV Automatically Normalises Resistance Data to be Consistent Across Different Heating Elements.

A vaping system including a microcontroller or chip programmed with a closed loop temperature control algorithm configured to regulate the PWM duty cycle for the power delivered to a heating element configured to generate inhalable vapor;
in which the system automatically calculates or derives a value of the resistance of the heating element for a given setpoint temperature and also for a second temperature, and uses that second resistance value to normalise the operation of closed loop temperature control algorithm so that the inputs to a PID controller are consistent across different heating elements with different resistance v temperature behaviours.

Optional Features:
the second temperature is 0° C.

Key Feature 14: PV Automatically Infers the Resistance Value of the Heating Element at 0° C.

A vaping system including a microcontroller or chip programmed with a closed loop temperature control algorithm configured to regulate the PWM duty cycle for the power delivered to a heating element configured to generate inhalable vapor;

in which the system automatically calculates or derives a value of the resistance of the heating element for a given setpoint temperature and also for 0° C.

Key Feature 15: The Closed Loop Temperature Control Algorithm Compensates for the Resistance v Temperature Variability of Different Heating Elements.

A vaping system including a microcontroller or chip programmed with a closed loop temperature control algorithm configured to regulate the PWM duty cycle for the power delivered to a heating element configured to generate inhalable vapor;

in which the algorithm is configured to compensate for the inherent variability in the resistance v temperature response of different heating elements.

Optional features for all Closed Loop Temperature Control Algorithm Key Features 11-15 include any one or more of the following. Note that any of these optional features can be combined with any one or more, other compatible optional features.

The Heating Element
the heating element is a resistance based heating element with a known or measurable temperature coefficient of resistivity.
the heating element includes a resistance based heating coil, mesh or layer.
the heating element includes a resistance based heating coil, mesh or layer contacting a porous substance, such as a ceramic . . . the heating element includes a resistance based heating flat plate or cylindrical mesh.
the heating element includes a resistance heating flat, stainless steel plate made of 316L stainless steel.

Closed Loop Temperature Control
the setpoint/target temperature and the current or real-time temperature are used as inputs to a PID controller, where the PID controller alters the PWM duty cycle of the power delivered to the atomising element so that the real-time temperature of the atomising element automatically tracks the setpoint temperature.
the setpoint/target temperature is user configurable.
the setpoint/target temperature is user configurable and/or factory configurable to be appropriate for different types of atomisable liquids, such as a lower temperature for CBD and THC and a higher temperature for nicotine.
the setpoint/target temperature is user configurable to control the strength or level of the substance being vaped, e.g. nicotine or CBD.
the setpoint/target temperature is user configurable to control the density or extent of the vapor cloud generated.
The system has no dry vape detection process.
The system has no process for determining liquid level of the liquid feeding the atomising element.

Dual Loop Control
the microcontroller or chip is also programmed with a closed loop power control algorithm, operating as a second control loop.
the microcontroller or chip is also programmed with a second closed loop control algorithm, taking as an input a parameter other than temperature, and operating as a second control loop.
the microcontroller or chip is also programmed with a second closed loop control algorithm, that is configured to operate as an independent control loop to the closed loop temperature control algorithm and to generate an input to the closed loop temperature control algorithm.
the closed loop temperature control algorithm operates to track the setpoint temperature of the heating element and the second closed loop control algorithm operates to correct an error in the tracking of the setpoint temperature by the closed loop temperature control algorithm.
the second closed loop control algorithm operates to correct errors or inaccuracies in temperature tracking by the closed loop temperature control algorithm arising from a rise in the temperature of stored atomisable liquid, in thermal contact with the atomising element.

Form Factor
the vaping system is a disposable non re-fillable, non-rechargeable vaping device.
the vaping system is the re-fillable and re-chargeable disposable vaping device described in Section B (the 1 piece refillable tube or bar format device and the 1 piece refillable box or bottle format device)
the vaping system is an automatically re-fillable vaping device.
the vaping system includes a user-replaceable tip.

Section B: Next Generation Disposables—the 1-Piece Refillable Tube or Bar-Format Disposable Vaping Device and the 1-Piece Refillable Box or Bottle Format Disposable Vaping Device Disposable vaping devices are designed not to permit the liquid reservoir to be replaced with a new, full reservoir; instead, once the liquid in the reservoir is all used up, then the entire device is thrown away. Unlike conventional pre-filled tip or pod based systems, where the user replaces a pre-filled tip with a fresh tip once the liquid in the tip is consumed, with disposable devices, there is no dis-assembly of the device at all or re-charging of the battery in the device; the entire device is thrown away once the liquid is consumed or the battery runs flat.

Disposable vaping devices are very convenient for users, since there is no dis-assembly or re-charging, and they are hence very simple to understand and use. But they are terrible for the environment, and are very wasteful: the entire lithium ion battery is charged once by the manufacturer, and then the entire unit is thrown away once all the liquid is used up or the battery runs out (typically after 150-300 puffs), even though the battery could be re-charged and re-used multiple times if a simple and virtually zero-cost battery re-charger circuit is added.

Because they are designed to be cheap, throw-away items, the quality of the heating element and control circuitry may be poor, potentially leading to harmful emissions.

In this Section B, we describe a hybrid disposable vaping device (i.e. one with a fixed and non-replaceable heating element and liquid reservoir and that is hence not dis-assembled by the user in normal use) that is also re-fillable and re-chargeable. In essence, it looks like a conventional disposable vaping device; it has a similar retail price point to a conventional disposable vaping device; it is sold pre-filled and fully charged, like a conventional disposable vaping device; it is sold pre-filled and fully charged, in a variety of different liquid flavours, like a conventional disposable vaping device. It hence has all the key attributes that make conventional disposable vaping devices so appealing to consumers. But, unlike a conventional disposable vaping device, it is intrinsically re-fillable and re-chargeable to a consumer who buys and uses an optional, low-cost re-fill and re-charge device. We describe this simple optional accessory dock that can both re-fill and re-charge the device; the user simply has to dock the vaping device into a port in the dock to both re-fill and also re-charge the device. Automatic re-filling and re-charging is hence easy, mess-free and simple.

The hybrid disposable vaping device may also use the heating element temperature control system described earlier (Section A), to maximise the lifetime of the heating element, and optimise the safety and quality of its vapour. This 'next generation' disposable vaping device can then be safely used for typically at least 10× the number of times a conventional disposable can be used for (e.g. 3500 puffs compared to a typical 350 puffs).

It may also implement the dynamic charging system describing in Section C, and use the data connectivity system described in Section D, and include polypropylene parts that are recyclable the recycling using the scheme described in Section E.

In a conventional pod based vaping system, the user has to take a used pod off the vaping device body and open a pack of new pods and then replace the used pod with a new pod: this is somewhat inconvenient for users accustomed to the extreme convenience of the conventional disposable vaping device. In this Section B, we describe a low-cost, simple to use vaping system for a hybrid disposable vaping device—a vaping device that is sold pre-filled with liquid and pre-charged, and that a user can hence start vaping on immediately after purchase; it is sufficiently low cost for a user to simply discard the entire device once it ceases to operate (which typically occurs when the battery has run too low on charge). But in addition, with the system described in this Section B, the hybrid disposable device can, without any need to dis-assemble it, be simply docked with a small and simple home desktop or retail countertop dock or unit, which then automatically re-fills the liquid reservoir in the device with liquid and also re-charges the rechargeable lithium ion battery in the device.

In one implementation, the dock is supplied with liquid from a 10 mL (or larger, where local regulations permit it) bottle of conventional size and shape that is inserted into the dock. A single 10 mL bottle is then the only consumable that is used to deliver the same amount of liquid as five complete disposables, so the saving in items otherwise going to landfill is considerable. The single 10 ml bottle may have the same diameter and height as the industry standard 10 mL re-fill bottle used to manually refill vaping devices with liquid. It can hence be made and filled on a conventional liquid filling production line without significant changes to the pucks used to hold and move the bottle through the filling line. The external appearance of the bottle may however be different from the industry standard 10 mL re-fill bottle, with a more premium finish and appearance. Further, the cap structure and sealing structures in the bottle are different from an industry standard 10 mL re-fill bottle, as will be explained below.

In one implementation, using the dual loop temperature system described in Section A, we have extended the life (and enhanced the safety) of a single low cost heating element to 3500 puffs: ten or eleven complete disposable vaping devices would normally be consumed to deliver that number of puffs, but that is now possible with just a single hybrid disposable vaping device and two 10 ml bottles of liquid.

Figure 10A:
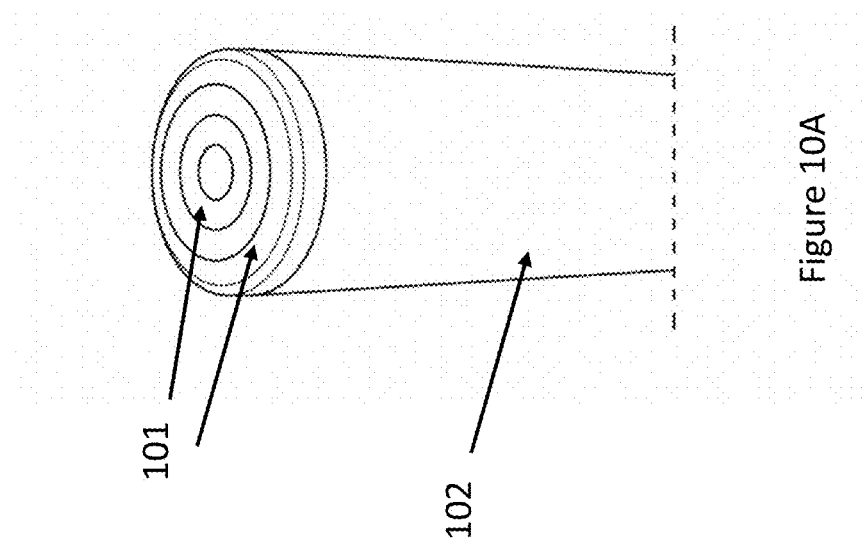
Figure 10B:
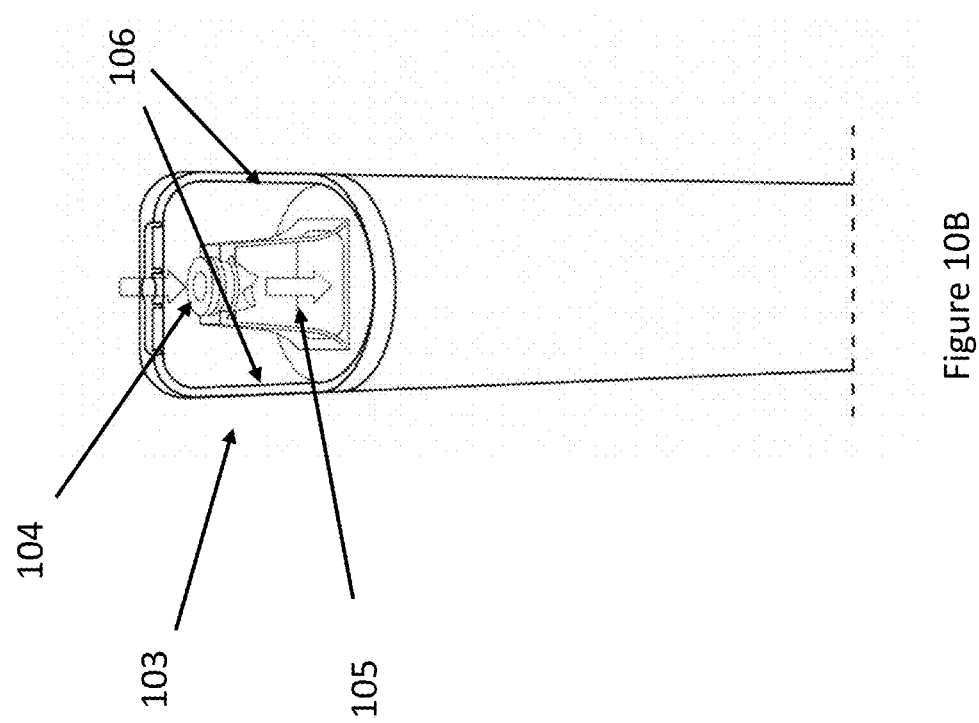
Figure 20:
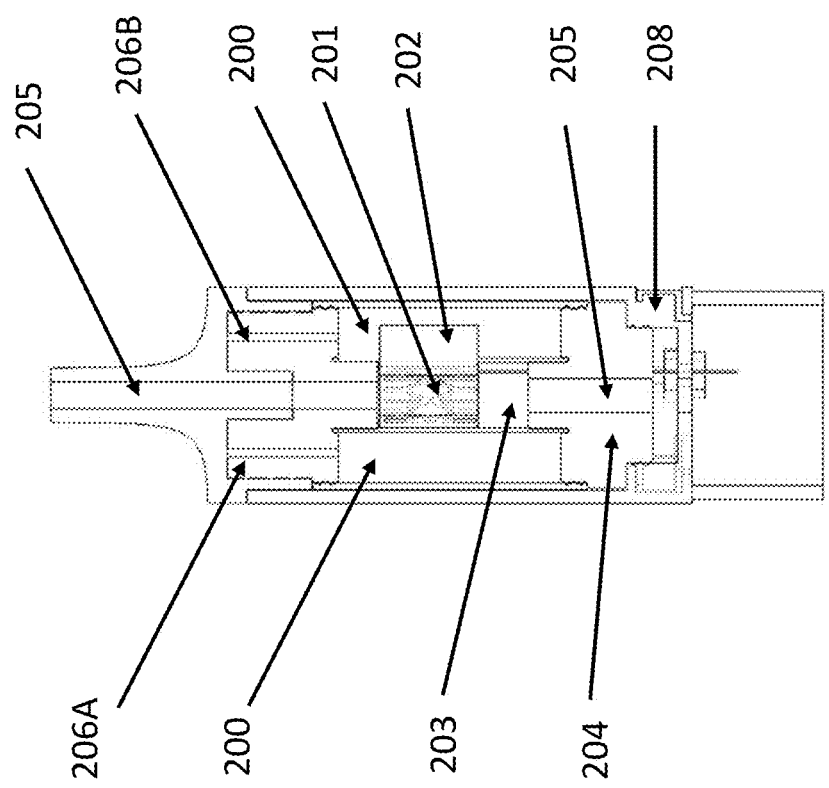
Figure 21:
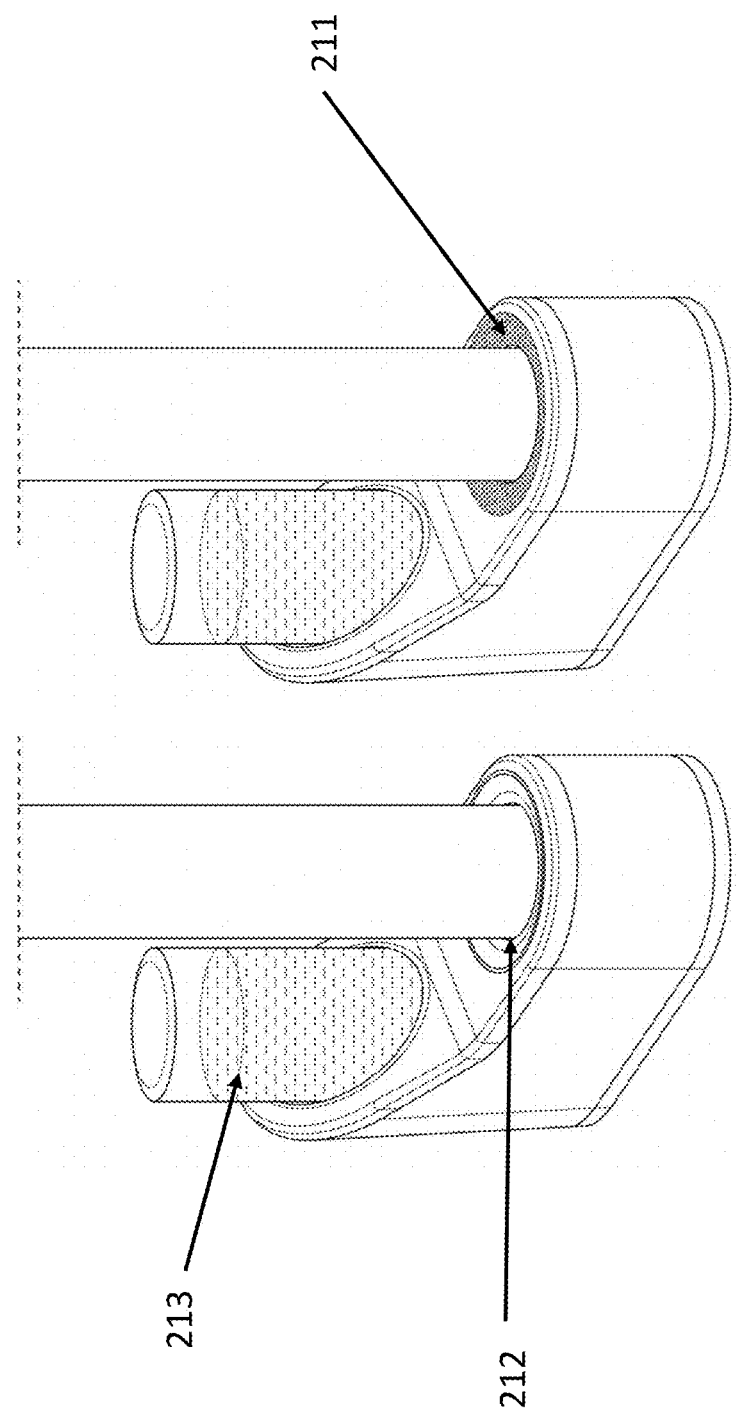

FIG. 10A shows the relatively minor changes we make to a typical tube format disposable vaping device to turn it into a hybrid disposable vaping device, capable of being re-filled and re-charged by the user. In this variant, we place the charging contacts 101 at the end of the device that is opposite to the tip; two concentric circular contacts 101 are used. Disposable vaping devices use a Li-ion rechargeable battery in the body 102 and in addition to external contacts, a very low cost power management chip or circuit (not shown) is added to control the charging process. FIG. 10B shows that at the tip 103, we include a small silicone filling valve 104 through which a small needle or other liquid filing device (not shown) in the re-filling device can pass; the liquid reservoir 105 is then fed directly by the small needle. In some designs of tip, the liquid reservoir 105 is in the tip 103 itself and centrally positioned in the tip, with the vapour passing up channels 106 that can be on either side of the central liquid reservoir; this is the arrangement shown in FIG. 10B. But other designs of tip and vapour channel are possible; for example, some disposable vaping devices use a liquid soaked sponge or foam in the part of the body 102 near the tip; then, we use a small silicone channel or valve in the side-wall of the body, typically at the base of the tip and that leads directly to the sponge or foam; injecting liquid through that channel or valve directly into the sponge or foam enables the liquid in the sponge or foam to be replenished with minimal risk of dripping, since the sponge or foam retains the liquid (typically through capillary action); this variant is shown in FIG. 20.

Figure 11:
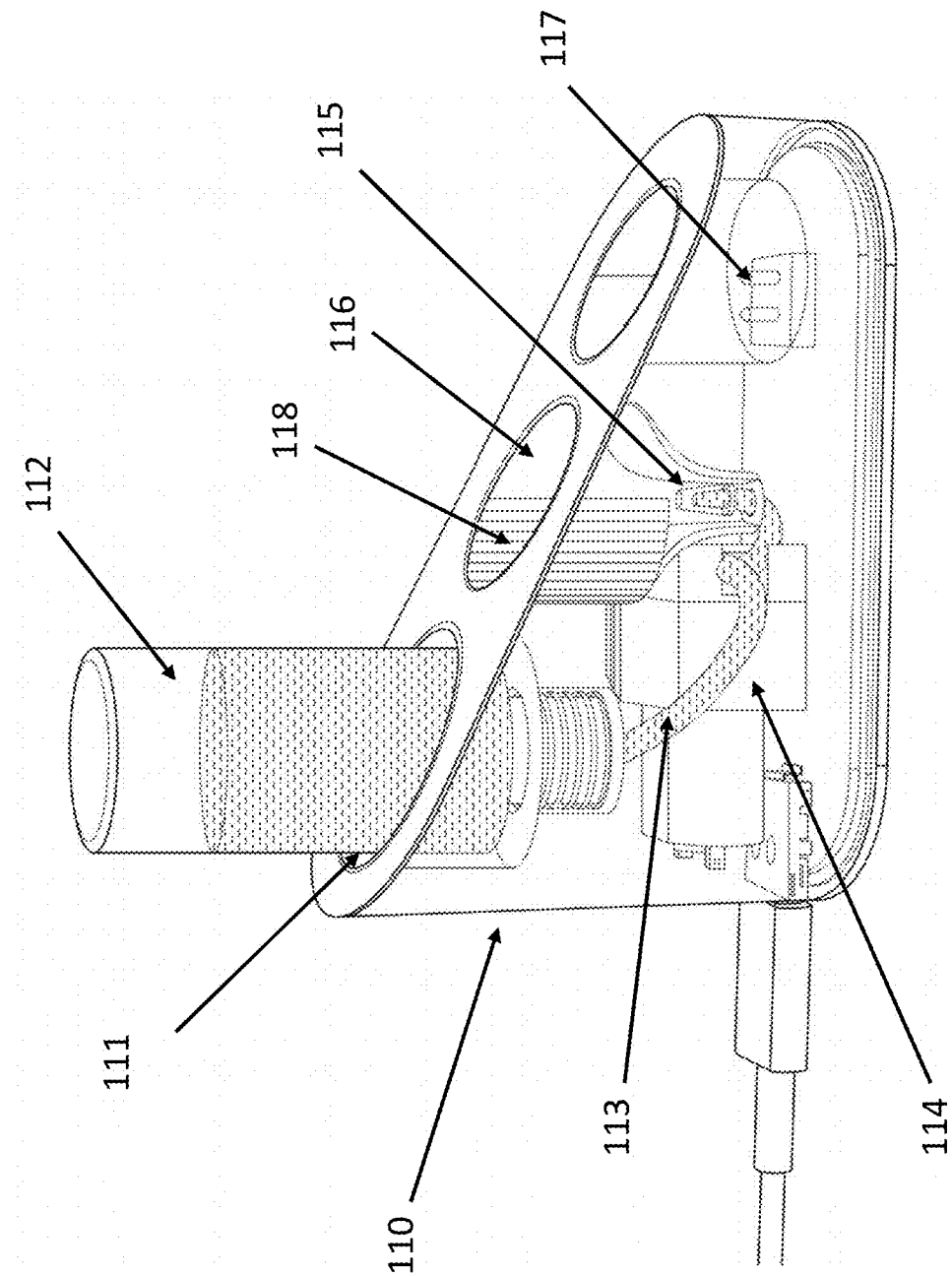

FIG. 11 shows the automatic liquid re-filling and re-charging device or dock 110 for the hybrid disposable vaping device. This is a small (less than 75 mm in length) dock that has a flat base and can sit stably on a desktop; it is designed for home-based re-filling and re-charging of the vaping device. The re-filling and re-charging may also be a fully portable unit (not shown, but described in for example PCT/GB2015/050573, PCT/GB2016/052700, and PCT/GB2019/052922, the contents of which have been incorporated by reference). The re-filling device has a first aperture 111 into which a 10 mL liquid refill container 112 has been inserted. Liquid refill container 112 can be made of polypropylene or, where a more premium bottle is preferred, made of glass or metal or other premium materials. A tube 113 runs from the first aperture to a small electric peristaltic pump 114, (powered by a USB-C cable connection plugged into mains power or a USB-C power source, such as a laptop) that connects to a filling nozzle 115 in a second port 116, into which a user docks the vaping device when it is to be re-filled; the filling nozzle is about 24 mm in length. The second port 116 includes capacitive sensing plates 118 that measure the change in capacitance of the liquid reservoir of the inserted vaping device as liquid is pumped into it via the filling nozzle 115 by the peristaltic pump 114. Capacitive sensing plates 118 are each separated by an insulating layer from a backing plate that is connected to ground (via the USB connection that powers the dock); the backing plates shield the capacitive sensing plates 118 from being influenced by objects outside of the second port; without these grounded, shielding plates, hands placed close to the dock can influence the capacitance reading.

Liquid level sensing electronics in the re-filling device 110 interpret the capacitance signals from capacitance sensor plates 118 and turns the pump off when the desired fill level has been reached. This fill level may be fixed (e.g. the pump 114 turns off when the fill level in the vaping device reaches say 1.5 mL). Re-filling 1.5 mL takes typically less than 10 seconds, and is very convenient for users. As noted earlier, there is no need to take the tip off the body or dis-assemble the vaping device in any way. The filling device also includes a third port for re-charging the vaping device; this includes electrical contact pins 117 that engage with the circular contacts 101 on the vaping device. It is also possible to combine the re-fill and the re-charge functions into a single port as will be explained later (see FIGS. 17-22).

We will now look at the use and operation of the system from the perspective of the user. FIGS. 12A and 12B show how the user inserts a 10 mL refill bottle with the re-filling dock. As shown in FIG. 12A, the 10 mL refill bottle 120 is supplied with a small, removable sticker 121. The user peels this off, exposing a small air hole (not shown) in the wall of the bottle 120. The air hole allows air to enter the bottle as liquid is pumped out of the bottle during automatic re-filling. The re-filling device includes a first port 122 into which the bottle 120 is screwed or pushed. The lid or cap of the bottle includes a small opening that sits over a septa seal fixed in the neck of the bottle; the bottle is sold with the lid or cap fixed firmly on the neck with a security feature that prevents the lid or cap being removed in normal use. A needle in the first port 122 penetrates through a single slit in a septa seal in the neck of the bottle 120 as the bottle 120 is pushed or screwed down, as shown in FIG. 12B, with the needle passing through the opening in the lid or cap. The re-filling dock also includes a second port 123 into which a vaping device is inserted for automatic re-filling, and a third port 124 into which a vaping device is inserted for automatic re-charging.

As shown in FIG. 13A, the refill device includes a second port 130 into which a vaping device 131 is inserted for automatic re-filling. When the vaping device is inserted tip down into port 130, the liquid reservoir capacitance is detected using the liquid level sensing sub-system, and that triggers the automatic operation of the peristaltic pump if the system detects that the liquid level or amount in the liquid reservoir is below a threshold. In another variant, the automatic re-filling can be triggered or started by a user selecting a button or other control; in any event, re-filling stops automatically once the liquid level system detects that sufficient liquid has been pumped into the liquid reservoir in the vaping device; it is this automatic cessation of filing, rather than the commencement of filing, that makes this an 'automated' liquid re-filling system. In the implementation shown, the liquid fill level or amount is set at 1.5 mL-if the detected level or amount of liquid in the liquid reservoir is less than 1.5 mL, then the pump is activated; the pump stops once the 1.5 mL level or amount is reached.

FIG. 13A shows the refillable 'tube' format vaping device, shaped as a cylindrical tube. One approach is to provide a 2 mL reservoir in the vaping device, and to set the fill level to approximately 1.5 mL, as described above.

Later in this description, we will describe the refillable box or bottle format vaping device; this may also have an internal liquid reservoir of 2 mL and fill level of approximately 1.5 mL. So each variant can have an internal liquid reservoir of 2 mL and be fully re-filled with liquid from a 10 mL liquid refill bottle that slots into the re-fill dock to a fill level set to be below the maximum capacity to reduce leakage risks.

But larger internal liquid reservoirs in the vaping device itself are also possible—e.g. 5 mL to 10 mL; It is possible to only fill this larger reservoir with the amount of liquid that local regulations in the country of sale permit. So a single design of vaping device could have a 5 mL internal reservoir, which is factory pre-filled with 2 mL of liquid when configured for sale in regions (such as the UK and EU) for which the maximum permissible liquid amount in a disposable vaping device or a pre-filled pod or tip is 2 mL at retail. But that same design of vaping device could instead be pre-filled at the factory with 5 mL when configured for sale in regions that permit that larger amount at retail.

Another variant can see that same vaping device with a large internal liquid reservoir, —e.g. 5 mL to 10 mL, pre-filled at the factory with just 2 mL of liquid when configured for sale in regions such as the UK and EU that limit pre-filled vaping devices to 2 mL of liquid, but the end-user can then set their re-fill dock to re-fill the device to the maximum, e.g. 4.5 mL for a 5 mL reservoir, since regulations in those regions limit the amount of liquid in a device at retail, but do not prevent an end-user personally re-filling the device with a greater amount of liquid. If this device is to be sold in a region where there is no limit to the capacity of the internal reservoir, then it can be pre-filled at the factory to the maximum level—e.g. for a 5 mL capacity reservoir, then it could be filled at the factory and also when re-filling using the dock to 4.5 mL.

Similarly, the liquid capacity of the liquid refill bottle or container can be limited to 10 mL, where local regulations stipulate that as the maximum retail capacity for a vape liquid bottle, but it could be far larger, such as 20 mL or 100 mL: different jurisdictions impose different rules on how large a refill bottle can be; the system is designed to be fully flexible so that it can be readily used across multiple jurisdictions without requiring significant changes to its design or operation.

Returning now to the Figures, as shown in FIG. 13B, a light ring 132 around the opening of second port 130 illuminates in white to show the user that re-filling is taking place. Small air bubbles can also in practice be seen passing up through the liquid in the liquid bottle 133 during filling. The colour of the light ring 132 changes to green when re-filling is complete (typically in under 10 seconds).

Figure 14B:
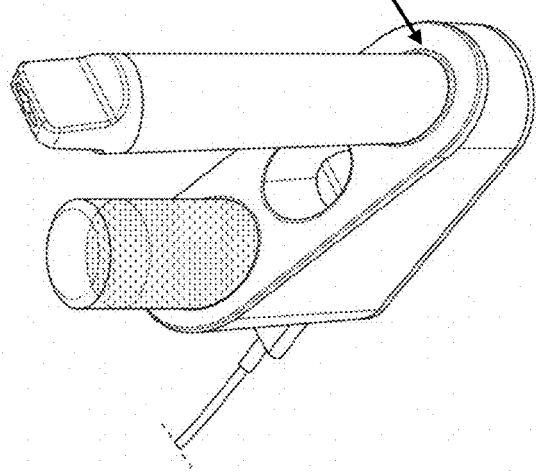
Figure 14A:
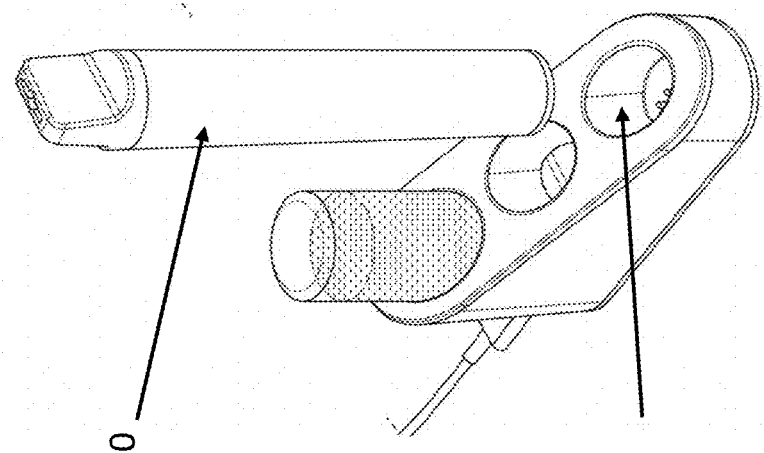

As shown in FIGS. 14A and 14B, the re-filling device also includes a third port 141 into which the vaping device 140 is inserted for automatic re-charging; the vaping device 140 is placed upright (e.g. tip exposed) since the charging contacts in the vaping device 140 are on the base. Port 141 also includes a light ring 142 that illuminates in white during charging and changes to green once charging is complete.

Figure 15:
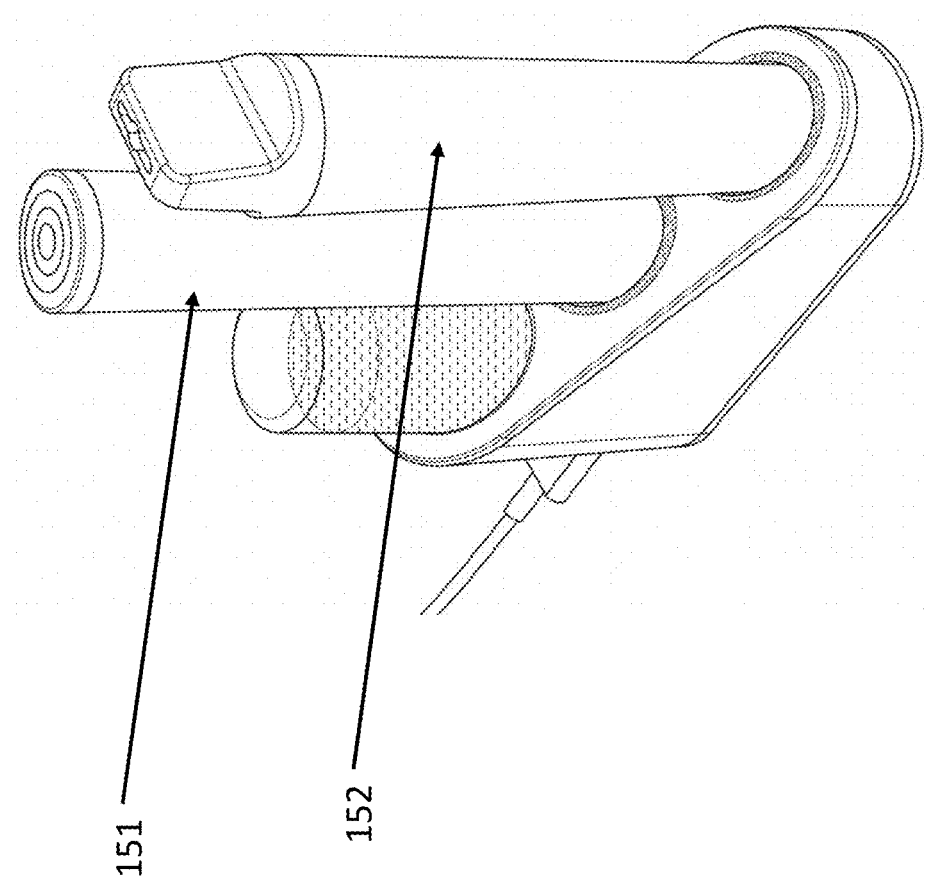

FIG. 15 shows the re-filling device simultaneously automatically e-filling one inverted vaping device 151 and also automatically re-charging another vaping device 152, which is upright and not inverted.

Figure 16B:
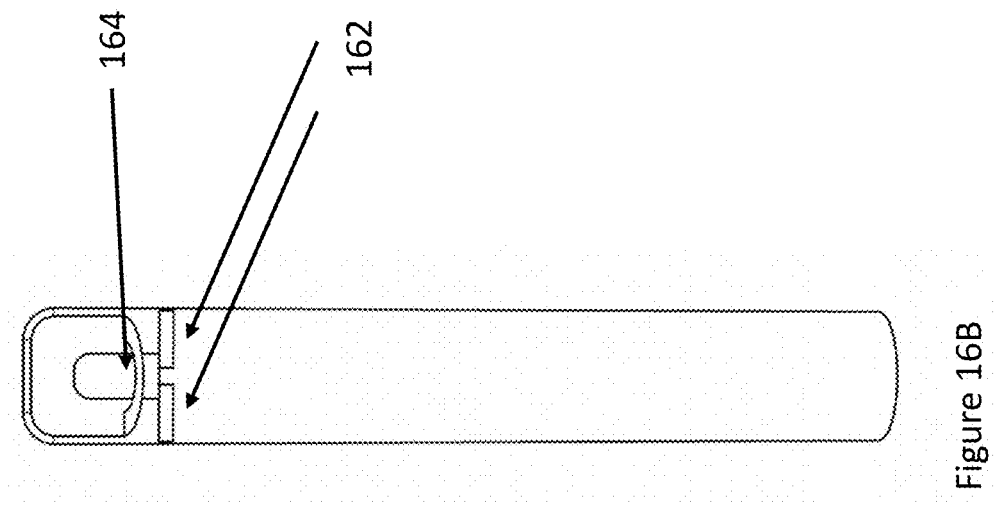
FIG. 16A-16B show a variant of the refillable tube-shaped hybrid disposable vaping device with both a re-filling aperture and also re-charging contacts at the tip end of the device. It is re-filled and re-charged at a re-filling device with a single port that both re-fills and re-charges the vaping device.
Figure 16A:
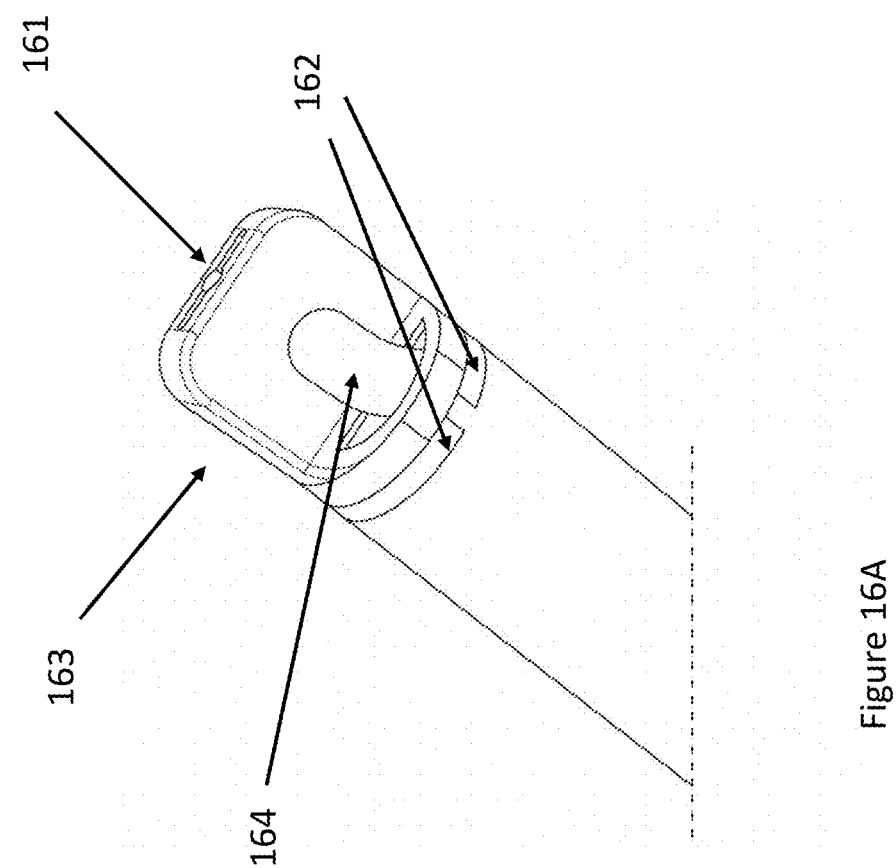

FIG. 16A shows a variant where the vaping device includes both a re-fill aperture 161 and also re-charging contacts 162 at the tip 163. This variant works with a re-filling device that includes a single socket in the dock for both re-filling and also re-charging. It is especially useful where the dynamic charging approach described in Section C is used. In this variant, the tip includes a small window 164 through which the liquid in the tip can be seen. A side view of this variant is shown in FIG. 16B.

Figure 17:
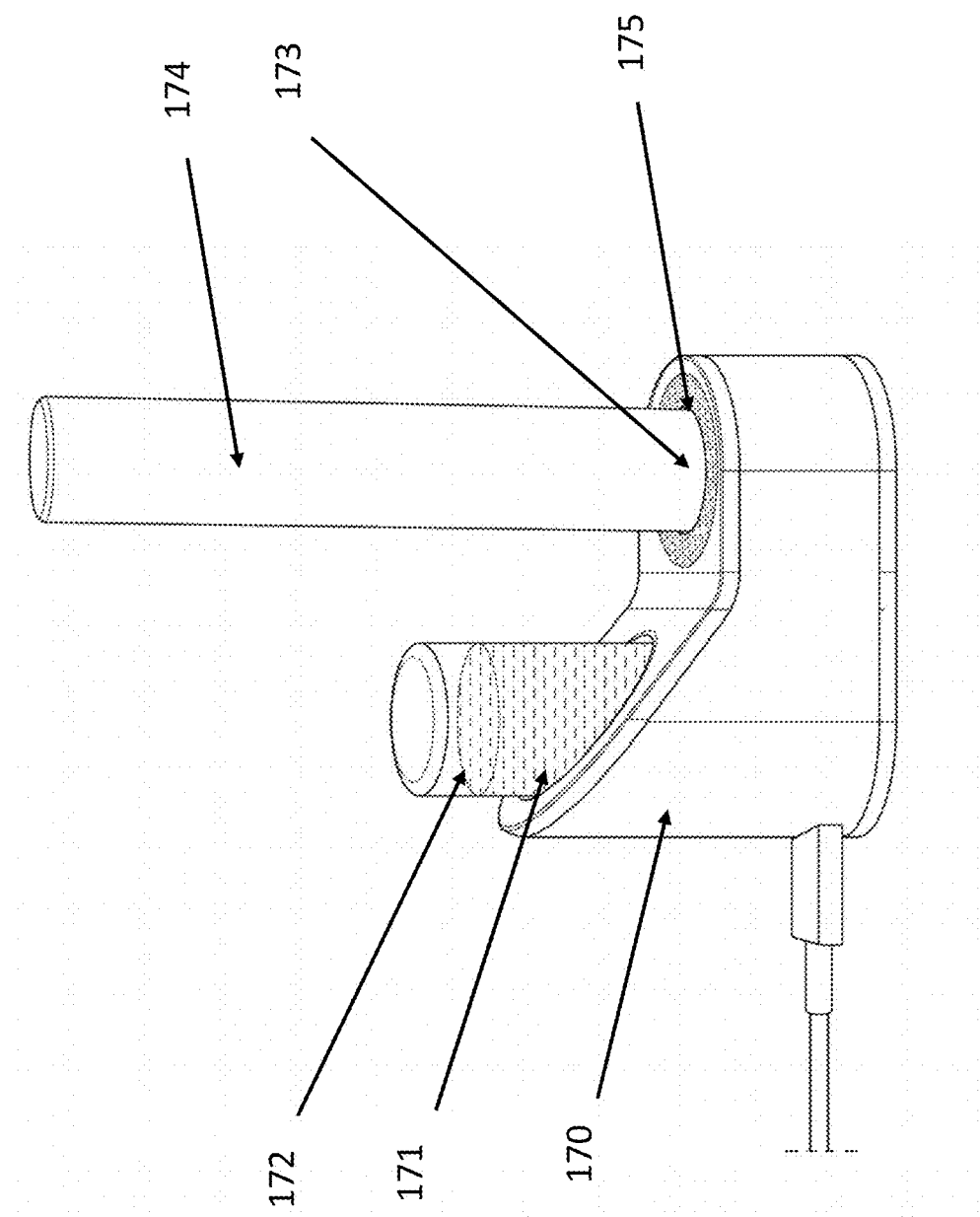
FIGS. 17, 18, 19, 20, 21A, 21B and 22 show the re-filling device with a single port that both re-fills and re-charges, together with a refillable tube-shaped vaping device in various states.

FIG. 17 shows the re-filling device for this variant: the re-filling device 170 has a first port 171 into which a 10 mL liquid bottle 172 has been inserted. The re-filling device 170 includes a second port 173 for both re-filling with liquid and also re-charging the vaping device 174. The re-filling device 170 includes a light ring 175 that illuminates to show the status of re-filling and re-charging.

Figure 18:
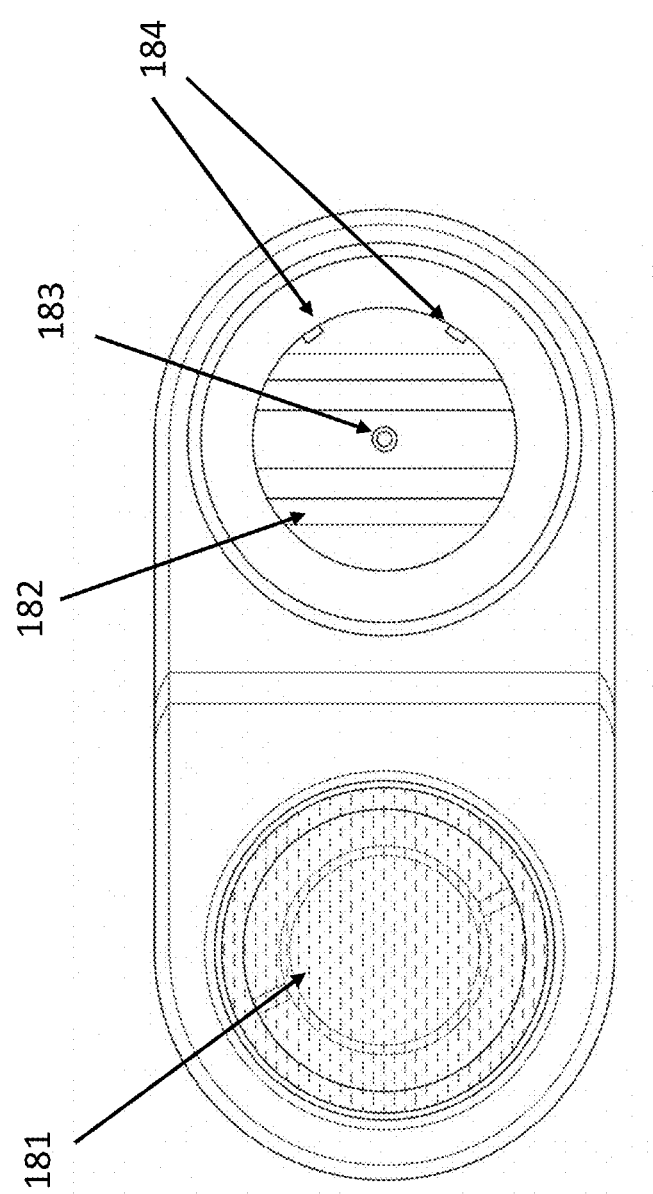

FIG. 18 is a top down view of the re-filling device, showing the 10 ml bottle 181, and the re-filling and recharging port 182, which includes a re-fill nozzle 183, electrical charging contacts 184 and capacitive sensor plates (not shown) for the liquid level sensing system and that line or surround part of the sides of the re-filling port 182.

Figure 19:
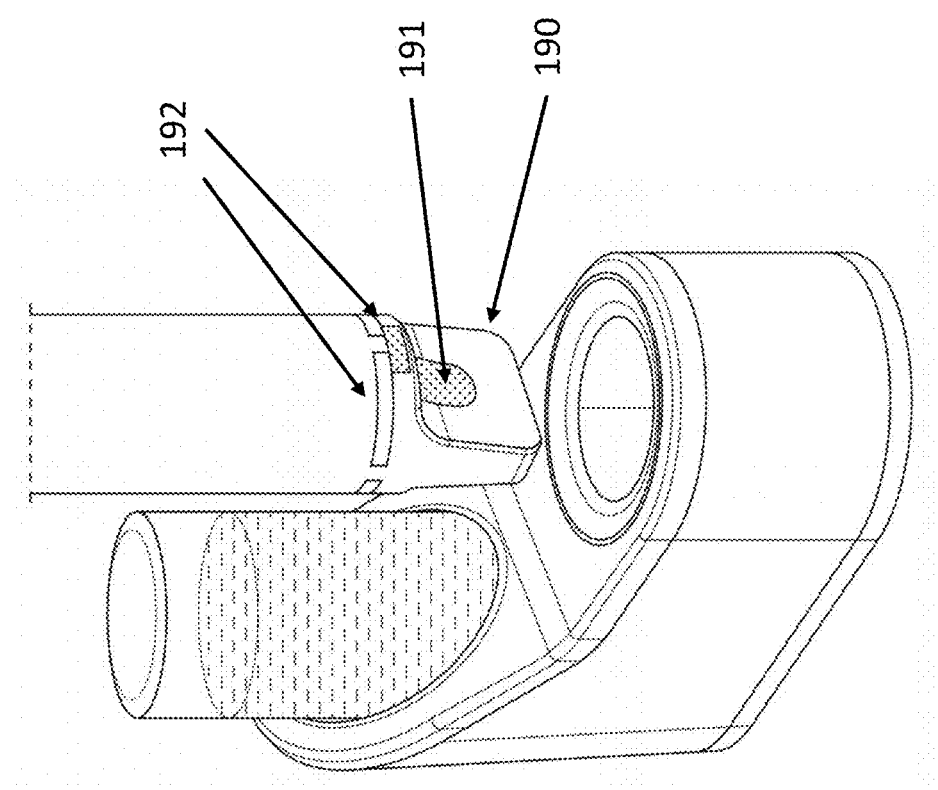

FIG. 19 shows the vaping device tip 190 just above the combined re-filling and re-charging port 193. The tip 190 includes a window 191 into the interior of the tip that enables a user to view the liquid in the tip reservoir. A LED light in the tip 190 glows, illuminating window 191 when the device needs to be re-charged. Electrical charging contacts 192 are shown. Circuitry in the vaping device causes the LED light to flash, or change to a specific colour, when the vaping device has been re-filled to a safe maximum number of times; if the dual loop temperature control has been used in this vaping device, then typically twenty complete re-fills is safely possible and so the LED can, for example, be set to flash red once twenty re-fills have been completed. A simple counter in the vaping device counts each time a re-fill occurs and sends a signal once the safe maximum has been reached.

FIG. 20 is a cross section through the tip of the vaping device shown in FIG. 19. This tip sits over a body (not shown) that includes a rechargeable Li-ion battery and power management microcontroller and an air pressure sensor that detects inhalation. The tip includes the following: an annular open-foam liquid reservoir 200; this is pre-filled at the factory with liquid. The foam reservoir 200 feeds liquid to mesh heater 201, via a cotton tab 202 that sits in the foam reservoir 200. The mesh heater 201 sits inside a cylindrical metal (or woven fabric) tube 203, itself mounted on a silicone base 204 that also serves to support and seal the foam liquid reservoir 200. An air passage 205 passes up through the silicone base 204, and the mesh heater 201 and to an opening in the tip. This structure differs from a conventional tip in that it includes two narrow pipes or channels 206A and 206B formed in a silicone cap 207; these pipes pass all the way (not shown) to the surface of the tip and enable a pair of fine filling needles (not shown), in the liquid refilling device, to enter the narrow pipes or channels 206A and 206B and inject liquid via the pipes 206A and 206B directly into the cylindrical foam reservoir 200. The filling needles typically penetrate significantly (e.g. several mm) into the foam reservoir. By using two filling pipes, the foam reservoir fills more evenly and the liquid level sensing system in the filling device can hence measure the level of liquid in the tip more reliably. As the filling needles are withdrawn from the pipes or channels 206A and 206B, any excess liquid on the needles is removed by the silicone walls of the pipes or channels 206A and 206B and pipes or channels 206A and 206B seal closed to prevent any liquid leakage from the liquid reservoir 200. This structure differs from a conventional tip in that it also includes electrical charge contacts 208 for recharging the Li-ion battery.

FIGS. 21A and 21B show how the status light ring 211 around the combined re-fill and re-charge port 212 in the refilling and recharging dock works. When the vaping device is first inserted into the port 212, the liquid re-filling device measures the liquid level in the vaping device; this typically takes no more than 3 seconds. Once that measurement is completed, and if re-filling is needed, then the re-filing device automatically starts to refill the vaping device from the refill bottle 213. The light ring 211 illuminates in flashing white to show that re-filling is occurring; it changes to a continuous band of white once re-filing is complete.

Figure 22:
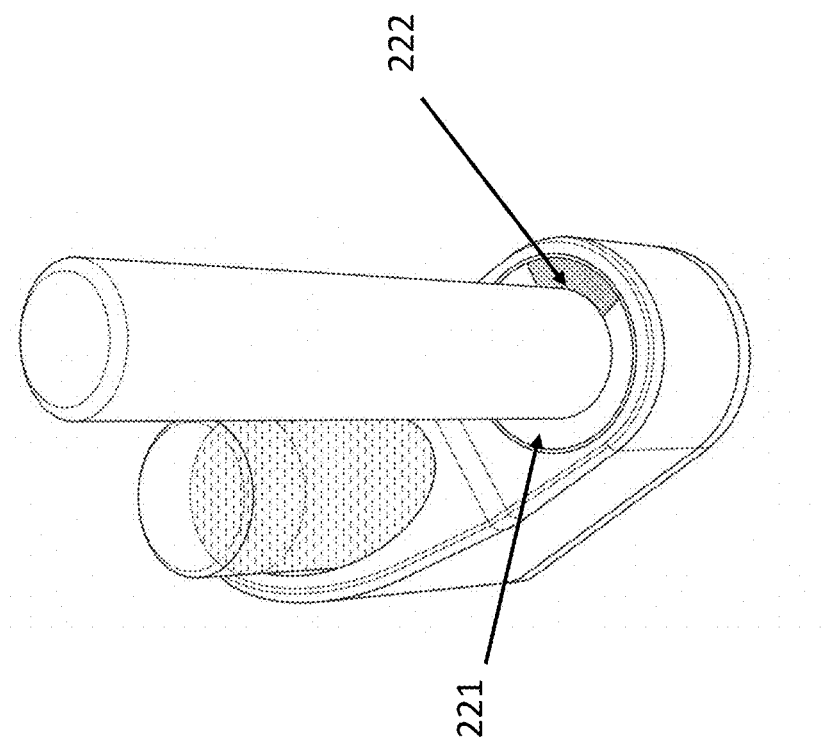

FIG. 22 shows how the light ring 221 is segmented into four quadrants that progressively illuminate in red as re-charging takes place; to charge the internal rechargeable battery in the vaping device to 25% takes typically 8 minutes and so a total re-charge takes approximately 30 minutes; once this is completed, the entire light band turns green. In FIG. 22, just one of these quarter segments 222 is shown illuminated.

FIG. 23A-23D show the operational sequence; as shown in FIG. 23A, the user first inverts the liquid refill bottle 230 and then pushes it down into the refill bottle port 231 in the dock 232, as shown in FIG. 23B. Then, as shown in FIG. 23C, the user inverts the vaping device 233 and pushes it into the second port 234 in the dock; during filling and charging, as shown in FIG. 23D, the bottle 230 and vaping device 233 are positioned, inverted, in the dock 232.

Figure 24:
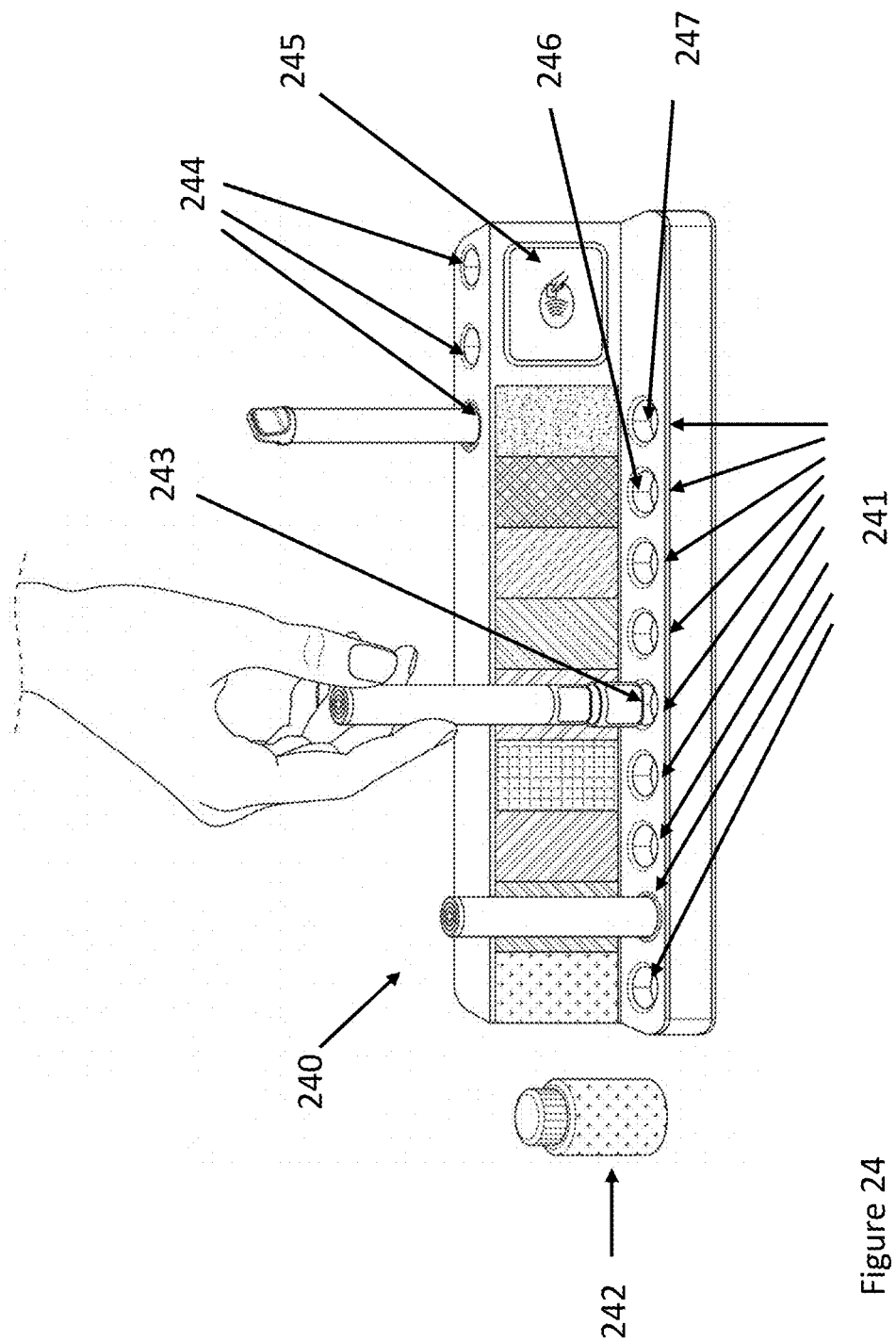
FIG. 24 shows a larger re-filling device for use in a bar, restaurant or shop; it can dispense nine different flavours of liquid.

FIG. 24 shows a retail or point of sale liquid re-filling and recharging unit 240. It is designed to be used in a club, bar or shop. The re-filling unit 240 has nine re-filling ports 241, each providing a different liquid flavour. Each re-filling port has the same components as the home dock described above-namely a re-fill nozzle, and capacitive liquid level sensing plates with grounded, shield plates, and a light ring. The unit takes much larger liquid bottles 242 than the home dock-typically 50-100 ml bottles. Small silicone or paper covers 243 are provided for a user to place over the tip for cleanliness. These disposable tip covers 243 are typically made of an absorbent material to absorb any e-liquid drips. A UV-C light could also be included in the point of sale unit to irradiate the tips to destroy any pathogens.

The unit also includes three re-charging ports 244; it is also possible use combined re-filling and re-charging ports. The re-filling unit 240 includes a payment card reader 245; the unit is activated by touching the payment card reader to pay for a re-fill. A user can move the vaping device between different re-filling ports to mix the flavours—e.g. place it in the 'Cherry' port 246 for a couple of seconds, and then into the Wild Berry port 247 to complete the re-filling.

The Refill Bottle or Container

Figures 25A, 25B, 25C:
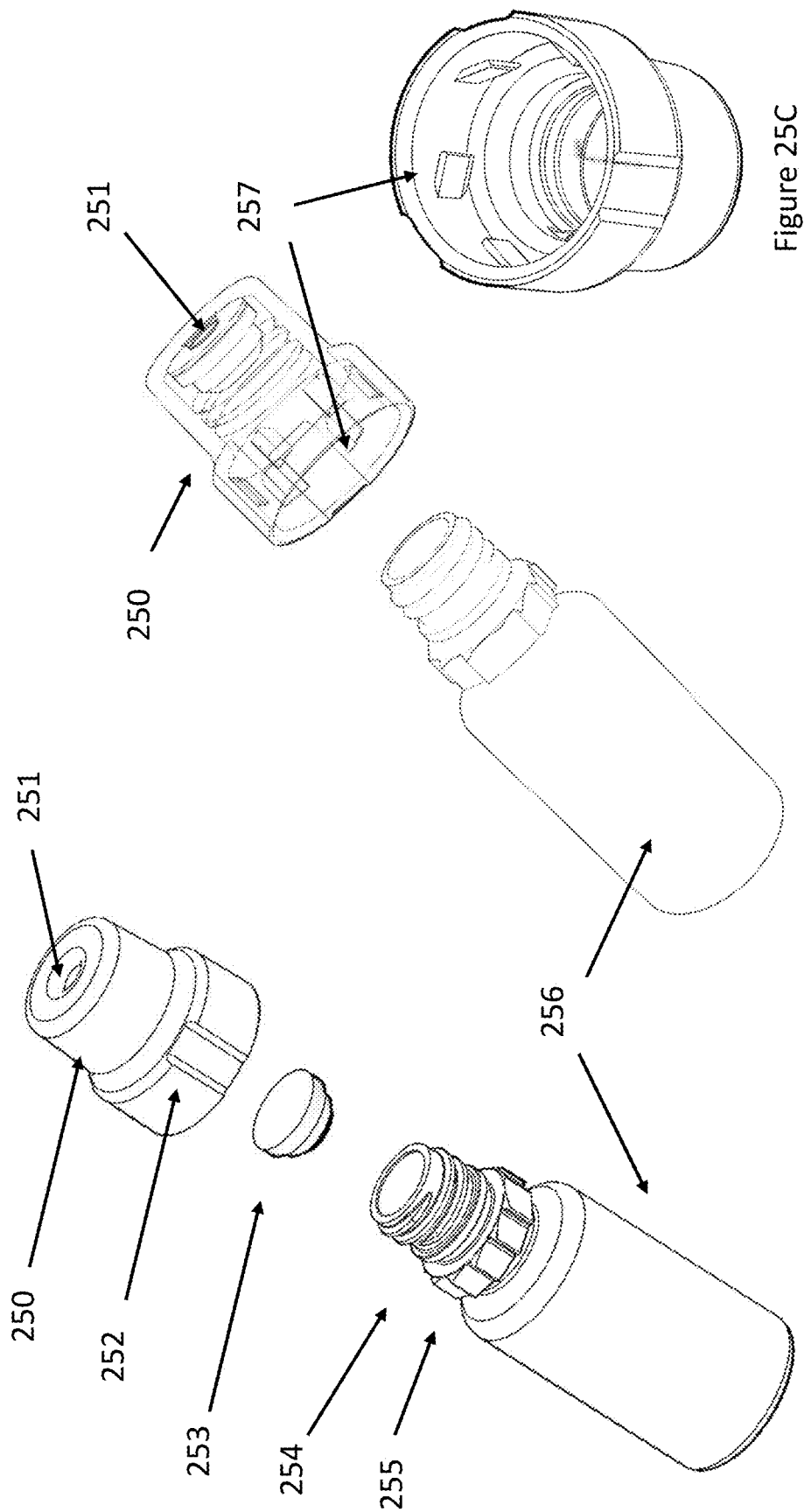
FIG. 25A-25D show the 10 mL refill bottle.

FIG. 25A-25D show the refill bottle or container. In FIG. 25A, we see the bottle cap 250; this has a circular hole 251 in the centre of its top surface: as will be explained later, a needle or stem in the refill dock passes through this hole 251. The bottle has a main body 256 and a neck with threads or a bayonet fitting 254 and a set of flanges 255. A silicone (or other suitable material, like rubber) septa seal 253, with a single slit cut across a diameter, seals the neck of the bottle. The flexible seal 253 includes a single slit that is configured to be penetrated by a filling nozzle in the dock and to permit air to enter the bottle when the liquid is being withdrawn from the bottle. Seal 253 includes two layers; the upper layer (closest to hole 251) is made of a harder material than the lower layer; this structure provides for efficient sealing around the needle or stem in the dock, and fast re-sealing when the bottle is withdrawn from the dock, preventing leakage of liquid into the dock. The outer edge of the flexible septa seal sits on the top edge of the bottle neck so that it is rigidly supported and does not deform when the seal is penetrated by the filling nozzle in the refilling device.

In FIGS. 25B and 25C, the internal structure of the cap 250 is visible; it includes stubs 257 that, when the cap 250 is screwed onto the bottle body 256 in the liquid filling factory, will rise up and over the flanges 255 in the bottle neck, enabling the cap to be screwed on tight; the design of the stubs prevents the cap being twisted off the bottle since they act as a one-way ratchet. The bottle cannot then be user re-filled; this is important to maintain the integrity of the system.

Figure 25D:
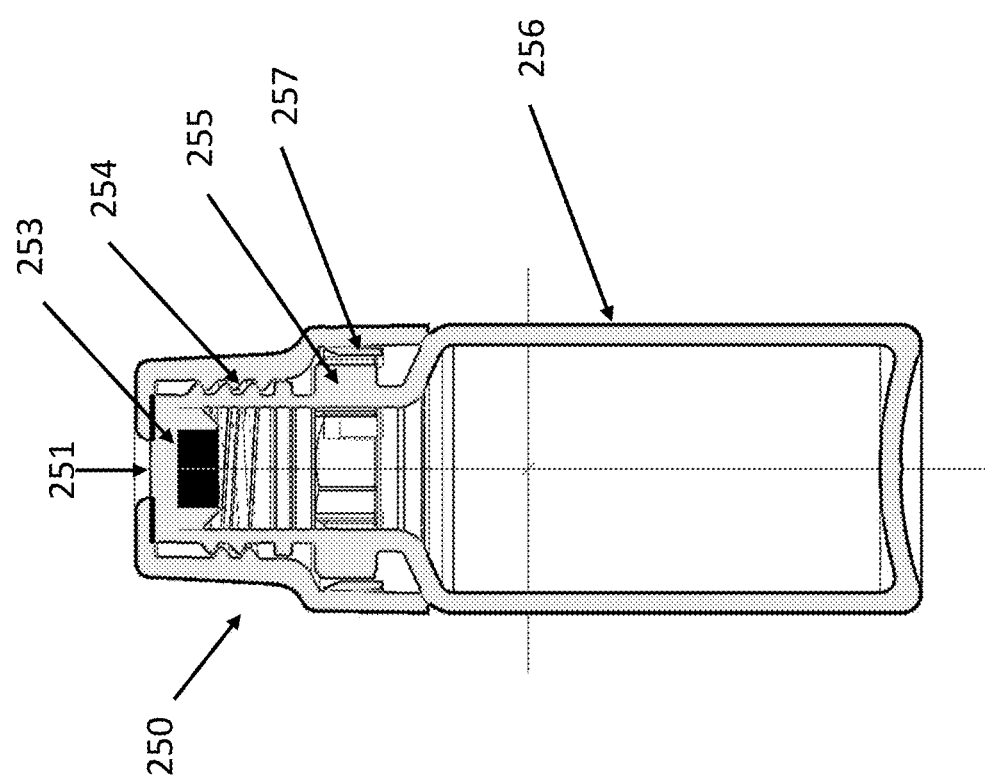

FIG. 25D is a cross-sectional view of the bottle with the cap 250 fully screwed onto the body 256. The central hole 251 is shown, sitting directly over the septa seal 253, which is fitted securely with a compression friction fit into the opening of the bottle, with flanges resting on the top surface of the bottle opening. The cap threads 254 engage with matching threads in the bottle neck; locking stubs 257 in the cap are locked against flanges 255, preventing the cap from being twisted off and hence preventing user re-filling with unauthorised liquids.

In use, the cap 250 is supplied with an adhesive label covering hole 251 to keep the septa seal 253 clean. When the bottle is to be placed in the refill dock, the user removes this label and inverts the bottle, which is then placed upside down and guided into position by aligning the slots 252 in the cap with matching ridges in the bottle port of the dock; the user presses the bottle down and this causes a needle or stem in the dock to puncture the pre-cut slit in the septa seal 253, enabling liquid in the bottle to be sucked from the bottle by the small electric peristaltic pump in the dock and pumped into the liquid reservoir in the vaping device. Slots 252 ensure that the bottle is rotationally fixed and stable when inserted into the dock, hence preventing damage that could occur to the liquid transport needle if the bottle were to be twisted when docked.

Note that the body 256 of the bottle is a standard blown polypropylene bottle, made and filled in the tens of millions; this ensures that the bottle is cheap to manufacture and can be handled by standard, high speed liquid filling equipment in the filling factory.

The 1-Piece Refillable Box or Bottle-Shaped Disposable Vaping Device

We will now describe the second variant of disposable vaping device, the box or bottle-shaped disposable vaping device.

Figure 26B:
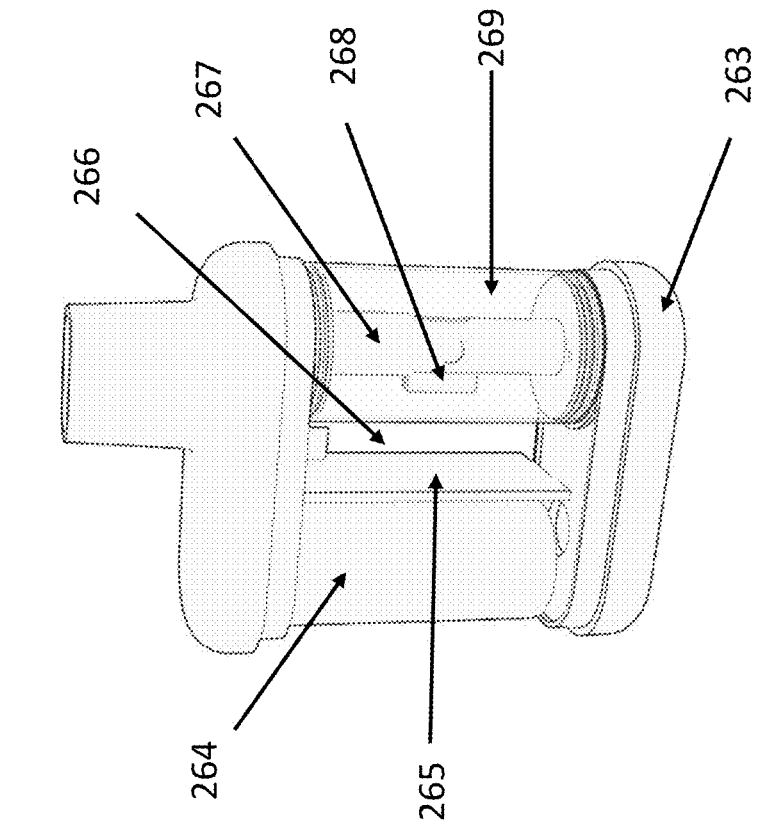
FIG. 26A-26B are views of the second variant of the hybrid disposable vaping device, i.e. the bottle or box shaped device.
Figure 26A:
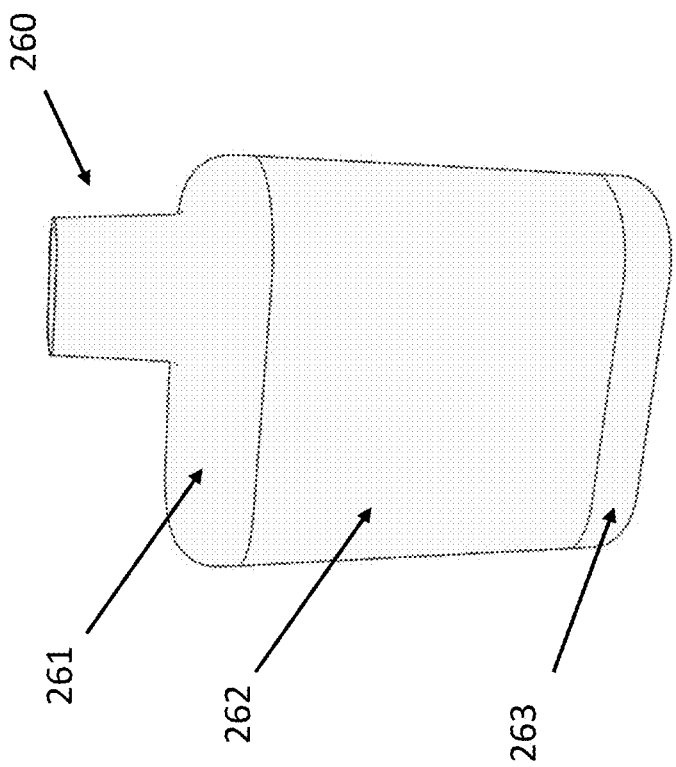

FIG. 26A shows the general box or bottle-like shape of this vaping device; it includes a mouthpiece 260 formed into a top section 261, all made of injection moulded plastic. The mouthpiece 260 is press-fitted to a single injection moulded plastic (or plastic extrusion) body casing 262, which in turn is press-fitted to an injection moulded plastic base section 263. FIG. 26B shows the main internal features, but before we describe that, we will turn first to FIG. 27, which shows the internal structure of the body 262; body 262 includes a one-piece injection moulded (or extruded) plastic item that includes the external body wall 273, shaped with semi-circular ends and generally flat sides that taper inwards towards the base, to aid release or ejection from a low cost mould. The body 262 is also formed with a cylindrical chamber 271, which is a compartment for a hollow cylindrical foam liquid reservoir, with a heating element passing up through the central hollow. Note that the body, and in particular the cylindrical chamber 271, are made of plastic to not affect the operation of the capacitive-sensing liquid level sensing system in the dock; this uses capacitive measuring plates that partially surround the cylindrical chamber 271; as noted above, these plates are backed by grounded shielding plates (not shown) and hence detect the level of liquid present in the foam reservoir inside the chamber 271, with minimal interference from objects outside of the chamber.

Figure 27:
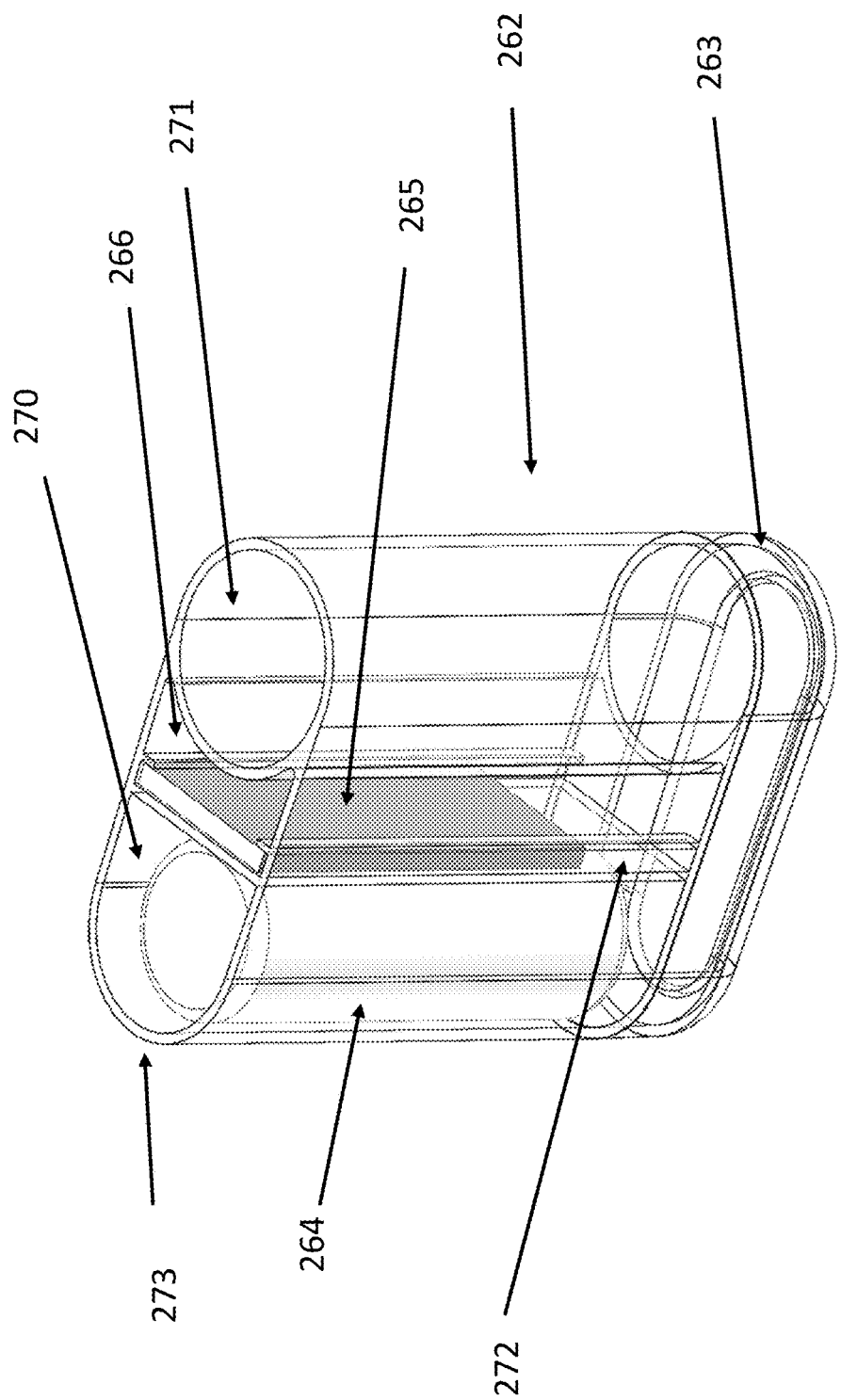
FIG. 27 is a view of the main body of the bottle or box shaped disposable vaping device, showing the separate, internal compartments for a rechargeable battery and the liquid reservoir/heater assembly.

The body 262 also includes a battery chamber 270, shown with a battery 264 in position. rechargeable lithium ion batters can sell in size, and the battery chamber 270 accommodates battery swelling. The PCB 265 is mounted vertically and seals the battery chamber 270 and removes the need for there to be any additional physical barrier, whilst also proving crush strength for the body 262; PCB 265 is slid into the body 262 along guide slots 272; FIG. 27 shows the PCB 265 not reaching the base of the compartment 270 to more clearly show the side guide rails 272; in practice, PCB 265 extends along the entire length of the guide rails 272 to fully seal off the battery chamber 270. All components on the PCB 265 face towards the battery 264 to avoid interfering with the capacitive liquid level sensing system; the PCB 265 implements all control functions, including PWM power control, for the vaping device; it can implement the temperature control algorithms described earlier in Section A. At the top of the PCB 265 can be a light or set of lights to give user feedback (e.g. whether operation, at the right temperature, requires re-charging), visible through a small aperture in the top section 261 and also a haptic feedback device (e.g. giving a subtle vibration when the device is ready for use, or about to run out of charge etc).

A void 266 then separates the rear-side of the PCB (with no components) from the cylindrical chamber 271; the purpose of this void is to ensure minimal interference between the battery 264 and PCB 265 with the capacitive liquid level sensing system in the refill dock, which measures the capacitive of the materials inside the cylindrical chamber 271, which varies as the level of liquid in the foam reservoir (not shown) alters.

The body 262 sits on a plastic injection moulded base 263. With this design of body 262, it becomes fast to slide in the key components into the body-namely, the battery 264, PCB 265 and the foam core 269 with internal heating element 267, 268. Equally important, it is also easy to remove these components for recycling: in practice, an automated or manual recycling machine would remove the top section 261 and the base section 263, leaving just the body section 262, including battery 264, PCB 265 and the foam core 269 with internal heating element 267, 268. A rod would be pushed into the battery compartment 270, pushing the battery out; since the PCB 265 will in practice be connected via a tape to the battery 264, the PCB 265 is also removed, moving down guide rails 272. Battery 264 and PCB 265 can then be readily separated for recycling. Another rod is pushed into the cylindrical chamber 271, pushing out the foam reservoir 269 with internal heating element 267, 268; these can then be safely disposed of, or recycled if possible. The plastic body 262 can then itself be recycled (see for example 'Section E: Recycling propylene nicotine bottles' for one way of achieving this; the body is in effect a nicotine contained since the cylindrical chamber 271 acts as a nicotine liquid reservoir contained). Conventional vaping devices do not have compartments like the compartments 270, 271 in this implementation, making automated, fast disassembly for re-cycling far harder.

Note that the implementations described in Section include a battery that is built-in and not user-removable. In some countries, there is regulatory pressure for vaping devices to include removable batteries to facilitate battery re-cycling. Because of the case with which the battery can in practice be removed from the body in the box or bottle format vaping device, this design may well be compliant with this form of regulatory requirement. The battery could also be clipped or secured into position in a way that the user could unclip, enabling the user to remove the battery for re-cycling at end-of-life.

Returning now to FIG. 26B, we see the device with the wall elements of the body 262 removed, but showing the battery 264 and PCB 265. The cylindrical foam liquid reservoir 269 is shown translucent to expose the internal heater structure (in reality, the foam core is opaque). The internal heater structure is positioned in a generally cylindrical hollow running up through the central long axis of the cylindrical foam liquid reservoir 269; it includes a metal or fabric tube or chimney 267 and a cotton tab 268 that extends into the foam liquid reservoir 269 and wicks liquid from the reservoir; a heating element inside the chimney contacts the cotton tab and hence generates vapour when it is resistively heated; the heating element can be any suitable and safe heating element as noted earlier (e.g. mesh, wound metal wire etc).

Figure 28:
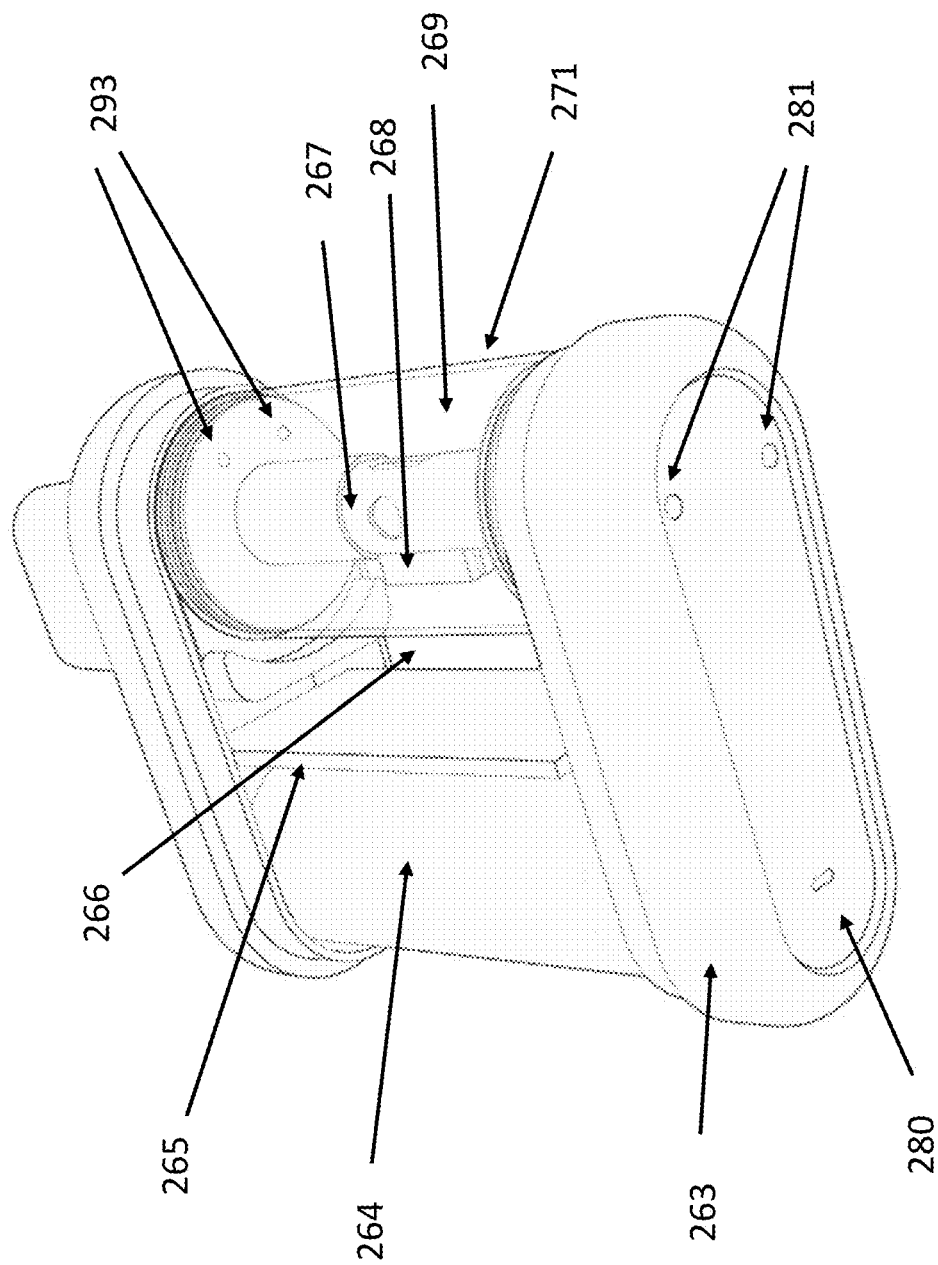
FIG. 28 shows the bottle or box shaped disposable vaping device with casing removed, revealing the key internal components and structures.

FIG. 28 is a view of the FIG. 26B arrangement, but from below. New features now visible are the air inlet 280; this leads to an internal airpath that leads to the base of the metal tube 267, enabling air to be drawn in when the user inhales and to pass over the heating element in the metal tube 267. Also shown are a pair of small, circular apertures 281 (approximately 0.8 mm in diameter) through which the liquid filling nozzles or stems in the refilling dock can pass; these apertures leads to channels that the filling nozzles enter (their length is about 24 mm). The filling nozzles penetrate into the foam liquid reservoir 269 by at least 5 mm, to enable liquid to be fed directly into the foam liquid reservoir 269.

Figure 29:
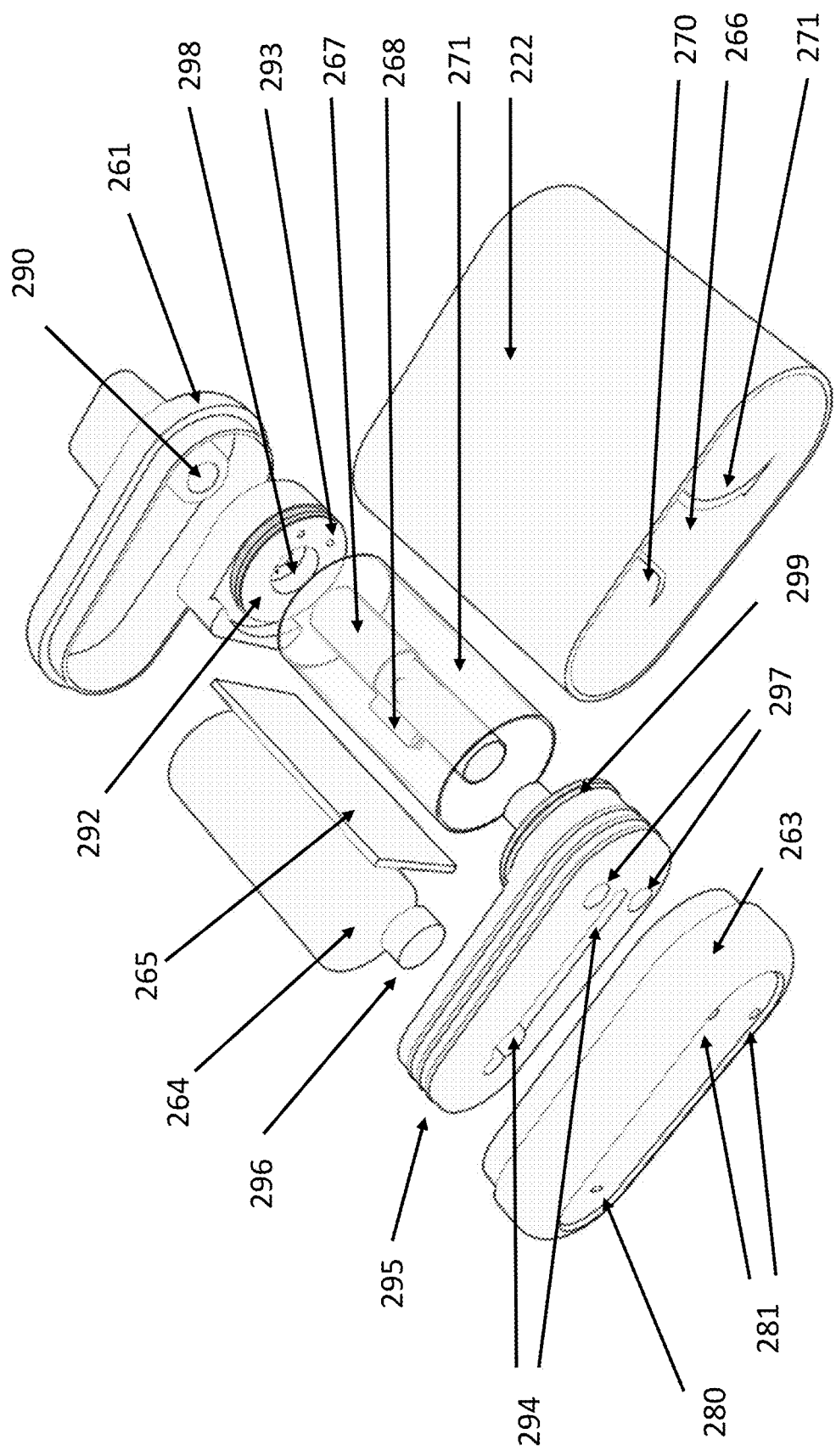
FIG. 29 is an exploded view of the disposable vaping device shown in FIG. 28.

FIG. 29 is an exploded view of the FIG. 26B and FIG. 27 arrangement. New features now visible are an internal silicone base section 295 that sits inside the base section 263; silicone section 295 includes an air passage 294 that enables air drawn in from the air intake 280 to trigger activation of the pressure sensor 296 and then pass up through the metal or fabric tube that contains the heating element, and the vapour nozzle 290 in top section 261. Pressure sensor 296 also includes the recharging circuit needed for the rechargeable battery, so that only two external electrical contacts are needed and these are connected to the recharging circuit, which in turn provides power to the battery and the pressure sensor. The battery provides all power for the PCB components, as well as the heater element. The silicone section 295 also includes twin channels 297 through which the liquid feed nozzles (not shown—but typically 24 mm in length and designed to penetrate significantly into the foam) in the deck (not shown) or the liquid from those nozzles passes. As the nozzles withdraw from the device, the silicone channels wipe liquid off the nozzles so that the nozzles do not leave any liquid in the base of the filling dock port. The silicone channels also seal and close as the nozzles are withdrawn, to provide a liquid tight seal to the foam reservoir. Silicone base section 295 also has integral 'O' rings 299 that seal the base of the cylindrical compartment 271 that includes the foam-based liquid reservoir and the heater. Silicone section 295 hence provides a number of different functions: the lower seal to the liquid compartment 271; a seal to the liquid injection apertures 281, 297; a seal for the pressure sensor 296; a seal around the charging contacts (not shown); and an air seal to the base section 263.

FIG. 29 also shows, above the cylindrical compartment 271 that contains the cylindrical foam liquid reservoir 269, a silicone top plug 292 with integral 'O' rings that seals the compartment 271, but allows vapour to escape through aperture 298 in the silicone plug 292 and pass into the vapour nozzle 290 in top section 261. Silicone top plug 292 also includes two small holes 293 for air to escape (for air pressure equalisation during liquid filling) and also for electrical leads, connected to electronics in PCB 265, to pass through and then down to the heater element in metal tube 267. Separate holes for the electrical leads may also be provided. The base section 263 also includes external electrical charge contacts (not shown) that connect to charge contacts in the dock and provide power to the battery 264 via a recharge circuit on PCB 265.

Figure 30:
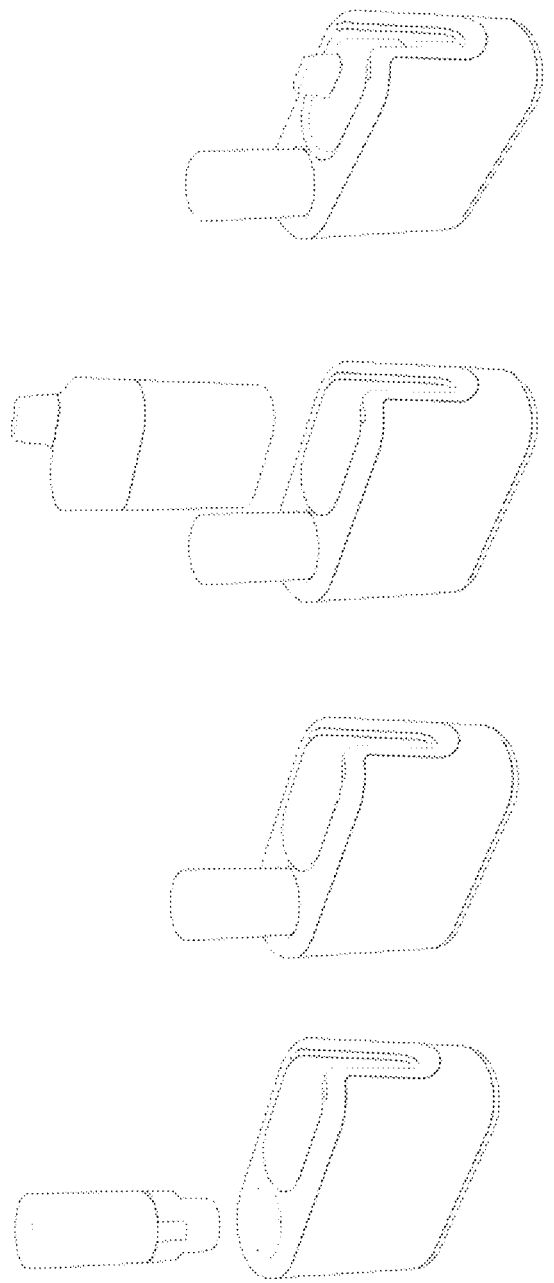
FIG. 30 shows the interaction sequence of taking a refill bottle and inserting that when inverted into a port in the refill dock; then taking a bottle or box-shaped disposable vaping device and inserting that into a second port in the refill dock.

FIG. 30 shows a typical interaction sequence, mirroring the FIG. 23 sequence, but using the box or bottle format disposable vaping device.

Figure 31B:
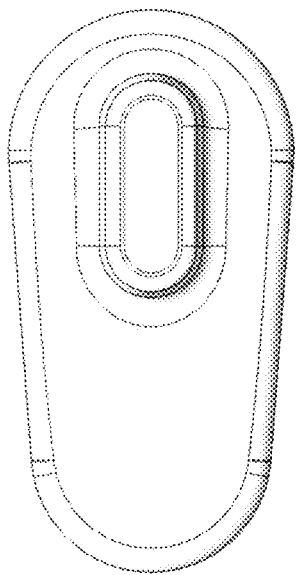
FIG. 31A-31B are side and top-down views of the bottle or box shaped disposable vaping device.
Figure 31A:
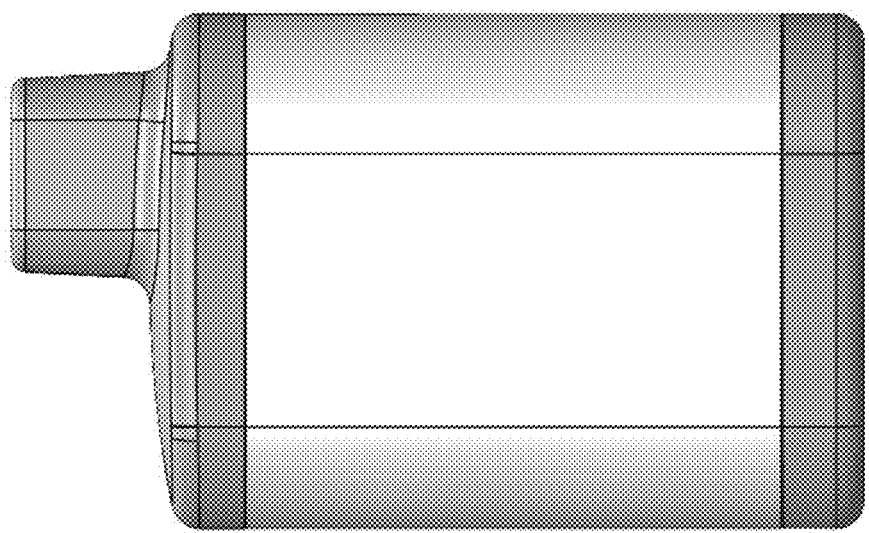

FIG. 31A shows a side view of the device; the sides are shown as parallel, but may taper or slope to facilitate ejection from simple moulds. FIG. 31B, the top down view, shows that the shape of the base and body is asymmetric so that there is only one way to dock it correctly; this protects the liquid filling nozzles in the dock from damage associated with incorrect docking.

The box or bottle format disposable vaping device has some advantages over the tube or bar format device described in FIGS. 10-24. It fills into the base of the device, hence without the need for the vaping device to be inverted; this is potentially more hygienic, especially for refill docks used in bars, and clubs (like the FIG. 24 unit). The electrical charging contacts on the device can be located further from the liquid filling apertures than is possible with the tube or bar format device. It is also larger in volume than the tube or bar format device, enabling a larger foam liquid reservoir, larger battery, larger PCB, greater tolerance in inserting components and hence case of rapid manufacturing.

We can Generalise to:

A disposable vaping device system, including vaping device with a liquid reservoir that is substantially filled with liquid, and is configured so that the liquid reservoir cannot be replaced by the user, and further includes a rechargeable battery;

the vaping device being further configured to be automatically re-fillable with liquid and re-chargeable by being inserted or docked, whole and not disassembled, into an automatic liquid re-filling and re-charging device to which a liquid refill bottle or container can be connected or inserted.

Section F describes the Key Features of this implementation. Other features of this system are as described in Sections A, C, D and E, including the Key and Optional Features described in or related to those sections.

Section C: Dynamic Battery Charging Dependent on the Liquid Fill Level in the Vaping Device If there is liquid in the liquid reservoir of the vaping device whilst the heating element is being heated, and the heating element sits on a cotton wicking material, then the cotton wicking material will not burn if the vaping device uses the closed loop temperature control system described above. But if the liquid does run out, then the cotton material can heat above its burn temperature as the heating element is continuously maintained at a temperature above the cotton burn temperature; the cotton will burn, giving an unpleasant taste to the inhaled vapour.

In order to stop the cotton (or other substrate or wicking material) burning, one implementation of the system can automatically make sure that it is not possible to heat the heating element whilst the cotton or other wicking substrate is dry. One way to do this, without the complication of trying to detect dry cotton or other dry-vape conditions, is to ensure that there will always be liquid in the pod whenever the heating element is heated, or to put it another way, to make sure that the battery runs out of charge before the liquid in the liquid reservoir runs out. This is especially useful for low-cost disposable devices, where the cost and complexity of circuitry to detect dry vape conditions can be prohibitive.

In this Section C, we describe how to implement this in the context of a re-fillable vaping device. The re-fillable vaping device may have a tip that can be removed by an end-user for re-filling, or replacement at the end of its life (typically after 3500 puffs), or it can be a 'disposable' vaping device where the tip is not designed to be removed by an end-user from the main body of the vaping device (the main body includes the battery and electronics). Disposable vaping devices have been described earlier, in Section B.

In a first approach, the vaping system (typically the re-charge and re-fill device, which can be a desktop device, e.g. as shown in PCT/GB2019/052922 or in Section B of this specification), automatically ensures that the available power in the battery (i.e. energy stored in the battery that sends current to the heating element) is not enough to vapourise substantially all of the liquid contained within the liquid reservoir of the vaping device (the liquid reservoir may be in the pod or tip, or may be in the body of the vaping device). This ensures that a 'dry vape' condition cannot arise.

To do this, the system designers do a statistical calculation, backed up with prior practical testing, to determine the capacity of the battery/compared to the liquid capacity of the liquid reservoir. The calculation needs to take into account variations (e.g. between different devices) in battery capacity, variation in useable charge from the battery, variation in the liquid fill level, variation in the amount of power used to vapourise the liquid under all conditions of temperature, pressure, etc, draw strength, liquid vapourisation energy, electrical circuit variation, etc. So in practice, when designing this system, the system designers make this calculation and back it up with practical testing and then leave some margin for error.

In a second approach, the vaping system can use a switch to automatically shut off the battery after it has dispensed a certain amount of power, and that power is known, with a high degree of confidence, to be insufficient to vaporise all of the liquid stored in the liquid reservoir. This second approach can be used in both liquid re-fillable devices and also devices with a pre-filled liquid reservoir and that are not designed to be user re-fillable. The advantage of this second approach is that the result will be guaranteed to be invariant of battery capacity due to wear and age/charging cycles, but in practice we are not intending the product to have a long life so this is probably not too much of an issue. Making the battery smaller also helps with both commercial and environmental costs as well.

The first approach will satisfy the full liquid and battery charge criteria but we must also look at a partial liquid refill, where the liquid reservoir does not get fully filled for some reason. That is, it must not be possible to partially fill the liquid reservoir but completely recharge the battery. Now under normal circumstances this will not happen since the automated liquid filling will take a fraction of the time of battery charging, but it is not impossible for it to happen, especially if the filling socket is separate from the charging as in Section B.

At the moment the liquid reservoir in a vaping device can get partially refilled in a refill dock, the device taken out of the re-filling socket of the dock and put into the charging socket (see Section B) and then fully recharged. Essentially, with the triple port dock (see FIGS. 11-15), the liquid level sense is done in the dedicated re-filling socket and the device is then moved to the dedicated re-charging socket, so once it is charging there is no certain knowledge of how much liquid is in the pod and therefore we cannot modify the heat cycle. We can simply assume that the last measured level of liquid in the pod is the level of liquid in the pod when it is placed into the dedicated re-charging socket, but that is a weak assumption that will fail in practice.

One solution is to combine the refilling and recharging into a single socket (see Section B, FIGS. 17-24 and FIG. 30) so that we have control of both at the same time, including using the liquid level sensing in the dock to know how much liquid there is in the pod while we recharge it. With the Section B design shown in FIGS. 17-24 and FIG. 30, this means that we have to have the refill liquid and recharge battery at the same end (i.e. the mouth end) of the vapouriser.

We can do this in Two Different Ways:
 a) The system automatically refills first and only starts to charge once the pod is completely full. This will make the whole refill/recharge process slightly longer but will be a fail safe way of ensuring that the pod is always full.
 b) or we do both at the same time safe in the knowledge that under normal circumstances the pod will always refill before the battery is recharged.

The problem with b) is that for some reason the pod might not refill, the most likely cause being that the refill capsule does not have enough liquid in it. So the system includes an algorithm to start the process but only proportionally charge depending on the liquid level measurement progressing.

As a consequence of, in the cylinder or bar format vaping device, having the battery recharge and pod refill at the mouth end of the vapouriser we have to ensure that:
 a) The user cannot suck liquid out of the refill-valve in the pod whilst vaping, and the user cannot feel the valve when the pod is in their mouth.
 b) The user does not get an electrical shock from the battery charging terminals despite their mouth/saliva shorting the terminals and again, the user cannot feel the battery terminals in their mouth whilst vaping.

Item a) needs to be mechanically designed so that this does not happen.

These problems do not arise with the box or bottle format vaping device (See FIGS. 26-31).

To make the vapouriser as cheap as possible we have the battery recharge circuit in the dock. This means that to stop item b) happening we include an electronic switch in the battery circuit to prevent any energy coming back out of the vapouriser during vaping but of course still allow charge to go into the battery whilst charging.

We can Generalise this to:

A vaping system including (i) a battery re-charging sub-system configured to re-charge a battery in a vaping device, where the vaping device includes a liquid reservoir that provides liquid to a heating element in the vaping device; (ii) an automatic liquid filling device configured to automatically refill the liquid reservoir in the vaping device and (iii) an electronic liquid level sensing sub-system configured to automatically sense or measure the level or amount of liquid in the reservoir;

and in which the battery re-charging sub-system is configured to control the amount of charge or energy delivered to or stored in the battery, depending on data from the liquid level sensing sub-system.

Optional features include any one or more of the following:

The Battery Re-Charging Sub-System
 the battery re-charging sub-system is configured to control the amount of charge or energy delivered to or stored in the battery so that the charge or energy in the battery will battery will substantially run out or fall below a threshold needed to drive the heating element above a set temperature, before the liquid reservoir runs out of liquid.

the battery re-charging sub-system is configured to monitor the charge level of the rechargeable battery and the amount or level of liquid in the liquid reservoir, and to regulate the amount of power delivered to or stored in the battery so that the battery will cease to operate because it has run out of charge, or has fallen below a pre-set charge level, before the amount of liquid in the liquid reservoir falls below a pre-set amount, to thereby prevent the occurrence of dry vaping.

the battery re-charging sub-system is configured to control the amount of charge or energy stored in the battery so that the battery will cease to provide power sufficient to cause a wicking element to burn before the liquid reservoir runs out of liquid.

the battery re-charging sub-system includes a main control circuit in the automatic liquid filling device.

the battery re-charging sub-system includes a main control circuit in the vaping device.

the battery re-charging sub-system is configured with a control algorithm that implements a statistical calculation that determines the capacity of the battery as compared to the liquid capacity of the liquid reservoir.

The calculation takes into account one or more of the following variations between different devices: battery capacity, variation in useable charge from the battery, variation in the liquid fill level measurement, variation in the amount of power used to vapourise the liquid under all conditions of temperature, pressure, etc, draw strength, liquid vapourisation energy, electrical circuit variation.

the battery re-charging sub-system is configured with a control algorithm that causes a switch to automatically shut off the battery after it has dispensed a certain amount of power, and that power is known to be insufficient to vaporise all of the liquid stored in the liquid reservoir when the liquid reservoir has been filled to a set level or amount.

Other features of this system are as described in Sections A, B, D, and F including the Key and Optional Features described in or related to those sections.

Section D: Always on Data Connectivity

In this Section D, we describe a connected vaping or HNB or cannabinoid vaporiser that is data connected and needs no user set up (e.g. there is no need to create an account or log on to a user's Wi-Fi or set up a Bluetooth connection). Instead, the device automatically connects when it is first turned on; it includes a simple, very low cost Low Power Network transceiver and can automatically connect and send/receive data over a Low Power Network, e.g. Low Power Wide Area Network such as LoRaWAN networks provided by several operators, e.g. Helium, TTN, Senet and MachineQ (Comcast). This approach is especially useful for disposable vapourises devices, namely vaping devices that are to be sold to an end-user with a pre-filled liquid reservoir and a pre-charged battery so that the end-user can (i) immediately vape on the device after purchase and (ii) can either discard the device once the pre-charged battery is depleted or (iii) automatically re-charge and re-fill the device at a re-filling device. For disposable devices, the main consumer appeal is the convenience of being able to use the devices out-of-the-box, with no user set up and no swapping a used tip for a new one (a slightly fiddly and potentially messy process). The likelihood of a user of a disposable vaping device going to the trouble of linking the device to an app or web-browser based app on their smartphone, or to a Wi-fi network, is minimal, and so the assumption has been that disposable vaping devices will not be connected devices.

An 'always-connected' device, that implements the features described in this Section D, enables a device manufacturer, consumer or other entity to: (i) understand how and where a device is being used; (ii) allow a consumer to find a lost device; (iii) establish a direct manufacturer/device vendor relationship with individual consumers, enabling e.g. auto-fulfillment for replacement devices or liquid bottles when a device or bottle is close to being empty, subscription based supply of devices or liquids; (iv) enable location based disablement (e.g. within a school boundary or area in a school (e.g. toilets, common rooms there could be a LoRaWAN transmitter that sends a 'disable' signal to all devices whilst they are in range of the transmitter). The final point, location-based disablement, is especially valuable for disposable vaping devices, since this category has become very popular with under-age (e.g., school age) users, causing significant alarm amongst not only responsible manufacturers but also public health authorities.

This section describes a LPWAN (Low Power Wide Area Network) Connectivity Demonstrator. This demonstrator focuses on connectivity provided by LoRaWAN networks provided by several operators such as Helium, TTN, Senet and MachineQ (Comcast). LoRaWAN networks are based on LoRa technology developed by the Semtech corporation (San Francisco based semiconductor supplier). The technology uses sub-GHz un-licensed bands for wireless communication and as such each access point has a greater area coverage than corresponding higher frequency 4G, 5G mobile cells. LoRaWAN networks are designed for the IoT, m2m comms with devices transmitting small packets of data infrequently to the internet, typically by remote monitoring devices.

LoRaWAN network providers can be split into public geographically large networks and private smaller typically building wide networks. The public networks are formed by private individuals setting up access points on a pay per usage model with an operator. The access points will typically connect into the owner's Wi-Fi for wide area connectivity. As such network coverage can be patchy and tends to be located in major population centres. Network coverage is growing, however.

We will consider the Helium Network for this study; One of the largest LoRaWAN networks is operated by Helium. It operates on a pay per use basis where each packet of 24 bytes costs 0.00001 USD to send. Once a device ID is setup on the network it will connect when in range with no user input.

We have demonstrated this with a dev kit: We have connected a development board to the Helium network to transmit dummy data from a device and receive it in the cloud. The dev board transmits environmental data rather than vaping data but apart from that the principle is identical. The next step will be to generate pseudo puff data packets to give additional realism to the demonstration before finally integrating the hardware to a vaping device. The next section shows the environmental data interpreted by a web service called mydevice.com. In our application we would strip off the required data received by the Helium network and forward it onto our servers to process as we do at the moment.

The Helium data packet, amongst other things, contains the following information.

Device ID—will uniquely identify the device.
Lat and long—of the base station.
Time and date—of the transmission.
RSSI (signal strength)—of the device signal received by the base station.
Payload—device data (24 bytes).

The lat/long is for the base station not the device. So RSSI or triangulation of RSSI with base station can give a more precise reading of the device's position when the data is being uploaded.

The assumption is that the data would be transmitted as soon as it is generated so that the location of the base station would be an indication of the location of the device. However, if the data is generated when the device is not close to a base station then it can be stored and upload when the device is next within range. Then of course the base station's position is not a good indication of device position but at least the difference between the transmission time and the recorded data time will be different and indicate that the position is unknown.

The maximum payload is 24 bytes, the first two bytes are defined for all types of data and the following 22 bytes may vary per data type.

Sequence (1 byte)—incrementing sequence to check for any missing.
Data Type (1 byte)—puff data structure below.
Data (per puff)
Puff Duration (1 byte).
Unix Time (5 bytes).
Liquid type/flavour (1 byte).
Battery level (1 byte).
Temperature of plate/coil/mesh (1 byte).
Power used (1 byte)
Liquid level of pod (1 byte)
Liquid level of capsule (1 byte)
Puff count (1 byte).
Liquid flavor/type (1 byte)

We can Generalise to:

A vaping device including a low power, wide area network chip or circuit configured to enable the device to receive and/or send vaping related data automatically over that low power, wide area network, without the user having to set up or configure the device to send data.

Optional features include any one or more of the following:

the vaping device automatically and without user interaction sends or broadcasts vaping related data.
the vaping device automatically and without user interaction sends or broadcasts vaping related data as an advertising signal, or another signal that does not require a pre-existing data connection with a receiver in the low power, wide area network.
the vaping related data describes how the device is being used.
the vaping related data describes when the device is being used.
the location of the low power, wide area network receiver that receives data from the vaping device defines where the vaping device is being used, e.g., for analytics and for a 'find-my-device' function.
the vaping related data includes vaping consumption data defining the type of liquid or other tobacco or HnB (heat not burn) substance consumed.
the vaping related data includes vaping consumption data defining whether the amount of vapable substance, such as liquid or tobacco or HnB (heat not burn) substance, remaining in the vaping device is below a threshold.
the vaping related data includes puff related data, including the timing and duration of puffs.
the vaping device is configured to receive a deactivation signal from a local transmitter that automatically causes the device to cease operation.
the deactivation signal is sent from a transmitter with a limited range, so that devices cease to operate within a defined area, such as a school, or room or area in a school, or a bus or a train or other environment where vaping or smoking is not permitted.
the vaping device is a disposable vaping device.

Other features of this system are as described in Sections A, B, C, and E, including the Key and Optional Features described in or related to those sections.

AyrLock™

Another variant is for a connected vaping or HNB or cannabinoid vaporiser device that specifically addresses the very significant problem of underage use, and use in environments where vaping etc is not allowed. We refer to this as the 'AYRLock' system. The vapouriser device equipped with AYRLock technology is data connected without needing any user set up; it picks up signals from a Bluetooth beacon (or a similar device that emits a radio signal that other devices can pick up) and the device automatically self-disables vaping whilst in range, or for a pre-set time (e.g. 2 hours, or 12 hours—the time can be set by the signal and hence varied by an administrator or fixed in the device). So the device includes a low cost receiver chip (e.g. Bluetooth receiver chip) that is set to react to the specific signals sent from the Bluetooth beacon and is programmed to stop the device vaping, if that beacon signal is detected. There is no need to pair the vapouriser device to any Bluetooth beacon. Bluetooth receiver chips are significantly cheaper than LoRaWAN chips; the former are typically a few cents, whereas the latter are currently several dollars.

A Bluetooth BLE beacon is both very cheap (e.g. sub $5) and is hence widely deployable at low cost in schools and other areas where vaping should be discouraged. The beacon could be battery powered and therefore very easy to install, of limited transmission distance and therefore is less likely to interfere with people just outside of the school's grounds or other areas where vaping etc is being discouraged. It can readily made to be a directional signal that is blocked or shielded from areas meant to be unaffected by the deactivation signal.

Since they are so cheap and easy to install, the school et. could mount several beacon devices around risk areas of the school-bike sheds, toilets, staff rooms, etc. An administrator can readily check the beacon's transmission strength just using their mobile phones, and so it would be easy for them to move them to the optimal places. Beacons can be omnidirectional and can also be directional; the latter is useful to avoid spillage of the beacon's signal into the street or other public area, where ordinary users are permitted to vape etc.

There has to be something about the beacon signal that will indicate that it is part of the Ayrlock system which can be detected by the vaporizer, e.g., a specific (known) range of MAC addresses, the advertising name itself or data within the beacon advertising transmission, etc. The current demonstrator uses a specific range of MAC addresses. Commercially available beacons are programmable so at least one of these feature can be readily added to generic beacons or specific pre-programmed beacons could be purchased.

The vaporizer has a BLE central device-chip plus antenna-within it to periodically scan for the beacon signal. Once detected it should stop itself from being able to be vaped, e.g., by stopping the firing of the coil. Once it detects the absence of the beacon signal it can release the lock and allow vaping to continue as normal. If a vape is attempted, whilst detecting a signal broadcast from the beacon, the device could sound an alarm as well as just disabling itself.

The beacon can also record (or send to the administrator's—e.g. headmaster's/mistress's App) the MAC of any vaporizer that attempts a vape on the premises, as a help in identifying the vaper along with an estimate of where the vapouriser is based on RSSI and beacon location. A Bluetooth mesh may be needed to get the signal to the phone with the App on it. The MAC address of the vapouriser that had an attempted vape can be captured by the beacon and then, in theory be traced back to a shipment, and in theory presumably traced back to the shop that sold it and if GDPR allows to a credit card.

A user may try to mask the vapouriser device from receiving the 'turn-off' signal from the beacon, e.g. by covering the device in metal foil or otherwise shielding it from wireless signals. Since Bluetooth signals are ubiquitous in most locations, the device may infer that, if it can detect no Bluetooth signals at all, that it is being shielded in some way and will then also automatically disable itself—e.g. whilst no Bluetooth signals at all are detected, or for a set time (30 minutes, 2 hours etc). This feature may be further enhanced by detecting the abrupt loss of signal as the vaporizer is shielded. The device could also sound an alarm as well as disabling itself if it detected an absence of any Bluetooth signals.

The owner/manager of the area to be restricted will have to purchase beacons and site them appropriately to maximise their coverage of the area but also restrict interference with vaping outside of the area. There are two complications: first, the BLE transmit range is notoriously both short and also difficult to predict. It is affected by obstacles, e.g., walls and doors, as well as reflections, dead zones etc. So, a large area with many obstacles may need more than one beacon or simply just have one beacon placed close to an area known for being at risk of unwanted vaping. It may be advantageous to "map" the signal strength to identify the best places to site the beacon(s).

The second complication is that BLE can sometimes extend too far: the area where the signal can be picked up should be limited so as not to inconvenience legitimate use outside of the restricted area. There are several possible solutions to this from careful siting of the beacon(s), careful orientation of directional beacons, to adjustment of their transmit power, to adding a time delay from pick up of the beacon's signal to actual inhibiting of the vaping, to allow a casual passerby to continue to vape as they briefly pass though the beacon's transmit signal.

Another issue is beacon battery life: the battery will of course eventually run out and since beacons are likely to be placed somewhere not too accessible—to prevent tampering—the lifetime should be long enough to make it relatively hassle free to maintain the system. Many beacons have a guaranteed battery life of 3 years, and this could be extended depending on the size of the batteries used in the final system.

As well as a basic system to stop vaping there are enhancements that might be added:

1. The beacon could be modified with enhanced capabilities to also have peripheral functionality to allow it to connect to the vapouriser and capture details of the vapouriser, such as its MAC address. This could be stored within the beacon and then read back by a suitable authority and used to try to detect which vapouriser was present in the area, or which vapouriser was attempted to be vaped.
2. As an additional feature it may be possible to go further and find out where it was sold, who manufactured it, when it was sold, who bought it, etc.
3. Statistics of how many attempts to vape were attempted, where and when they were attempted, in real time or not, etc. could also be captured by the beacon(s). A special App could download these statistics and act on them.
4. An App could also be used to manage the system and monitor the status, e.g., check for battery failure, tamper detection, real time alerts of attempted vapes, etc.
5. Multiple beacons could be meshed together to share data and allow management of a wider area all from one central point.
6. The vapouriser itself could be fitted with an alert e.g., light or sound, to indicate that a vape in a restricted area was attempted. This would also help with any confusion of legitimate usage passing close to a restricted area.
7. Cost—although the cost of a BLE central device is not too expensive, especially in large volumes, it is an additional cost. The system may therefore work best for refillable/rechargeable vapourisers where the cost, as well as environmental impact, can be spread over a longer lifetime.
8. Vapourisers typically have relatively large batteries to be able to heat the coil, but BLE scanning will use some capacity. The scan rate may therefore be adjusted to reduce the impact, another reason to have the ability to recharge the vapouriser battery.

We can Generalise to:

A vapouriser device including a low power, short range wireless chip or circuit configured to enable the device to receive a deactivation signal from a local transmitter or beacon, and process that signal to automatically disable itself or cause itself to cease operation.

Optional features include any one or more of the following:
- the low power, short range wireless chip is a Bluetooth or BLE chip.
- the deactivation signal is a directional signal that is blocked or shielded from areas meant to be unaffected by the deactivation signal.
- the device is configured to cease operation whilst receiving the deactivation signal or for a pre-set time or duration, such as 30 minutes or 1 hour.
- the device is configured to cease operation if it fails to detect any wireless signals, to prevent EM shielding of the device from successfully defeating the deactivation signal.
- the device is configured to generate an alarm, e.g. visual, audio and/or haptic, when disabling itself.
- the device is configured to send a signal when automatically disabling itself or causing itself to cease operation.
- the device is configured to send its MAC address to the local transmitter or beacon when automatically disabling itself or causing itself to cease operation.

We can Also Generalise to:

A low power, short range wireless transmitter or beacon configured to broadcast a deactivation signal that, when received by a vaping device, causes that vaping device to automatically cease operation.

Optional features include any one or more of the following:

- the low power, short range wireless transmitter is a Bluetooth or BLE transmitter or beacon.
- the deactivation signal is a directional signal that is blocked or shielded from areas meant to be unaffected by the deactivation signal.
- the deactivation signal is configured to cause the vaping device to cease operation for a pre-set time or duration, such as 30 minutes or 1 hour.
- the transmitter or beacon is configured to record (or send to the administrator's—e.g. headmaster's/mistress's App) the MAC address of any vaporizer that attempts a vape on the premises.
- the transmitter or beacon is configured to be positioned in an environment where vaping is not permitted, such as a school, part of a school, or in the vicinity of a school.
- the transmitter or beacon is configured to be positioned in an environment where vaping is not permitted, such as a bus, plane, or train.
- the transmitter or beacon is in a portable device.

Section E: Recycling Propylene Nicotine Bottles

Nicotine e-liquid is typically a mixture of propylene glycol and vegetable glycerine and nicotine salts and is typically supplied to consumers in small (e.g. 10 mL) bottles or in pre-filled tips that are designed to fit on to the end of a vaping device. These bottles and tips are manufactured in very large numbers (100M+) but normal recycling techniques cannot handle nicotine-contaminated polypropylene and these bottles and tips are hence sent to landfill; this is a very large and growing environmental problem. To date, there is no accepted method of manufacturing pure polymers from nicotine-contaminated polymer containers. In this Section E, we describe one such method. It re-purposes a polymer purification process that has been used for purifying polypropylene that includes spoiled food residue and residual perfume components.

The method involves obtaining the reclaimed polypropylene and contacting it at an elevated temperature and pressure with a fluid solvent to produce an extracted reclaimed polypropylene. The extracted reclaimed polypropylene is dissolved in a solvent at an elevated temperature and pressure to produce a polypropylene solution, which is purified at an elevated temperature and pressure by contacting the polypropylene solution with solid media to produce a purer polypropylene solution. A purer polypropylene is then separated from the purer polypropylene solution.

More Specifically, we Disclose:

1. A method for purifying a reclaimed polypropylene nicotine container, comprising:
   (a) obtaining the reclaimed polypropylene wherein said reclaimed polypropylene is selected from the group consisting of post-consumer use polymers, post-industrial use polymers, and combinations thereof;
   (b) contacting the reclaimed polypropylene at a temperature from about 80° C. to about 220° C. and at a pressure from about 150 psig (1.03 MPa) to about 15,000 psig (103.42 MPa) with a first fluid solvent having a standard boiling point less than about 70° C., to produce an extracted reclaimed polypropylene;
   (c) dissolving the extracted reclaimed polypropylene in a solvent selected from the group consisting of the first fluid solvent, a second fluid solvent, and mixtures thereof, at a temperature from about 90° C. to about 220° C. and a pressure from about 350 psig (2.41 MPa) to about 20,000 psig (137.90 MPa) to produce a polypropylene solution;
   (d) purifying said polypropylene solution at a temperature from about 90° C. to about 220° C. and at a pressure from about 350 psig (2.41 MPa) to about 20,000 psig (137.90 MPa) by contacting said polypropylene solution with solid media to produce a purer polypropylene solution; and
   e. separating a purer polypropylene from said purer polypropylene solution;
      wherein said second fluid solvent has the same chemical composition or a different chemical composition as the first fluid solvent.

We incorporate by reference the contents of the following patents and applications, and re-purpose the inventions disclosed therein for the specific purpose of purifying reclaimed polypropylene nicotine containers, such as the nicotine containers that are used as the re-fill bottles for the automatic liquid re-filling system disclosed in PCT/GB2015/050571, PCT/GB2016/05270 and PCT/GB2019/052922, the contents of which are also incorporated by reference: U.S. Pat. Nos. 9,834,621, 9,982,066, 9,890,225, 9,695,259, 9,803,035, 10,450,436, 10,442,912, 10,465,058, 10,435,532, US20190390031, US20190390032, US20190390033, US20190390034.

Section F Key Features

In this Section F, we summarise the following Key Features A-P of the disposable vaping device and system described above.

A. Disposable vaping device that is re-fillable and re-chargeable
B. Disposable vaping device with capped charging level
C. Disposable vaping device with flexible liquid channels
D. Disposable vaping device with tip that includes both a re-fill port and re-charge contacts
E. Disposable vaping device with base that includes both a re-fill port
F. Disposable vaping device with a base that includes charging contacts
G. Disposable vaping device with vertically mounted PCB (printed circuit board) that separate the battery from a liquid reservoir compartment
H. Disposable vaping device with multi-function internal silicone base section
I. Disposable vaping device that tracks re-filling
J. Disposable vaping device with always on connectivity
K. Re-fill dock with bottle and device ports for a disposable vaping device
L. Retail re-fill dock with multiple bottles and device ports for disposable vaping devices
M. Re-fill bottle with septa seal for a vaping device refill system
N. Re-fill bottle with chip for a vaping device refill system
O. Inverted re-fill bottle filling for a vaping device refill system
P. Total disposable vaping device refill system Note that any of these Key Features A-P can be combined with any one or more compatible other Key Features A-P.

Key Features

A. Disposable Vaping Device that is Re-Fillable and Rechargeable

A disposable vaping device, including a liquid reservoir that is substantially filled with liquid, and is configured so that the liquid reservoir cannot be replaced by the user, and further includes a rechargeable battery;

the device being further configured to be automatically re-fillable with liquid and re-chargeable by being inserted or docked, whole and not disassembled, into an automatic liquid filling and re-charging device.

B. Disposable Vaping Device with Capped Charging Level
  1. A disposable vaping device including a liquid reservoir and a rechargeable battery, where the liquid reservoir is configured to be automatically re-filled with liquid multiple times and the rechargeable battery is configured to be automatically re-charged multiple times, at an automatic liquid filling device;
    and where the maximum charge stored in the rechargeable battery is controlled so that it is insufficient to atomise substantially all the liquid in the liquid reservoir, to thereby prevent any dry vape condition arising.

C. Disposable Vaping Device with Flexible Liquid Channels
  1. A disposable vaping device configured to be re-filled with liquid and also re-charged, multiple times and without any disassembly, by being inserted or docked whole into an automatic liquid filling device;
    and where the vaping device includes at least one flexible or deformable liquid aperture or channel that leads to a liquid reservoir in the vaping device, the flexible or deformable liquid channel or aperture being configured to only open when penetrated by a filling nozzle and to otherwise seal the liquid reservoir.

D. Disposable Vaping Device with Tip that Includes Both a Re-Fill Port and Re-Charge Contacts
  1. A disposable vaping device configured to be automatically re-filled with liquid and also automatically re-charged, multiple times and without any disassembly, when inserted or docked whole into an automatic liquid filling device;
    and where the device includes a tip that houses a heating element and also includes at least one vapour exit aperture, and in or adjacent to the tip; and the tip further includes (i) at least one aperture that leads directly to a liquid reservoir in the tip or a body of the device and (ii) electrical charging contacts that connect to a rechargeable battery in the device.

E. Disposable Vaping Device with a Base that Includes a Liquid Re-Fill Port
  1. A disposable vaping device configured to be automatically re-filled with liquid and also automatically re-charged, multiple times and without any disassembly, when inserted or docked whole into an automatic liquid filling device;
    and where the device includes a first compartment that houses a liquid reservoir and a heating element and a second compartment that houses a rechargeable battery; and a base section on which the first and second compartments are each mounted; and in which the base section includes (i) at least one aperture or channel that leads to the liquid reservoir.

F. Disposable Vaping Device with a Base that Includes Charging Contacts
  1. A disposable vaping device configured to be automatically re-filled with liquid and also automatically re-charged, multiple times and without any disassembly, when inserted or docked whole into an automatic liquid filling device;
    and where the device includes a first compartment that houses a liquid reservoir and a heating element and a second compartment that houses a rechargeable battery; and a base section on which the first and second compartments are each mounted; and in which the base section includes (i) electrical charging contacts that connect to the rechargeable battery in the device.

G. Disposable Vaping Device with Vertically Mounted PCB (Printed Circuit Board) that Separate the Battery from a Liquid Reservoir Compartment
  1. A disposable vaping device configured to be automatically re-filled with liquid and also automatically re-charged, multiple times and without any disassembly, when inserted or docked whole into an automatic liquid filling device;
    and where the device includes a first compartment that houses a liquid reservoir and a heating element and a second compartment that houses a rechargeable battery; and a base section on which the first and second compartments are each mounted;
    and in which a PCB separates the first compartment from the second compartment and also provides crush resistance for the vaping device.

H. Disposable Vaping Device with Multi-Function Internal Silicone Base Section
  1. A disposable vaping device configured to be automatically re-filled with liquid and also automatically re-charged, multiple times and without any disassembly, when inserted or docked whole into an automatic liquid filling device;
    and where the device includes a first compartment that houses a liquid reservoir and a heating element and a second compartment that houses a rechargeable battery; and a base section on which the first and second compartments are each mounted;
    and in which the base section is a silicone internal base section that includes an air passage that enables air drawn in from an air intake in the vaping device to trigger activation of a pressure sensor to and then pass up past a heating element and is also configured to serve several of the following functions: as a lower seal to the liquid reservoir; as a seal around liquid injection apertures; as a seal for the pressure sensor; as a seal around charging contacts; and as an air seal to an external base section that the internal base section sits in or on.

I. Disposable Vaping Device that Tracks Re-Filling
  1. A disposable vaping device sold to an end-user with a liquid reservoir that has been pre-filled with liquid and a battery that has been pre-charged, and is configured so that the liquid reservoir cannot be replaced by the user;
    the device being configured to be automatically re-filled with liquid and also automatically re-charged multiple times and without any disassembly, by being inserted or docked whole into an automatic liquid filling device;
    and the device includes a sub-system that tracks the number of times the device has been re-filled and/or re-charged, or enables those numbers to be tracked, to ensure that a pre-set maximum for either of these numbers is not exceeded.

J. Disposable Vaping Device with Always on Connectivity
  1. A disposable vaping device including a low power, wide area network chip or circuit configured to enable the device to send vaping related data automatically over that network, without the user having to configure the device to send data.
  1. A vapouriser device including a low power, short range wireless chip or circuit configured to enable the device to receive a deactivation signal from a local transmitter or beacon, and process that signal to automatically disable itself or cause itself to cease operation.

1. A low power, short range wireless transmitter or beacon configured to broadcast a deactivation signal that, when received by a vaping device, causes that vaping device to automatically cease operation.

Optional features include any one or more of the following for any one or more of the preceding Key Features A-J. Note that any of these optional features can also be combined with any one or more other compatible optional features.

The Vaping Device

- the vaping device is configured to be automatically fully re-fillable with liquid at least ten times, whilst continuing to operate safely without substantial visible deterioration to a heating element in the device.
- the vaping device includes a dual closed loop temperature control system that regulates the temperature of a heating element in the tip to a setpoint temperature, and the device is configured to be automatically fully re-fillable with liquid at least twenty times, whilst continuing to operate safely without substantial visible deterioration to a heating element in the device.
- vaping device is configured to be disposed of, in one-piece, only after multiple repeated liquid re-filling and re-charging events have taken place.
- the vaping device is automatically and fully re-fillable to a level or amount of between 1.5 mL and 2 mL. of liquid in the liquid reservoir during a single continuous liquid re-filling session.
- the vaping device is a disposable vaping device that is sold to an end-user with a pre-filled liquid reservoir and a pre-charged battery so that the end-user can immediately in normal use vape on the device after purchase and can in normal use discard the device once the pre-charged battery is depleted.
- the vaping device includes electrical contacts that are connected to the rechargeable battery in the device, and the electrical contacts are positioned at the end or sides of the device at the opposite end to the end to which the fixed tip is attached.
- the vaping device includes electrical contacts that are connected to the rechargeable battery in the device, and the electrical contacts are positioned on the fixed tip.
- which the vaping device or the liquid re-filling and re-charging device is configured to automatically give a visual and/or aural and/or haptic indication when the vaping device should be discarded.
- the vaping device includes a counter chip or circuit that increases or decreases a counter each time the device is re-filled so that further re-filling can be prohibited if the counter reaches a pre-set threshold.
- the vaping device is sold pre-filled and fully charged.
- the vaping device it is sold pre-filled and fully charged, in a variety of different liquid flavours.
- the vaping device is sold pre-filled and fully charged, and different vaping devices are sold pre-filled with a variety of different liquid flavours, and liquid bottles or containers for each flavour are configured to engage with the liquid re-filling and re-charging device, and vaping devices for one flavour are configured to visually match the liquid bottles or containers for that specific flavour.
- the vaping device is sold pre-filled and fully charged, and different vaping devices are sold pre-filled with a variety of different types of liquid, such as a nicotine, or CBD, or THC, and liquid bottles or containers for each type are configured to engage with the liquid re-filling and re-charging device, and vaping devices for one type are configured to visually match the liquid bottles or containers for that specific type.
- the vaping device is shaped in a cylinder or bar format.
- the vaping device is shaped in a box or bottle format, namely a generally rectangular, box-like or bottle-like shape, with a mouthpiece extending from a top surface.
- the vaping device is shaped in a box or bottle format and is asymmetric in a horizontal plane so that it can fit in a re-fill and re-charge dock in only one orientation.

The Tip

- the vaping device includes a tip that houses a heating element and the liquid reservoir, and a body that that houses a battery, and the tip is fixed to the body of the vaping device during the manufacturing of the device and is configured to not be removable from the body in normal use.
- the vaping device includes a tip that houses a heating element and the tip is fixed to the body of the vaping device is configured to not be removable or replaceable by an end-user in normal use.
- the tip includes a heating element that includes a foam wick, a ceramic wick, a cotton wick, or a sponge wick.
- the fixed tip includes a heating element that is a ceramic-based heating element, a metal coil, a metal mesh, a flat metal piece, a metal mesh, or a metal piece with a flat section.
- the fixed tip includes a liquid filling aperture leading to a liquid reservoir, such as a channel in a silicone plug, configured to open to receive a nozzle from the liquid filling sub-system and to remove liquid from the sides of the nozzle as the nozzle is withdrawn through the aperture.
- the fixed tip includes a liquid filling aperture, such as a channel in a silicone plug, configured to open to receive a nozzle from the liquid filling sub-system and, to close when the nozzle is removed to substantially prevent leakage from a reservoir filled by the nozzle.
- the fixed tip includes two liquid filling apertures, such as a pair of channels in a silicone plug, configured to open to receive a nozzle from the liquid filling sub-system and to seal around that nozzle and to seal fully or partly closed when the nozzle is removed.
- the fixed tip includes two liquid filling apertures positioned around a centrally positioned vapour exit aperture.
- the fixed tip includes a liquid filling aperture positioned in the middle of the front face, or the face defining the end of the tip and that leads to the liquid reservoir, and vapor exit holes, through which vapor is inhaled by a user, are positioned at each side of the liquid filling aperture.
- the fixed tip includes electrical contacts that are connected to the rechargeable battery.

The Liquid Reservoir

- the liquid reservoir is inside the tip of the vaping device, where the tip houses a heating element and is fixed to the body of the vaping device during the manufacturing of the device.
- the liquid reservoir is wholly inside the tip, or partly inside the tip and partly in the body of the vaping device.
- the liquid reservoir is, or includes, a sponge or other liquid absorbent material, configured to substantially store all the liquid in the liquid reservoir.

the liquid reservoir, when it is at least partly in the body of the vaping device, is configured to be directly fed liquid by a nozzle in the liquid refilling and recharging device injecting liquid directly into the liquid reservoir.

the liquid reservoir is, or includes, a substantially hollow cylindrical open cell foam or sponge that surrounds a heating element positioned inside the cylindrical foam or sponge.

The Box or Bottle Format Disposable Vaping Device the vaping device includes a body that houses, in a first compartment, a heating element and the liquid reservoir, and a second compartment that houses a rechargeable battery.

the first and the second compartment are mounted on a base section.

the base section is a silicone internal base section.

the first compartment includes a foam-based liquid reservoir.

a PCB separates the first compartment from the second compartment and also provides crush resistance for the body of the vaping device.

the vaping device includes one or more liquid filling apertures in the base of the device.

the vaping device includes charging contacts in the base of the device.

the vaping device includes one or more straight channels that lead from the liquid filling apertures to the liquid reservoir, and that are configured to enable one or more liquid filling nozzles to penetrate to reach the liquid reservoir and, for example, to penetrate into the foam, e.g. at least 4 mm.

the channels open only when penetrated by a nozzle and seal closed once the nozzle has been withdrawn.

the channels are formed in a silicone base section.

the silicone internal base section includes an air passage that enables air drawn in from an air intake in the vaping device to trigger activation of a pressure sensor to and then pass up past a heating element.

the silicone internal base section made of silicone that serves several of the following functions: as a lower seal to a liquid reservoir; as a seal around liquid injection apertures; as a seal for the pressure sensor; as a seal around the charging contacts; as an air seal to an external base section that the internal base section sits in or on.

Connectivity the vaping device automatically and without user interaction sends or broadcasts vaping related data over a low power, wide area network.

the vaping device automatically and without user interaction sends or broadcasts vaping related data as an advertising signal, or other signal that does not require a pre-existing data connection with a receiver in the low power, wide area network.

the vaping related data describes how the device is being used.

the vaping related data describes when the device is being used.

the location of the low power, wide area network receiver that receives data from the vaping device defines where the vaping device is being used, e.g., for analytics and for a 'find-my-device' function.

the vaping related data includes vaping consumption data defining the type of liquid or other tobacco or HnB (heat not burn) substance consumed.

the vaping related data includes vaping consumption data defining whether the amount of vapable substance, such as liquid or tobacco or HnB (heat not burn) substance, remaining in the vaping device is below a threshold.

the vaping related data includes puff related data, including the timing and duration of puffs.

the vaping device is configured to receive a deactivation signal from a local transmitter that automatically causes the device to cease operation.

the deactivation signal is sent from a transmitter with a limited range, so that devices cease to operate within a defined area, such as a school, or room or area in a school, or a bus or a train or other environment where vaping or smoking is not permitted.

the deactivation signal is a Bluetooth or BLE signal.

the deactivation signal is a directional signal that is blocked or shielded from areas meant to be unaffected by the deactivation signal.

the device is configured to cease operation for a pre-set time or duration, such as 30 minutes or 1 hour.

the device is configured to cease operation if it fails to detect any wireless signals, to prevent EM shielding of the device from successfully defeating the deactivation signal.

the device is configured to generate an alarm, e.g. audio and/or haptic, when disabling itself.

the device is configured to send a signal when automatically disabling itself or causing itself to cease operation.

the device is configured to send its MAC address to the local transmitter or beacon when automatically disabling itself or causing itself to cease operation.

Closed Loop Temperature Control the vaping device includes including a microcontroller or chip programmed with a closed loop temperature control algorithm configured to regulate the PWM duty cycle for the power delivered to a heating element configured to generate inhalable vapor; in which the microcontroller or chip is also programmed with a second closed loop control algorithm, taking as an input a parameter other than temperature, and operating as a second control loop.

the vaping device includes a microcontroller or chip programmed with a closed loop temperature control algorithm configured to regulate the PWM duty cycle for the power delivered to a heating element configured to generate inhalable vapor; in which the microcontroller or chip is also programmed with a closed loop power control algorithm, operating as a second control loop.

the vaping device includes a microcontroller or chip programmed with a closed loop temperature control algorithm configured to regulate the PWM duty cycle for the power delivered to a heating element configured to generate inhalable vapor; in which the microcontroller or chip is also programmed with a second closed loop control algorithm, that is configured to operate as an independent control loop to the closed loop temperature control algorithm and to generate an output that is used by the closed loop temperature control algorithm.

the vaping device includes a microcontroller or chip programmed with a closed loop temperature control algorithm configured to regulate the PWM duty cycle for the power delivered to a heating element configured to generate inhalable vapor; in which the microcontroller or chip is also programmed with a second closed loop control algorithm; and in which the closed loop temperature control algorithm operates to track the setpoint temperature of the heating element and the second closed loop control algorithm operates to correct an error in the tracking of the setpoint temperature by the closed loop temperature control algorithm.

the vaping device includes a microcontroller or chip programmed with a closed loop temperature control algorithm configured to regulate the PWM duty cycle for the power delivered to a heating element configured to generate inhalable vapor; in which the microcontroller or chip is also programmed with a second closed loop control algorithm; and in which the second closed loop control algorithm operates to correct errors or inaccuracies in temperature tracking by the closed loop temperature control algorithm arising from a rise in the temperature of stored atomisable liquid, in thermal contact with the heating element.

the vaping device includes including a microcontroller or chip programmed with a closed loop temperature control algorithm configured to regulate the PWM duty cycle for the power delivered to a heating element in the device, the atomising element being configured to generate inhalable vapor; the device further including a liquid reservoir that is configured to provide atomisable liquid to the heating element and is automatically refillable with liquid from an additional, external liquid tank, bottle or re-fill container; and in which the microcontroller or chip is also programmed with a closed loop power control algorithm, operating as the outer loop to the closed loop temperature control algorithm.

the vaping device includes a control system for a vaping device, the control system comprising a microcontroller or chip programmed with a closed loop temperature control algorithm configured to regulate the PWM duty cycle for the power delivered to a heating element in the device, the heating element being configured to generate inhalable vapor; in which the device includes a liquid reservoir that is configured to provide atomisable liquid to the heating element; and in which the microcontroller or chip is also programmed with a closed loop power control algorithm, operating as the outer loop to the closed loop temperature control algorithm.

the vaping device includes a microcontroller or chip programmed with a closed loop temperature control algorithm configured to regulate the PWM duty cycle for the power delivered to a heating element configured to generate inhalable vapor; in which the device automatically measures the resistance of the heating element in or used by that PV and the closed loop temperature control algorithm uses that resistance value.

the vaping device includes a microcontroller or chip programmed with a closed loop temperature control algorithm configured to regulate the PWM duty cycle for the power delivered to a heating element configured to generate inhalable vapor; in which the vaping device automatically measures, or uses a value for, the ambient temperature when measuring the resistance of the heating element in that PV in order to create a datapoint to establish the resistance v temperature line or curve for that specific heating element.

the vaping device includes a microcontroller or chip programmed with a closed loop temperature control algorithm configured to regulate the PWM duty cycle for the power delivered to a heating element configured to generate inhalable vapor; in which the vaping device automatically calculates or derives a value of the resistance of the heating element for a given setpoint temperature and also for a second temperature, and uses that second resistance value to normalise the operation of closed loop temperature control algorithm so that the inputs to a PID controller are consistent across different heating elements with different resistance v temperature behaviours.

the vaping device includes a microcontroller or chip programmed with a closed loop temperature control algorithm configured to regulate the PWM duty cycle for the power delivered to a heating element configured to generate inhalable vapor; in which the vaping automatically calculates or derives a value of the resistance of the heating element for a given setpoint temperature and also for 0° C.

the vaping device includes a microcontroller or chip programmed with a closed loop temperature control algorithm configured to regulate the PWM duty cycle for the power delivered to a heating element configured to generate inhalable vapor; in which the algorithm is configured to compensate for the inherent variability in the resistance v temperature response of different heating elements.

the vaping device includes a closed loop temperature control algorithm as defined above and which is suitable for being automatically fully re-filled with liquid at least twenty times and for the heating element not to include significant burnt areas even when being used with the twentieth liquid re-fill.

K. Re-Fill Dock with Bottle and Device Ports for a Disposable Vaping Device

1. An automatic liquid filling device configured to automatically re-fill and re-charge a vaping device, the device having an exposed upper surface that includes at least two ports or apertures, the first port or aperture configured to receive a liquid bottle and the second port or aperture configured to receive a vaping device;
the automatic liquid filling device including (i) an electric or electronic pump configured to pump liquid from the bottle to the vaping device and (ii) a battery re-charging sub-system configured to re-charge a battery in the vaping device.

L. Retail Re-Fill Dock with Multiple Bottles and Device Ports for Disposable Vaping Devices 1. An automatic liquid filling device configured to automatically re-fill and re-charge a vaping device, the device having an upper surface that includes multiple ports or apertures, each port or aperture including at least one refill nozzle or system connected to a liquid re-fill bottle or container and configured to receive a vaping device;
the automatic liquid filling device including (i) one or more electric or electronic pumps configured to pump liquid from each re-fill bottle or container to a vaping device docked into a port or aperture.

Optional features include any one or more of the following for any one or more of Key Features K-L. Note that any of these optional features can also be combined with any one or more other compatible optional features.

The Automatic Liquid Refilling Device
the automatic liquid filling device includes capacitive sensor plates with earth-grounded, shielding plates.
the automatic liquid filling device is automatic by virtue of being configured to automatically detect when to start and to stop filling the vaping device.

the automatic liquid re-filling device has an exposed upper surface that includes at least two ports or apertures, the first port or aperture configured to receive a liquid bottle and the second port or aperture configured to receive a vaping device.

the automatic re-filling device having an upper surface that includes multiple second ports or apertures, each port or aperture including at least one refill nozzle or system connected to a liquid re-fill bottle or container and configured to receive a vaping device.

the or each refill nozzle is configured to be sufficiently long to penetrate into a foam reservoir in the vaping device.

the automatic liquid filling device includes (i) a first aperture or port configured to receive a liquid bottle or container containing atomisable liquid and (ii) a second aperture or port configured to receive the vaping device, the second aperture or port including sensors for a liquid level sensing sub-system and a liquid filling sub-system and (iii) an electric or electronic pump configured to pump liquid from the liquid bottle or container to the liquid filling sub-system.

the automatic liquid filling device includes electrical charging contacts, arranged to connect with electrical charging contacts in the vaping device, in the second aperture or port or in a third port or aperture.

the automatic liquid filling device is configured so that the second port or aperture, including the liquid level sensing system, also includes electrical charging contacts, arranged to connect with electrical charging contacts in the vaping device.

the automatic liquid filling device is configured with a single port or aperture for both liquid re-filling and also re-charging the vaping device, and the automatic liquid filling device automatically refills first and only starts to charge once the liquid reservoir is completely full or full to a pre-set threshold.

the automatic liquid filling device is configured with a single port or aperture for both liquid re-filling and also re-charging the vaping device, and the automatic liquid filling device re-fills and re-charges at the same time, and regulates the re-charging to proportionally charge depending on the liquid level measurement.

the automatic liquid filling device includes a flat base and is configured to be positioned on a flat surface.

the automatic liquid filling device is a personal table or desktop device that is configured to re-fill only a single vaping device at a time and includes just one second port or aperture.

the automatic liquid filling device is configured to re-fill two or more vaping device at a time and includes two or more second ports or apertures.

the first port or aperture is configured to receive an inverted liquid bottle.

the automatic liquid filling device includes multiple first ports or apertures that are each configured to receive a liquid bottle or container and at least some of those bottle are liquids of different flavours.

the automatic liquid filling device includes multiple first ports or apertures that are each configured to receive a liquid bottle or container, to enable the liquid filling device to dispense liquids with different flavours, or strengths of nicotine, or types of liquids, such as nicotine or CBD liquids.

the automatic liquid filling device is configured for use in a retail environment, such as a shop, bar, club or restaurant and includes a contactless payment reader.

the vaping device includes a counter chip or circuit that increases or decreases a counter each time the device is re-filled and the automatic liquid filling device reads this counter and prohibits further re-filling of this device if the counter reaches a pre-set threshold.

The Liquid Level Sensing Sub-System automatic liquid filling device includes a liquid level sensing sub-system that is configured to measure data relating to the level or amount of liquid in the liquid reservoir in the vaping device.

the liquid level sensing sub-system is implemented in the liquid re-filling device.

the liquid level sensing sub-system is implemented in the vaping device.

the liquid level sensing sub-system is a capacitive liquid level sensing sub-system, and includes capacitive sensor plates with earth-grounded, shielding plates, arranged in the second port or aperture.

the capacitive sensing plates with earth-grounded, shielding plates are arranged in the second port or aperture to at least partly surround the liquid reservoir, when a vaping device is positioned in the second port or aperture of the liquid re-filling device.

The Electric or Electronic Pump the electric or electronic pump is a peristaltic pump.

the electric or electronic pump is configured to withdraw or reverse-pump liquid from a tube or line connecting the pump to the vaping device, after the vaping device has been withdrawn from the liquid filling device.

the electric or electronic pump is configured to reverse pump or pump liquid back into the liquid bottle or container.

the electric or electronic pump is configured to reverse pump or pump liquid back into the liquid bottle or container whenever the vaping device is removed from the automatic liquid filling device.

the electric or electronic pump is configured to reverse pump or pump liquid back into the liquid bottle or container to reduce or minimise the amount of liquid in the liquid connection tubes to and from the pump to reduce or minimise flavour mixing or contamination when the liquid bottle or container is swapped for a different flavour or type of liquid.

M. Re-Fill Bottle with Septa Seal for a Vaping Device Refill System

1. A liquid refill bottle or container that includes (i) a cap that can be attached to the bottle or container but that cannot in normal use be removed from the container and (ii) a flexible septa seal in the cap, or in or on a neck or mouth of the bottle or container, under the cap, the flexible septa seal being configured to only open when penetrated by a filling nozzle in the re-fill dock and to otherwise fully seal the neck or mouth of the liquid refill bottle or container.

N. Re-Fill Bottle with Chip for a Vaping Device Refill System

1. A liquid refill bottle or container that includes (i) a cap that can be attached to the bottle or container but that cannot in normal use be removed from the container and (ii) a flexible seal on or around a mouth of the bottle or container;

and the liquid bottle or container also includes a security chip or other unique identifier that is checked or verified by an automatic re-filling dock before liquid can be automatically withdrawn from that bottle or container.

O. Inverted Re-Fill Bottle Filling for a Disposable Vaping Device Refill System

1. A liquid refill bottle or container that includes (i) a cap that can be attached to the bottle or container but that cannot in normal use be removed from the container and in which the cap includes an aperture that is positioned over a flexible seal, enabling the seal to be penetrated by a filling nozzle in a refill device, passing through the aperture in the cap, whilst the cap is secured to the bottle or container.

Optional features include any one or more of the following for any one or more of preceding Key Features M-O. Note that any of these optional features can also be combined with any one or more other compatible optional features.

The Liquid Bottle or Container is configured to be inverted for insertion into an automatic liquid filling device so that the seal or cap engages with a nozzle in the automatic liquid filling device.

the seal is a septa seal.

the seal is fixed to a neck of the bottle and the cap is screwed on to the neck.

the liquid bottle or container is a standard size and shape of liquid bottle or container, also suitable to be used to manually fill a vaping device that cannot be automatically re-filled.

the liquid bottle or container is a standard 10 mL size and shape of liquid bottle or container.

where the automatic liquid filling device is configured for use in a retail environment, the or each liquid bottle or container is 50 mL or more in size, such as at least 100 mL.

the liquid bottle or container includes an air hole that is sealed by a user-removable sticker or tab.

the liquid bottle or container includes a liquid seal, such as a septa seal, configured to be penetrated by a needle or other liquid conduit in the liquid filling device, the needle or other liquid conduit being connected to the electric or electronic pump.

the flexible seal includes a single slit that is configured to be penetrated by the filling nozzle and to permit air to enter the bottle when the liquid is being withdrawn from the bottle.

the flexible seal includes multiple slits that are configured to be penetrated by the filling nozzle and to permit air to enter the bottle when the liquid is being withdrawn from the bottle.

the flexible septa seal includes two layers, where the upper layer is made of a harder material than the lower layer (closer to the liquid in the bottle).

the flexible septa seal includes multiple layers, where an upper layer is made of a harder material than a lower layer.

the flexible septa seal is rigidly supported by flanges or structures in the bottle to control deformation of the septa seal when the seal is penetrated by the filling nozzle.

the flexible septa seal is securely fixed in the neck of the bottle or container, preventing removal of the seal and hence preventing re-filling of the bottle or container through its open neck.

the liquid bottle or container is sealed with a cap that includes a security feature to prevent the cap being removed in normal use and also includes an aperture that exposes the flexible septa seal, enabling the septa seal to be penetrated by the filling nozzle whilst the cap is secured to the bottle or container.

the cap is configured to lock to the bottle or container and to not be user-removable from the bottle or container in normal use.

the liquid bottle is a polypropylene bottle made from polypropylene recycled from other liquid bottles that contained atomisable liquid, e.g. nicotine liquid.

the liquid bottle is a glass bottle made from glass recycled from other liquid bottles that contained atomisable liquid, e.g. nicotine liquid.

the liquid bottle or container is a cylindrical polypropylene bottle or container of a standard size and shape that is sold for manually filling a vaping device that cannot be automatically re-filled.

the liquid bottle or container is configured to engage or dock with an automatic liquid filling device for re-filling a hybrid disposable but re-fillable vaping device that is sold to an end-user with a pre-filled liquid reservoir and a pre-charged battery so that the end-user can in normal use (i) immediately vape on the device after purchase and (ii) can either discard the device once the pre-charged battery is depleted or (iii) automatically re-charge and re-fill the device at the automatic liquid re-filling device into which the liquid bottle or container is engaged or docked.

P. Total Disposable Vaping Device Refill System

1. A a vaping system including:
   (a) a disposable vaping device that includes the following non user-replaceable items: (i) a heating element; (ii) a liquid reservoir that provides liquid to the heating element;
   (b) an automatic liquid filling device, including (i) a first aperture or port configured to receive a liquid bottle or container containing atomisable liquid; (ii) a second aperture or port configured to receive the vaping device; (iii) an electronic liquid level sensing sub-system; (iv) a liquid filling sub-system configured to pump liquid from the liquid bottle or container to the liquid reservoir in the vaping device and (v) a battery charging sub-system to charge a battery in the vaping device;
   in which the disposable vaping device is configured:
   (i) to be sold to an end-user with a pre-filled liquid reservoir and a pre-charged battery so that the device is immediately useable;
   (ii) to be automatically re-fillable and re-chargeable at the liquid filling device without being disassembled;
   (iii) to be maintained as a single or unitary device that is not disassembled through replacement of the heating element or the liquid reservoir throughout the entire normal working lifetime of the device.

Optional features include any one or more of the following for Key Feature P. Note that any optional feature can be combined with any one or more other compatible optional features.

The Box or Bottle Format Disposable Vaping Device the vaping device includes a body that houses, in a first compartment, a heating element and the liquid reservoir, and a second compartment that houses a rechargeable battery.

the first and the second compartment are mounted on a base section.

the base section is a silicone internal base section.

the first compartment includes a foam-based liquid reservoir.

a PCB separates the first compartment from the second compartment and also provides crush resistance for the body of the vaping device.

the vaping device includes one or more liquid filling apertures in the base of the device.

the vaping device includes charging contacts in the base of the device.

the vaping device includes one or more straight channels that lead from the liquid filling apertures to the liquid reservoir, and that are configured to enable one or more liquid filling nozzles to penetrate to reach the liquid reservoir and, for example, to penetrate into the foam, e.g. at least 4 mm.

the channels open only when penetrated by a nozzle and seal closed once the nozzle has been withdrawn.

the channels are formed in a silicone base section.

the silicone internal base section includes an air passage that enables air drawn in from an air intake in the vaping device to trigger activation of a pressure sensor to and then pass up past a heating element.

the silicone internal base section made of silicone that serves several of the following functions: as a lower seal to a liquid reservoir; as a seal around liquid injection apertures; as a seal for the pressure sensor; as a seal around the charging contacts; as an air seal to an external base section that the internal base section sits in or on.

The Battery Re-Charging Sub-System the battery re-charging sub-system is configured to control the charge or energy delivered to or stored in the battery so that the charge or energy in the battery will battery will substantially run out or fall below a threshold needed to drive the heating element above a set temperature, before the liquid reservoir runs out of liquid.

the battery re-charging sub-system is configured to monitor the charge level of the rechargeable battery and the amount or level of liquid in the liquid reservoir, and to regulate the amount of power delivered to or stored in the battery so that the battery will cease to operate because it has run out of charge, or has fallen below a pre-set level, before the amount of liquid in the liquid reservoir falls below a pre-set amount, to thereby prevent the occurrence of dry vaping.

the battery re-charging sub-system is configured to control the charge or energy stored in the battery so that the battery will cease to provide power sufficient to cause a wicking element to burn before the liquid reservoir runs out of liquid.

the battery re-charging sub-system includes a main control circuit in the automatic liquid filling device.

the battery re-charging sub-system includes a main control circuit in the vaping device.

The Automatic Liquid Filling Device the automatic liquid filling device is automatic by virtue of being configured to automatically detect when to start and to stop filling the vaping device.

the automatic liquid filling device includes capacitive sensor plates with earth-grounded, shielding plates.

the automatic liquid filling device includes (i) a first aperture or port configured to receive a liquid bottle or container containing atomisable liquid and (ii) a second aperture or port configured to receive the vaping device, the second aperture or port including a liquid level sensing sub-system and a liquid filling sub-system and (iii) an electric or electronic pump configured to pump liquid from the liquid bottle or container to the liquid filling sub-system.

the automatic liquid filling device includes electrical charging contacts, arranged to connect with electrical charging contacts in the vaping device, in a third port or aperture.

the automatic liquid filling device is configured so that the second port or aperture, including the liquid level sensing system, also includes electrical charging contacts, arranged to connect with electrical charging contacts in the vaping device.

the automatic liquid filling device is configured with a single port or aperture for both liquid re-filling and also re-charging the vaping device, and the automatic liquid filling device automatically refills first and only starts to charge once the liquid reservoir is completely full or full to a pre-set threshold.

the automatic liquid filling device is configured with a single port or aperture for both liquid re-filling and also re-charging the vaping device, and the automatic liquid filling device re-fills and re-charges at the same time, and regulates the re-charging to proportionally charge depending on the liquid level measurement.

the automatic liquid filling device includes a flat base and is configured to be positioned on a flat surface.

the automatic liquid filling device is a personal table or desktop device that is configured to re-fill only a single vaping device at a time and includes just one second port or aperture.

the automatic liquid filling device is configured to re-fill two or more vaping device at a time and includes two or more second ports or apertures.

the first port or aperture is configured to receive an inverted liquid bottle.

the automatic liquid filling device includes multiple first ports or apertures that are each configured to receive a liquid bottle or container.

the automatic liquid filling device includes multiple first ports or apertures that are each configured to receive a liquid bottle or container, to enable the liquid filling device to dispense liquids with different flavours, strengths of nicotine, or types of liquids, such as nicotine or CBD liquids.

the automatic liquid filling device is configured for use in a retail environment, such as a shop, bar, club or restaurant and includes a contactless payment reader.

The Liquid Level Sensing Sub-System the liquid level sensing sub-system is configured to measure data relating to the level or amount of liquid in the liquid reservoir in the vaping device.

the liquid level sensing sub-system is implemented in the liquid re-filling device.

the liquid level sensing sub-system is implemented in the vaping device.

the liquid level sensing sub-system is a capacitive liquid level sensing sub-system, and includes capacitive sensing plates with earth-grounded, shielding plates arranged in the second port or aperture.

the capacitive sensing plates with earth-grounded, shielding plates are arranged in the second port or aperture to at least partly surround the liquid reservoir, when a vaping device is positioned in the second port or aperture of the liquid re-filling device.

The Electric or Electronic Pump the electric or electronic pump is a peristaltic pump.

the electric or electronic pump is configured to withdraw liquid from a tube or line connecting the pump to the vaping device, after the vaping device has been withdrawn from the liquid filling device.

the electric or electronic pump is configured to reverse pump or pump liquid back into the liquid bottle or container.

the electric or electronic pump is configured to reverse pump or pump liquid back into the liquid bottle or container whenever the vaping device is removed from the automatic liquid filling device.

the electric or electronic pump is configured to reverse pump or pump liquid back into the liquid bottle or container to reduce or minimise the amount of liquid in the liquid connection tubes to and from the pump to reduce or minimise flavour mixing or contamination when the liquid bottle or container is swapped for a different flavour or type of liquid.

The Liquid Bottle or Container the liquid bottle or container includes (i) a cap that can be attached to the bottle or container but that cannot in normal use be removed from the container and in which the cap includes an aperture in the that exposes a flexible seal, enabling the seal to be penetrated by a filling nozzle in a refill device, passing through the aperture in the cap, whilst the cap is secured to the bottle or container.

the liquid bottle or container includes (i) a cap that can be attached to the bottle or container but that cannot in normal use be removed from the container and (ii) a flexible septa seal in a neck or mouth of the bottle or container, under the cap, the flexible septa seal being configured to only open when penetrated by a filling nozzle in the re-fill dock and to otherwise fully seal the neck or mouth of the liquid refill bottle or container.

the liquid bottle or container includes (i) a cap that can be attached to the bottle or container but that cannot in normal use be removed from the container and (ii) a flexible seal around a mouth of the bottle or container; and the liquid bottle or container also includes a security chip or other unique identifier that is checked or verified by an automatic re-filling dock before liquid can be automatically withdrawn from that bottle or container.

the liquid bottle or container is a standard size and shape of liquid bottle or container, also suitable to be used to manually fill a vaping device that cannot be automatically re-filled.

the liquid bottle or container is a standard 10 mL size and shape of liquid bottle or container.

where the automatic liquid filling device is configured for use in a retail environment, the or each liquid bottle or container is 50 mL or more in size, such as at least 100 mL.

the liquid bottle or container includes an air hole that is sealed by a user-removable sticker or tab.

the liquid bottle or container includes a liquid seal, such as a septa seal, configured to be penetrated by a needle or other liquid conduit in the liquid filling device, the needle or other liquid conduit being connected to the electric or electronic pump.

the liquid seal includes a single slit that is configured to be penetrated by the filling nozzle and to permit air to enter the bottle when the liquid is being withdrawn from the bottle.

the liquid seal includes two layers, where the upper layer is made of a harder material than the lower layer.

the liquid seal is rigidly supported by flanges or structures in the bottle to control deformation of the seal when the seal is penetrated by the filling nozzle.

the flexible septa seal is securely fixed in the neck of the bottle or container, preventing removal of the seal and hence preventing re-filling of the bottle or container through its open neck.

the liquid bottle or container is sealed with a cap that includes a security feature to prevent the cap being removed in normal use and also includes an aperture that exposes the flexible septa seal, enabling the septa seal to be penetrated by the filling nozzle whilst the cap is secured to the bottle or container.

the cap is configured to lock to the bottle or container and to not be user-removable from the bottle or container in normal use.

liquid bottle is a polypropylene bottle made from polypropylene recycled from other liquid bottles that contained atomisable liquid.

The tip (applies to the cylindrical or bar format device and not the box or bottle format device, which doesn't have a tip as such)

the tip is fixed to the body of the vaping device is configured to not be removable or replaceable by an end-user.

the tip is fixed to the body of the vaping device so that the vaping device is an all-in-one device that is not disassembled in normal use for any purpose, such as re-filling or battery re-charging.

the tip includes a heating element that includes a foam wick, ceramic wick, a cotton wick, or a sponge wick.

the fixed tip includes a heating element that is a ceramic-based heating element, a metal coil, a metal mesh, a flat metal piece, or a metal piece with a flat section.

the fixed tip includes a liquid filling aperture, such as a flexible septa seal, configured to open to receive a nozzle from the liquid filling sub-system and to seal around that nozzle and to seal closed when the nozzle is removed.

the fixed tip includes a liquid filling aperture positioned in the middle of the front face, or the face defining the end of the tip and that leads to the liquid reservoir, and vapor exit holes, through which vapor is inhaled by a user, are positioned at each side of the liquid filling aperture.

the fixed tip includes electrical contacts that are connected to the rechargeable battery.

The Liquid Reservoir in the Cylindrical or Bar Format Device the liquid reservoir is wholly inside the tip.

the liquid reservoir is at least partly in the body of the vaping device.

the liquid reservoir is, or includes, a sponge or other liquid absorbent material, configured to substantially store all the liquid in the liquid reservoir.

the liquid reservoir, when it is at least partly in the body of the vaping device, is fed liquid by the filling device through an aperture or port in a side wall of the vaping device, such as a side wall of the body of the vaping device.

the liquid reservoir is, or includes a substantially hollow cylindrical open cell foam or sponge that surrounds a heating element positioned inside the cylindrical foam or sponge.

Connectivity the vaping device automatically and without user interaction sends or broadcasts vaping related data over a low power, wide area network.

the vaping device automatically and without user interaction sends or broadcasts vaping related data as an advertising signal, or other signal that does not require a pre-existing data connection with a receiver in the low power, wide area network.

the vaping related data describes how the device is being used.

the vaping related data describes when the device is being used.

the location of the low power, wide area network receiver that receives data from the vaping device defines where the vaping device is being used, e.g., for analytics and for a 'find-my-device' function.

the vaping related data includes vaping consumption data defining the type of liquid or other tobacco or HnB (heat not burn) substance consumed.

the vaping related data includes vaping consumption data defining whether the amount of vapable substance, such as liquid or tobacco or HnB (heat not burn) substance, remaining in the vaping device is below a threshold.

the vaping related data includes puff related data, including the timing and duration of puffs.

the vaping device is configured to receive a deactivation signal from a local transmitter that automatically causes the device to cease operation.

the deactivation signal is sent from a transmitter with a limited range, so that devices cease to operate within a defined area, such as a school, or room or area in a school, or a bus or a train or other environment where vaping or smoking is not permitted.

the vaping device includes a low power, short range wireless chip or circuit configured to enable the device to receive a deactivation signal from a local transmitter or beacon, and process that signal to automatically disable itself or cause itself to cease operation.

the low power, short range wireless chip is a Bluetooth or BLE chip.

the deactivation signal is a directional signal that is blocked or shielded from areas meant to be unaffected by the deactivation signal.

the device is configured to cease operation whilst receiving the deactivation signal or for a pre-set time or duration, such as 30 minutes or 1 hour.

the device is configured to cease operation if it fails to detect any wireless signals, to prevent EM shielding of the device from successfully defeating the deactivation signal.

the device is configured to generate an alarm, e.g. visual, audio and/or haptic, when disabling itself.

the device is configured to send a signal when automatically disabling itself or causing itself to cease operation.

the device is configured to send its MAC address to the local transmitter or beacon when automatically disabling itself or causing itself to cease operation.

The Vaping Device the vaping device is a disposable vaping device that is sold to an end-user with a pre-filled liquid reservoir and a pre-charged battery so that the end-user can immediately vape on the device after purchase and can in normal use discard the device once the pre-charged battery is depleted.

the vaping device includes electrical contacts that are connected to the rechargeable battery in the device, and the electrical contacts are positioned at the end or sides of the device at the opposite end to the end to which the fixed tip is attached.

the vaping device includes electrical contacts that are connected to the rechargeable battery in the device, and the electrical contacts are positioned on the fixed tip.

the vaping device implements any of Key Features defined in Section A Part III and any of the Optional Features defined in Section A Part III.

the vaping device includes including a microcontroller or chip programmed with a closed loop temperature control algorithm configured to regulate the PWM duty cycle for the power delivered to a heating element configured to generate inhalable vapor; in which the microcontroller or chip is also programmed with a second closed loop control algorithm, taking as an input a parameter other than temperature, and operating as a second control loop.

the vaping device includes a microcontroller or chip programmed with a closed loop temperature control algorithm configured to regulate the PWM duty cycle for the power delivered to a heating element configured to generate inhalable vapor; in which the microcontroller or chip is also programmed with a closed loop power control algorithm, operating as a second control loop.

the vaping device includes a microcontroller or chip programmed with a closed loop temperature control algorithm configured to regulate the PWM duty cycle for the power delivered to a heating element configured to generate inhalable vapor; in which the microcontroller or chip is also programmed with a second closed loop control algorithm, that is configured to operate as an independent control loop to the closed loop temperature control algorithm and to generate an output that is used by the closed loop temperature control algorithm.

the vaping device includes a microcontroller or chip programmed with a closed loop temperature control algorithm configured to regulate the PWM duty cycle for the power delivered to a heating element configured to generate inhalable vapor; in which the microcontroller or chip is also programmed with a second closed loop control algorithm; and in which the closed loop temperature control algorithm operates to track the setpoint temperature of the heating element and the second closed loop control algorithm operates to correct an error in the tracking of the setpoint temperature by the closed loop temperature control algorithm.

the vaping device includes a microcontroller or chip programmed with a closed loop temperature control algorithm configured to regulate the PWM duty cycle for the power delivered to a heating element configured to generate inhalable vapor; in which the microcontroller or chip is also programmed with a second closed loop control algorithm; and in which the second closed loop control algorithm operates to correct errors or inaccuracies in temperature tracking by the closed loop temperature control algorithm arising from a rise in the temperature of stored atomisable liquid, in thermal contact with the heating element.

the vaping device includes a microcontroller or chip programmed with a closed loop temperature control algorithm configured to regulate the PWM duty cycle for the power delivered to a heating element in the device, the heating element being configured to generate inhalable vapor; the device further including a liquid reservoir that is configured to provide atomisable liquid to the heating element and is not user-replaceable or user-refillable; and in which the microcontroller or chip is also programmed with a closed loop power control algorithm, operating as the outer loop to the closed loop temperature control algorithm.

the vaping device includes including a microcontroller or chip programmed with a closed loop temperature control algorithm configured to regulate the PWM duty cycle for the power delivered to a heating element in the device, the atomising element being configured to generate inhalable vapor; the device further including a liquid reservoir that is configured to provide atomisable liquid to the heating element and is automatically refillable with liquid from an additional, external liquid tank, bottle or re-fill container; and in which the microcontroller or chip is also programmed with a closed loop power control algorithm, operating as the outer loop to the closed loop temperature control algorithm.

the vaping device includes a microcontroller or chip programmed with a closed loop temperature control algorithm configured to regulate the PWM duty cycle for the power delivered to a heating element in the device, the atomising element being configured to generate inhalable vapor; in which the device includes a liquid reservoir that is configured to provide atomisable liquid to the heating element and is user-replaceable but not user-refillable; in which the microcontroller or chip is also programmed with a closed loop power control algorithm, operating as the outer loop to the closed loop temperature control algorithm.

the vaping device includes a control system for a vaping device, the control system comprising a microcontroller or chip programmed with a closed loop temperature control algorithm configured to regulate the PWM duty cycle for the power delivered to a heating element in the device, the heating element being configured to generate inhalable vapor; in which the device includes a liquid reservoir that is configured to provide atomisable liquid to the heating element; and in which the microcontroller or chip is also programmed with a closed loop power control algorithm, operating as the outer loop to the closed loop temperature control algorithm.

the vaping device includes a microcontroller or chip programmed with a closed loop temperature control algorithm configured to regulate the PWM duty cycle for the power delivered to a heating element configured to generate inhalable vapor; in which the device automatically measures the resistance of the heating element in or used by that PV and the closed loop temperature control algorithm uses that resistance value.

the vaping device includes a microcontroller or chip programmed with a closed loop temperature control algorithm configured to regulate the PWM duty cycle for the power delivered to a heating element configured to generate inhalable vapor; in which the vaping device automatically measures, or uses a value for, the ambient temperature when measuring the resistance of the heating element in that PV in order to create a datapoint to establish the resistance v temperature line or curve for that specific heating element.

the vaping device includes a microcontroller or chip programmed with a closed loop temperature control algorithm configured to regulate the PWM duty cycle for the power delivered to a heating element configured to generate inhalable vapor; in which the vaping device automatically calculates or derives a value of the resistance of the heating element for a given setpoint temperature and also for a second temperature, and uses that second resistance value to normalise the operation of closed loop temperature control algorithm so that the inputs to a PID controller are consistent across different heating elements with different resistance v temperature behaviours.

the vaping device includes a microcontroller or chip programmed with a closed loop temperature control algorithm configured to regulate the PWM duty cycle for the power delivered to a heating element configured to generate inhalable vapor; in which the vaping automatically calculates or derives a value of the resistance of the heating element for a given setpoint temperature and also for 0° C.

the vaping device includes a microcontroller or chip programmed with a closed loop temperature control algorithm configured to regulate the PWM duty cycle for the power delivered to a heating element configured to generate inhalable vapor; in which the algorithm is configured to compensate for the inherent variability in the resistance v temperature response of different heating elements.

the vaping device includes a closed loop temperature control algorithm as defined above and which is suitable for being automatically fully re-filled with liquid at least ten times and for the heating element not to include significant burnt areas even when being used with the tenth liquid re-fill.

the vaping device includes a closed loop temperature control algorithm as defined above and which is suitable for being automatically fully re-filled with liquid at least twenty times and for the heating element not to include significant burnt areas even when being used with the twentieth liquid re-fill.

APPENDIX

This Appendix is the product specification for the box or bottle format disposable vaping device, described in Section B and shown in FIGS. 26-31.

Vaporiser (PV)
  Refillable vaporiser-prefilled with 2 ml of liquid
  Rechargeable 500 mAh battery
  600 puffs (1 second a puff)
  Stainless steel mesh coil inside cotton wick
  Foam liquid core
  AYR Temperature control delivering:
    Controlled consistent vapour
    No burning during puff cycle
    Better consistent flavour
  Safety—Coil shut-off during charging
  Fill/charge low indicator light (flash for pre-warning)
  EOL indicator light, (flash for pre-warning), will not stop user vaping if they want to.
  2× small liquid injection points on the base.
  Mouthpiece
  1× sticker label wrapped around the main body
  Compact dimensions—A×B×C
  Vaporiser packaged in foil seal with cardboard box and warranty leaflet.

How does it Work?
  The vaporiser is simply puff activated-no buttons to press
  During use if the charge level drops to 30% or less then the led will flash orange during and for 3 seconds after a puff. When it's 10% or less then the light is consistently on during and for 3 seconds after a puff.

EOL indication, when the PV is within 10% of its end of life (3000 puff seconds) the EOL indicator (red LED) will flash during and for 3 seconds after a puff. When it has reached its EOL if will be consistently on during and for 3 seconds after an attempted puff To fill simply drop the vaporiser into it's USB powered dock where it is automatically recharged and refilled.

Dock
  USB-C powered dock
  Front LED lights
  LED light in bottle port to illuminate liquid
  Compact dimension-A×B×C
  1× port to insert vaporiser. Vaporiser can only go in one way
  1× port for the 10 ml liquid bottle
  Contains:
    Micro liquid pump to pump liquid from the bottle to the vaporiser
    Smart electronics
    Refill nozzle that insert into the vaporiser
    2× recharge contacts
    1× liquid nozzle
    Features to lock bottle into dock
  Dock sold in a card box with USB lead and user manual/warranty.
  How does it Work?
    Plug in the USB
    Wait for the lights to go green
    Take the seal off the full bottle
    Turn it upside down and insert into the bottle port
    Lock into place
    Insert vaporiser with mouthpiece facing up
    The 2 nozzles in the dock insert into the 2 holes in the bottom of that vaporiser, and through the integrated silicone seals.
    Capacitive liquid level sensing is done by 2 integrated metal plates.
    The Lights on the front of the dock will pulse red during the fill
    Once filled the light will pulse orange as it charges
    When fully filled and charged the light goes solid green.
    Pull out the vaporiser and it is ready to go
Bottle
  Standard 10 ml bottle with ratchet neck
  Silicone seal
  PP Cap with hole
  Bright rip off seal.
  10 ml of e-liquid-50:50 PG/VG with different flavours and nicotine strengths.
  1 sticker label wrapped around the bottle.
  Bottle sold in standard size card box, with obvious indicator that it's unique for AYR system.
How does it Work?
  The seal protects the seal from potential damage and leakage in transit.
  Once the bottle is inserted cap down on the nozzle, the pump is able to pump liquid out of the bottle and into the vaporiser.
  Air is able to come back into the seal from around the same seal on the nozzle. Negative pressure pulls air in as it is needed.
  As it fills a small light illuminates the neck of the bottle to make it easy to see the liquid level.
Overall
  All 3 products are sold separately.

The invention claimed is:

1. A vaping device including a heating element, a power source, a pulse width modulated (PWM) system to deliver power from the power source to the heating element, and a microcontroller or chip configured with an inner closed loop temperature control algorithm configured to regulate a duty cycle of the PWM system to reach a setpoint temperature;
   and in which the microcontroller or chip is also configured with a second, outer closed loop power control algorithm with a power setpoint, and is configured to measure or infer power delivered to the heating element, and to automatically modify the setpoint temperature used by the inner control loop depending on the variation of the measured or inferred power from the power setpoint;
   and in which the microcontroller or chip is configured so that the temperature setpoint is automatically adjusted by the difference between the power setpoint and the measured or inferred power, multiplied by a factor.

2. The vaping device of claim 1 in which the microcontroller or chip is configured so that if the measured or inferred power is below the power setpoint, then the microcontroller or chip automatically increases the temperature setpoint used by the inner control loop.

3. The vaping device of claim 1 in which the microcontroller or chip is configured so that if the measured or inferred power is above the power setpoint, then the microcontroller or chip automatically decreases the temperature setpoint used by the inner control loop.

4. The vaping device of claim 1 in which the microcontroller or chip is configured to increase the duty cycle of the PWM when the temperature setpoint is increased, and to decrease the duty cycle when the temperature setpoint is decreased.

5. The vaping device of claim 1 in which the factor is found through testing and experimentation and is dependent on the specific design of the heating element.

6. The vaping device of claim 1 in which the microcontroller or chip is configured to measure or infer the average power in a puff or other parameter, and if the measured or inferred power average is below the power setpoint, then the microcontroller or chip is configured to automatically increase the temperature setpoint used by the inner control loop, for the next puff or other parameter.

7. The vaping device of claim 6 in which the microcontroller or chip is configured so that, during the next puff or other parameter, the closed loop temperature control algorithm operates to increase the duty cycle of the PWM and the microcontroller or chip again measures or infers the average power in this next puff or other parameter and if the average power is still below the power setpoint, then the microcontroller or chip increases the temperature setpoint for the following puff or other parameter; and if the average power is now above the power setpoint, then the microcontroller or chip decreases the temperature setpoint and decreases the duty cycle of the PWM for the following puff or other parameter.

8. The vaping device of claim 1 in which the microcontroller or chip is configured to measure or infer the average power in a puff or other parameter, and if the average power is above the power setpoint, then the microcontroller or chip is configured to automatically decrease the temperature setpoint used by the inner control loop, for the following puff.

9. The vaping device of claim 1 in which the microcontroller or chip is configured so that the measured or inferred power is an average power calculated by using the instantaneous V and I generated by a system microcontroller unit (MCU) for one or more timeslots during which power is delivered.

10. The vaping device of claim 1 in which the microcontroller or chip is configured so that the power is an instantaneous power (V×I) a number of times for a defined period, such as for an entire single puff, or some other parameter, e.g. a part of a puff, a 16 ms cycle, or a set number of 16 ms cycles.

11. The vaping device of claim 1 in which the microcontroller or chip is configured so that the power setpoint is an average power per puff or other parameter, such as a part of a puff, a 16 ms cycle, or a set number of 16 ms cycles.

12. The vaping device of claim 1 in which the microcontroller or chip is configured so that if the actual average power used is less over a single puff, or other parameter, by an amount, referred to as the power 'error', then the microcontroller or chip is configured to increase the temperature setpoint, in the inner temperature control loop, by a pre-set factor, Kp and the size of this Kp factor is found through testing and experimentation and is dependent on the specific design of heating element.

13. The vaping device of claim 1 in which the microcontroller or chip is configured to limit the temperature setpoint in an acceptable range: below 280° C., to prevent burning; and above 200-220° C., to ensure that liquid is vapourised.

14. The vaping device of claim 1 in which the microcontroller or chip is configured with further control loops, each with a different type of setpoint.

15. The vaping device of claim 1 in which the microcontroller or chip is configured to vary a thermal profile, namely the temperature setpoint and/or power setpoint.

16. The vaping device of claim 15 in which the microcontroller or chip is configured to alter the thermal profile over the course of a single puff or inhalation.

17. The vaping device of claim 15 in which the microcontroller or chip is configured to alter the thermal profile over the course of a session of puffs or inhalations.

18. The vaping device of claim 15 in which the microcontroller or chip is configured to alter the thermal profile to optimise any one or more of the following: flavour; dose; intensity; vapour density; plume size; safety; reduction in carbonyls in inhaled vapour; reduction in metals in inhaled vapour; reduction in burning taste; consistency in nicotine delivery; improved taste; longevity of improved taste; overall experience taking into account user preferences and/or liquid supplier preferences.

19. The vaping device of claim 15 in which the microcontroller or chip is configured to alter the thermal profile depending on the specific liquid used, taking into account one or more of the following: flavour, whether salt-based, PG/VG proportions, to deliver an optimal user experience.

20. The vaping device of claim 15 in which the microcontroller or chip is configured to alter the thermal profile, when vaping *cannabis* oils, to be optimised for the specific blend of terpenes and their different activation temperatures, or the user experience that is desired, such as relaxation, pain control, appetite control, anxiety, physical performance, mental performance.

21. The vaping device of claim 15 in which the microcontroller or chip is configured to alter the thermal profile in a way that ensures consistency of experience over the course of a vaping session.

22. The vaping device of claim 15 in which the microcontroller or chip is configured to alter the thermal profile by lowering the temperature setpoint and/or power setpoint over the course of a session to ensure that there is no over-heating and instead a consistent level of intensity is enjoyed over the course of the entire session.

23. The vaping device of claim 15 in which the microcontroller or chip is configured to alter the thermal profile over the duration of a multi-week cessation program, gradually reducing the intensity of nicotine, CBD, THC etc (or other relevant parameter) to ease the transition away from dependency.

24. The vaping device of claim 1 in which the microcontroller or chip is configured to enable a user to select the level of vapour output.

25. The vaping device of claim 1 in which the microcontroller or chip is configured to automatically implement different vapour output profiles.

26. The vaping device of claim 1 in which the heating element is one of the following: a resistance based heating element with a known or measurable temperature coefficient of resistivity; a resistance based heating coil, mesh or layer; a resistance based heating coil, mesh or layer contacting a porous substance, such as a ceramic or foam; a resistance based heating flat plate or cylindrical mesh; a resistance based heating flat, stainless steel plate made of 316L stainless steel.

27. The vaping device of claim 1 which is one of the following: is a non-re-fillable, non-re-chargeable vaping device; a re-chargeable vaping device; a re-fillable and re-chargeable vaping device; an automatically re-fillable vaping device; a pod-based vaping device, where the pod is supplied to the end-user pre-filled with liquid.

28. The vaping device of claim 1 which includes a pressure drop sensor or a MEMs type pressure sensor.

29. The vaping device of claim 1 in which the microcontroller or chip is configured to deliver one or more of the following: no burning; generation of no carbonyls and no aldehydes; generation of no metals; consistent vapour production per puff; the lifetime of the heating element is extended from just a few hundred puffs to a useable life of at least 2000 puffs.

* * * * *